US011678323B2

(12) United States Patent
Gong et al.

(10) Patent No.: US 11,678,323 B2
(45) Date of Patent: *Jun. 13, 2023

(54) METHOD AND DEVICES FOR MULTIPLE TRANSMIT RECEIVE POINT COOPERATION FOR RELIABLE COMMUNICATION

(71) Applicant: Huawei Technologies Co., Ltd., Shenzhen (CN)

(72) Inventors: Zhengwei Gong, Ottawa (CA); Amine Maaref, Ottawa (CA); Mohammadhadi Baligh, Ottawa (CA); Usa Vilaipornsawai, Nepean (CA); Hamidreza Farmanbar, Ottawa (CA); Aman Jassal, Ottawa (CA); Hua Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,050

(22) Filed: Dec. 27, 2021

(65) Prior Publication Data

US 2022/0201727 A1    Jun. 23, 2022

Related U.S. Application Data

(63) Continuation of application No. 16/682,822, filed on Nov. 13, 2019, now Pat. No. 11,212,825, which is a
(Continued)

(51) Int. Cl.
*H04W 76/11*    (2018.01)
*H04W 72/1273*    (2023.01)
(Continued)

(52) U.S. Cl.
CPC ....... *H04W 72/1273* (2013.01); *H04L 5/0055* (2013.01); *H04W 24/08* (2013.01);
(Continued)

(58) Field of Classification Search
CPC . H04W 72/1273; H04W 76/01; H04W 76/27; H04W 24/08; H04W 72/042; H04W 72/1268; H04L 5/0055
See application file for complete search history.

(56) References Cited

U.S. PATENT DOCUMENTS 10,924,242 B2 *    2/2021    Jo ................. H04L 5/0053
10,932,278 B2 *    2/2021    Iyer .............. H04W 72/04
(Continued)

FOREIGN PATENT DOCUMENTS

CN    102447529 A    5/2012
CN    103580810 A    2/2014
WO    2018141246 A1    8/2018

OTHER PUBLICATIONS

"3rd Generation Partnership Project; Technical Specification Group Radio Access Network Study on New Radio Access Technology Physical Layer Aspects (Release 14)", 3GPP TR 38.802 V14.0.0, Mar. 2017, 144 Pages.
(Continued)

*Primary Examiner* — Michael J Moore, Jr.
(74) *Attorney, Agent, or Firm* — Slater Matsil, LLP

(57) ABSTRACT

Embodiments of the present application pertain to control information for scheduling a transmission resource for downlink and uplink communications between one or more TRP and one or more UE. One Physical Downlink Control Channel (PDCCH) for DL control information transmission is assumed to carry at least one assignment or scheduling information block for at least one Physical Downlink Shared Channel (PDSCH) for DL data transmission or for at least
(Continued)

one Physical Uplink Shared Channel (PUSCH) for UL data transmission. Embodiments of the present application provide methods of providing configuration information that can be used by a user equipment (UE) to determine transmission mode for the PDSCH and PUSCH as well as information to determine where to monitor for the PDSCH, PUSCH and PUCCH information.

20 Claims, 36 Drawing Sheets

Related U.S. Application Data continuation of application No. PCT/CN2018/091326, filed on Jun. 14, 2018.

(60) Provisional application No. 62/568,757, filed on Oct. 5, 2017, provisional application No. 62/520,510, filed on Jun. 15, 2017.

(51) Int. Cl.
| | | |
|---|---|---|
| *H04W 76/27* | (2018.01) | |
| *H04L 5/00* | (2006.01) | |
| *H04W 24/08* | (2009.01) | |
| *H04W 72/1268* | (2023.01) | |
| *H04W 72/23* | (2023.01) | |

(52) U.S. Cl.
CPC ....... *H04W 72/1268* (2013.01); *H04W 72/23* (2023.01); *H04W 76/11* (2018.02); *H04W 76/27* (2018.02)

(56) References Cited

U.S. PATENT DOCUMENTS

| | | | |
|---|---|---|---|
| 11,212,825 B2 * | 12/2021 | Gong | H04W 24/08 |
| 2012/0269140 A1 | 10/2012 | Nam et al. | |
| 2014/0192734 A1 | 7/2014 | Ng et al. | |
| 2014/0293843 A1 | 10/2014 | Papasakellariou et al. | |
| 2014/0321383 A1 | 10/2014 | Wu et al. | |
| 2015/0237611 A1 | 8/2015 | Ahn et al. | |
| 2015/0245324 A1 | 8/2015 | Kim et al. | |
| 2018/0049203 A1 * | 2/2018 | Xue | H04L 5/0094 |
| 2018/0227156 A1 * | 8/2018 | Papasakellariou | H04L 5/0092 |
| 2018/0227777 A1 * | 8/2018 | Sun | H04L 5/0044 |
| 2018/0302186 A1 * | 10/2018 | Reddy | H04L 1/0072 |
| 2018/0324770 A1 * | 11/2018 | Nogami | H04W 72/042 |
| 2019/0306737 A1 * | 10/2019 | Kwak | H04L 5/0053 |
| 2019/0350049 A1 * | 11/2019 | Miao | H04W 80/08 |
| 2019/0357185 A1 * | 11/2019 | Kwak | H04L 1/0075 |
| 2020/0021419 A1 * | 1/2020 | Taherzadeh Boroujeni | H04L 5/0053 |
| 2020/0077432 A1 * | 3/2020 | Xiong | H04L 1/1825 |
| 2020/0154450 A1 * | 5/2020 | Zhou | H04W 48/16 |
| 2020/0154467 A1 * | 5/2020 | Gong | H04W 72/12 |
| 2020/0187171 A1 * | 6/2020 | Hwang | H04L 5/003 |
| 2020/0196343 A1 * | 6/2020 | Marinier | H04L 5/0092 |
| 2020/0213978 A1 * | 7/2020 | Iyer | H04L 5/0078 |
| 2020/0221428 A1 * | 7/2020 | Moon | H04B 7/024 |
| 2020/0389917 A1 * | 12/2020 | Kwak | H04W 76/20 |
| 2020/0404617 A1 * | 12/2020 | Murray | H04B 7/0695 |
| 2021/0050968 A1 * | 2/2021 | Yi | H04L 5/0051 |

OTHER PUBLICATIONS

"3rd Generation Partnership Project; Technical Specification Group Radio Access Network; NR; Radio Resource Control (RRC); Protocol specification (Release 15)", 3GPP TS 38.331 V0.0.3, May 2017, 20 Pages.

Huawei, et al., "Discussion on network coordination schemes with non-ideal backhaul links in NR", 3GPP TSG RAN WG1 Meeting #88, R1-1701677, Feb. 13-17, 2017 3 Pages, Athens, Greece.

Huawei et al., "WF on control channel for multi-TRP transmission", 3GPP TSG RAN WG1 Meeting #88b, R1-1706551, Agenda item: 8.1.2.1.6, Apr. 3-7, 2017, 3 Pages, Spokane, USA.

* cited by examiner

| PDCCH1 | CORESET1 | QCL association with CSI-RS1 | MAC/RLC/PDCP sublayer 1 | HARQ entity1 | C-RNTI1 | DMRS configuration1 |
| PDCCH2 | CORESET2 | QCL association with CSI-RS2 | MAC/RLC/PDCP sublayer 2 | HARQ entity2 | C-RNTI1 | DMRS configuration2 |
FIG. 5
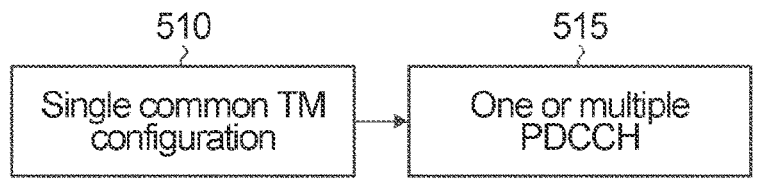
FIG. 6A
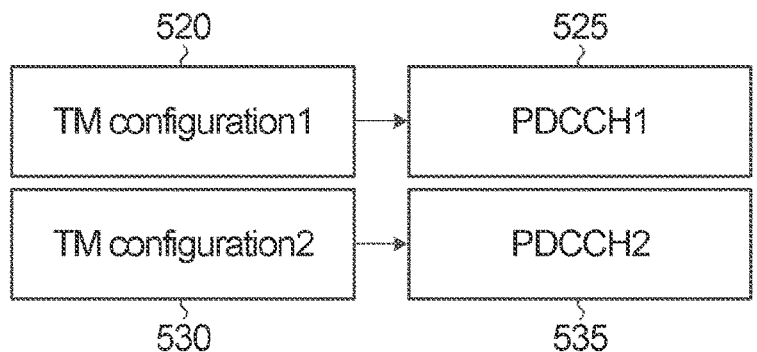
FIG. 6B

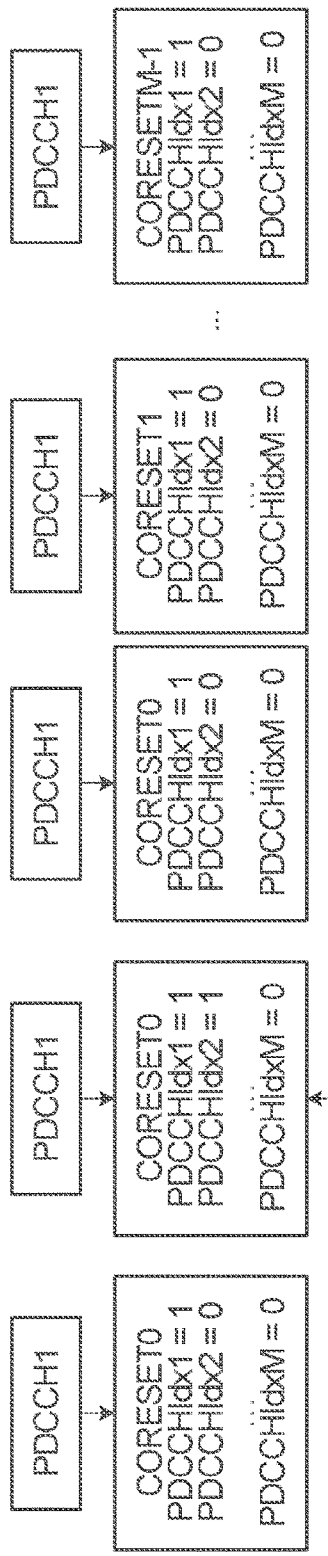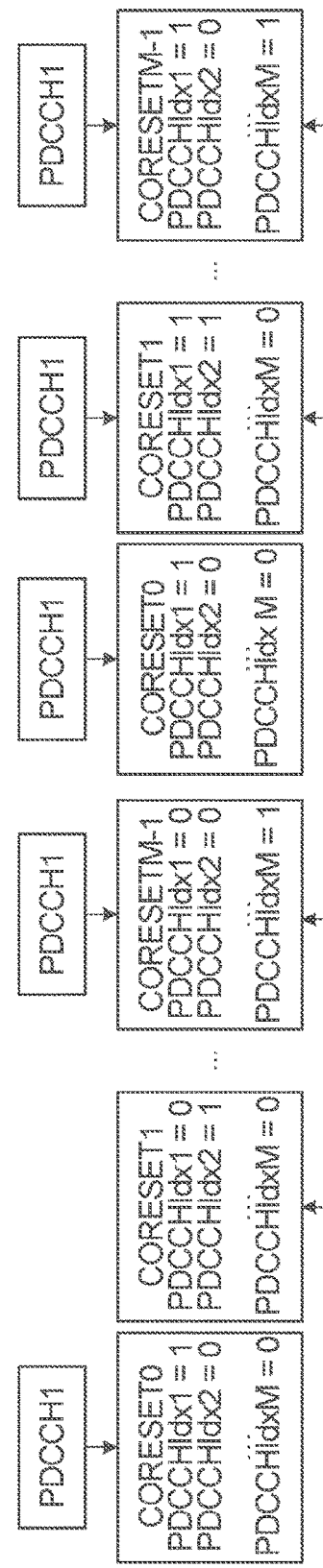

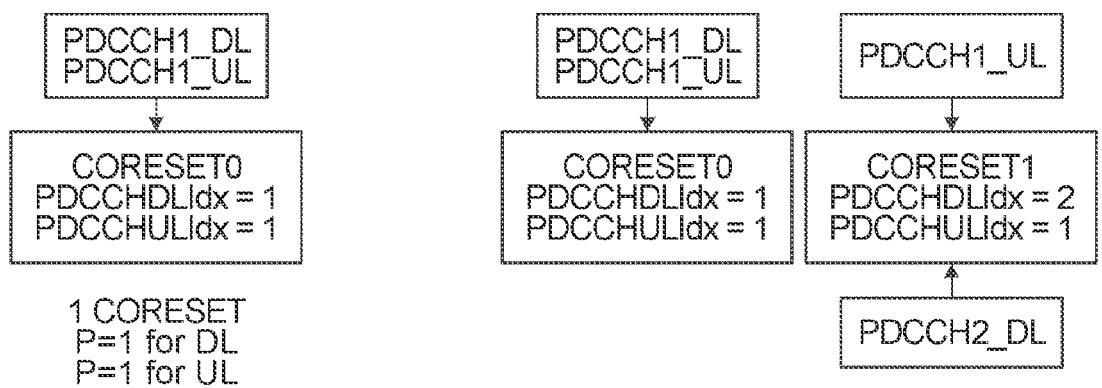

FIG. 27

| HP1 | HP2 | ... | ... | ... | HPN |

FIG. 29A

| HP1 | HP2 | ... | ... | ... | HPN |
| HPN+1 | HPN+2 | ... | ... | ... | HP 2xN |

FIG. 29B

METHOD AND DEVICES FOR MULTIPLE TRANSMIT RECEIVE POINT COOPERATION FOR RELIABLE COMMUNICATION

CROSS-REFERENCE TO RELATED APPLICATIONS

This application is a continuation of U.S. patent application Ser. No. 16/682,822, filed Nov. 13, 2019, now U.S. Pat. No. 11,212,825 issued on Dec. 28, 2021, entitled "Method and Devices for Multiple Transmit Receive Point Cooperation for Reliable Communication," which is a continuation of PCT Application No. PCT/CN2018/091326, entitled "Method And Devices For Multiple Transmit Receive Point Cooperation For Reliable Communication," filed on Jun. 14, 2018, which claims the benefit of U.S. Provisional Application No. 62/520,510, filed on Jun. 15, 2017 and entitled "Method And Devices For Multiple Transmit Receive Point Cooperation For Reliable Communication", and U.S. Provisional Application No. 62/568,757 filed on Oct. 5, 2017 and entitled "Method and devices for multiple Transmit Receive Point Cooperation for Reliable communication." Each of these applications is incorporated by reference herein in its entirety.

TECHNICAL FIELD

The present disclosure relates generally to wireless communications, and in particular embodiments, to systems and methods for multiple transmit receive point (TRP) communication for reliable communication, including supporting multiple assignments of a single data channel type (unicast or UE-specific) within a single cell and multiple assignments of a single data channel type (unicast or UE-specific) from multiple cells.

BACKGROUND

In traditional cellular networks, each transmit/receive point (TRP) is associated with a coverage area or a traditional TRP-based cell and is assigned a traditional cell identifier (ID) to define the control channel and data channel so that simultaneous TRP to user equipment (UE) or UE to TRP communications can be supported for each traditional cell. The network may maintain the association between serving TRP and the UE through assigned traditional cell ID until a handover is triggered.

As the demand on mobile broadband increases, traditional cellular networks are deployed more densely and heterogeneously with a greater number of TRPs. In some implementations multiple TRPs may be serving a same UE.

Each TRP can transmit an assignment of resources that it will be used when transmitting to the UE or receiving from the UE. For example, a TRP can transmit information on a downlink control channel indicating to the UE where in a downlink shared channel data may be located for the UE. The number of TRPs that the UE is interacting with, or that is providing the UE with information at any given time, may or may not be known to the UE. In some scenarios, the number of TRPs, and more specifically the number of assignments, that a UE may need to monitor for may be explicitly designated to the UE by the network. In other scenarios, the number of assignments for the UE may not be explicitly designated. It would be advantageous for the UE to be able to reduce the amount of monitoring of the downlink control channel, or other relevant channel types, that needs to be performed if the UE is unsure what assignments are for the UE to at least the amount of processing, and which for example can ultimately affect the battery life of the UE.

SUMMARY

According to one aspect of the present disclosure there is provided a method that involves: a user equipment (UE) receiving a configuration to monitor more than one physical downlink control channel (PDCCH) for scheduling more than one physical downlink shared channel (PDSCH) or physical uplink shared channel (PUSCH), or both, from one physical cell within one monitoring occasion wherein more than one PDSCH or PUSCH is associated with one data channel type and one radio Network Temporary Identifier (RNTI) type; monitoring more than one PDCCH based on the configuration; and receiving more than one PDSCH or transmitting more than one PUSCH simultaneously.

According to one aspect of the present disclosure there is provided a method that involves configuring a user equipment (UE) with an association between at least one physical downlink control channel (PDCCH) and another property and configuring the UE to monitor at least one PDCCH for at least one PDSCH or at least one PUSCH, or both, for one data channel type and one RNTI type for one cell within one monitoring occasion.

In some embodiments, configuring the UE to monitor the at least one PDCCH comprises providing the number of PDCCH explicitly to the UE by radio resource control (RRC) signaling or media access control control element (MAC-CE) signaling.

In some embodiments, at least one PDCCH can be associated with at least one PDSCH and/or at least one PUSCH and one PDCCH is associated with one PDSCH or PUSCH.

In some embodiments, configuring the UE to monitor the at least one PDCCH comprises the UE determining the number of PDCCH to be monitored implicitly based on the configured association between the at least one PDCCH and the another property.

In some embodiments, the another property is one or more of: a control resource set (CORESET) group associated with a UE-specific search space; a quasi-co-location (QCL) association between a demodulation reference signal (DMRS) of the PDCCH and a downlink reference signal (DL RS); a high-layer sublayer; a HARQ entity; a cell radio network temporary identifier (C-RNTI); another configurable UE-specific ID; and a DMRS configuration for PDCCH monitoring.

In some embodiments, determining the number implicitly comprises using the number of PDCCH that is the same as the number of configured at least one CORESET group.

In some embodiments, the method may further comprise: configuring the UE with at least two different control resource sets (CORESET) and search space configurations according to different numbers of PDCCHs, wherein a first CORESET and search space configuration for a first number of PDCCHs and a second CORESET and search space configuration for a second number of PDCCHs, wherein one search space configuration is based on one or more aggregation level and one or more candidate number for each aggregation level.

In some embodiments, determining the number implicitly comprises using the number of PDCCH that is the same as the number of configured at least one QCL association between demodulation reference signal (DMRS) of PDCCH and a downlink reference signal (DL RS).

In some embodiments, the method may further comprise: configuring the association between the at least one PDCCH and at least one QCL association configuration wherein one PDCCH of the at least one PDCCH is associated with one specific QCL association; monitoring the one PDCCH with a specific QCL association with specific QCL configuration index; and determining the identity of the one PDCCH as the associated specific QCL configuration index.

In some embodiments, determining the number implicitly comprises using the number of PDCCH that is the same as the number of configured at least one HARQ entity.

In some embodiments, the method may further comprise: configuring the association between at least one PDCCH and at least one HARQ entity, wherein one PDCCH of the at least one PDCCH is associated with one specific HARQ entity with a specific HARQ entity index; and determining the identity of the one PDCCH as the associated HARQ entity index.

In some embodiments, determining the number implicitly comprises using the number of PDCCH that is the same as a total number of C-RNTI and/or another configurable UE-specific ID.

In some embodiments, the method may further comprise: configuring the association between at least one PDCCH and at least one C-RNTI and/or another configurable UE-specific ID, wherein one PDCCH of the at least one PDCCH is associated with one specific C-RNTI and/or another configurable UE-specific ID with a specific index; monitoring the one PDCCH with the specific C-RNTI and/or another configurable UE-specific ID; and determining the identity of the one PDCCH as an associated specific index for C-RNTI and/or another configurable UE-specific ID.

In some embodiments, the configuring comprises configuring the UE with at least two different control resource sets (CORESET), each associated with a UE-specific search space.

In some embodiments, different control resource sets are configured with a same one or more aggregation level and for each aggregation level of different control resource set the associated non-zero number of candidate can be same or different for same or different CORESET size.

In some embodiments, the method may further comprise providing the UE with an association between a UL closeloop transmission power command (TPC) for at least one PUSCH/PUCCH and at least one PDCCH based on radio resource control (RRC) signaling.

In some embodiments, the one PUSCH/PUCCH uses TPC from one specific PDCCH that is also associated with the PUSCH/PUCCH.

In some embodiments, the one PUSCH/PUCCH uses TPC from one reference PDCCH that is configured as one of multiple PDCCHs.

In some embodiments, the method may further comprise providing the UE with an association between at least one SRS trigger for SRS transmission and at least one PDCCH based on radio resource control (RRC) signaling.

In some embodiments, the UE use one SRS trigger from one specific PDCCH which is also associated with the specific SRS configuration.

In some embodiments, the UE uses one SRS trigger from one reference PDCCH which is configured as one of multiple PDCCHs.

In some embodiments, the UE is configured with at least two different maximum HARQ process numbers for PUSCH or PDSCH according to the configured number of PDCCH.

In some embodiments, the UE is configured to use a first maximum HARQ process number for PUSCH or PDSCH which is associated with the first number of PDCCH and use a second maximum HARQ process number for PUSCH or PDSCH which is associated with the second number of PDCCH.

In some embodiments, the first and second maximum HARQ process numbers are RRC configured or first and/or second maximum HARQ process numbers are determined by the number N of PDCCH and one predefined or configured maximum HARQ process number Nmax based on the form Nmax*N.

According to another aspect of the present disclosure there is provided method involving a first transmit receive point (TRP) transmitting a first transmission on a dynamically scheduled resource and in a same time resource block, a second TRP transmitting a second transmission on a configured resource.

According to another aspect of the present disclosure there is provided a method involving a first transmit receive point (TRP) transmitting a first transmission over a first time-frequency resource and a second TRP dynamically scheduling transmission for duplicated data over a second time-frequency resource.

According to another aspect of the present disclosure there is provided a method involving a central scheduler scheduling an initial transmission and one or more re-transmissions from at least two transmit receive points (TRP), wherein each of the at least two TRP transmits at least one of the initial transmission and the one or more re-transmissions.

According to another aspect of the present disclosure there is provided a method involving a first transmit receive point (TRP) scheduling an initial transmission and one or more re-transmissions from the first TRP and at least one second TRP and the first TRP transmitting scheduling information to the at least one second TRP.

According to another aspect of the present disclosure there is provided a method involving a first transmit receive point (TRP) scheduling an initial transmission and one or more re-transmissions from the first TRP and at least one second TRP, the first TRP transmitting scheduling information to the at least one second TRP and the at least one second TRP scheduling at least one re-transmission from the at least one second TRP.

According to another aspect of the present disclosure there is provided a method involving scheduling at least two uplink control channels for transmission of the same data, the data on each channel of the at least two channels having the same hybrid automatic request (HARQ) process identifier (ID).

According to another aspect of the present disclosure there is provided a method involving scheduling at least two uplink control channels for transmission of different data, the data on each channel of the at least two channels having the same hybrid automatic request (HARQ) process identifier (ID).

According to an aspect of the disclosure there is provided a method that involves receiving a signaling including a transmission mode configuration for two or more Physical Downlink Control Channels (PDCCHs) and determining a transmission mode for the two or more Physical Downlink Control Channels (PDCCHs) based on the transmission mode configuration.

In some embodiments, wherein the transmission mode configuration is common for two or more PDCCHs.

In some embodiments, the transmission mode is predefined.

In some embodiments, the transmission mode configuration indicates a respective transmission mode for each of the two or more PDCCHs.

In some embodiments, wherein the transmission mode is different for each of the at least one PDCCH for Physical Downlink Shared Channel (PDSCH) or Physical Uplink Shared Channel (PUSCH).

In some embodiments, the transmission mode configuration is signaled using at least one of Radio Resource Control (RRC) signaling, Downlink Control Information (DCI), Media Access Control Control Element (MAC CE).

According to an aspect of the disclosure there is provided a method involves receiving a signaling including at least one Control Resource Set (CORESET) configuration and monitoring one or more Physical Downlink Control Channels (PDCCH) in at least one CORESET within a monitoring occasion based on the at least one CORESET configuration, wherein each CORESET configuration has at least one PDCCH identifier used to indicate a number of PDCCH and an association between a PDCCH and a CORESET.

In some embodiments, one PDCCH identifier includes one PDCCH identifier which is common for Physical Downlink Shared Channel (PDSCH) and Physical Uplink Shared Channel (PUSCH).

In some embodiments, one PDCCH identifier includes one PDCCH identifier set including one specific PDCCH identifier for PDSCH and one specific PDCCH identifier for PUSCH.

In some embodiments, at least one PDCCH identifier of each CORESET configuration refers to M PDCCH identifiers, where M is an integer 1, and each of the M PDCCH identifiers is used to indicate whether a particular PDCCH of the maximum M PDDCH is monitored or is not monitored in the CORESET.

In some embodiments, each of the M PDCCH is associated with one specific PDCCH identifier of the M PDCCH identifiers.

In some embodiments, each of the M PDCCH is indicated to be monitored, or not, based on the value of the associated PDCCH identifier configured for each CORESET.

In some embodiments, the value of the associated PDCCH identifier is set as any one of: 0/1; on/off; or true/false.

In some embodiments, each of the M PDCCH is indicated to be monitored in all configured CORESET.

In some embodiments, the value of PDCCH identifier associated with the specific PDCCH is any one of: 1; on or true.

In some embodiments, a number P of PDCCH which needs to be monitored in one monitoring occasion equals to the total number of different PDCCH which is configured to be monitored in at least one CORESET.

In some embodiments, the at least one associated PDCCH identifier of each CORESET configuration is a single PDCCH identifier that indicates that a single PDCCH associated with a specific value of the single PDCCH identifier is to be monitored in the CORESET.

In some embodiments, a single PDCCH identifier of each CORESET configuration is configured with one specific value out of M different values, where M is an integer≥1, which are used to indicate the maximum M PDCCH that may be monitored in at least one CORESET configured for one search space type.

In some embodiments, each of the M PDCCH is associated with one specific value of the single PDCCH identifier.

In some embodiments, M different values of the single PDCCH identifier are 1, . . . , M.

In some embodiments, each of the M PDCCH is indicated to be monitored in at least one CORESET which has the PDCCH identifier value associated for the specific PDCCH; otherwise, the PDCCH is not monitored.

In some embodiments, a number P of PDCCH to be monitored in one monitoring occasion equals a total number of different PDCCH which are configured to be monitored from at least one CORESET.

In some embodiments, the single PDCCH identifier includes one PDCCH identifier which is common for Physical Downlink Shared Channel (PDSCH) and Physical Uplink Shared Channel (PUSCH).

In some embodiments, the single PDCCH identifier includes a PDCCH identifier set including a specific PDCCH identifier for PDSCH and a specific PDCCH identifier for PUSCH.

According to an aspect of the disclosure there is provided a method involving receiving a signaling including a Physical Downlink Control Channel (PDCCH) number (PDCCH-Num, PDCCHNum≥1) configuration; determining an association between the PDCCH number and at least one Control Resource Set (CORESET); and monitoring a number of PDCCH equal to the PDCCH number in at least one CORESET within a monitoring occasion based on the association.

In some embodiments, determining the association between the PDCCH number and the at least one CORESET further involves: receiving at least one CORESET configuration; wherein each CORESET configuration of the at least one CORESET has at least one PDCCH identifier used to indicate an associated PDCCH to be monitored or not in the CORESET.

In some embodiments, at least one PDCCH identifier of each CORESET configuration refers to a number of PDCCH identifiers equal to the PDCCH number that is used to indicate an associated PDCCH to be monitored, or not, in the CORESET.

In some embodiments, at least one PDCCH identifier of each CORESET configuration refers to a single PDCCH identifier which may be configured with one value out of the PDCCH number of different values used to indicate an associated PDCCH to be monitored, or not, in the CORESET.

In some embodiments, determining the association between the PDCCH number and the at least one CORESET further involves predefining an association between PDCCH and CORESET with a specific PDCCH number and a specific CORESET number.

In some embodiments, predefining an association rule between PDCCH and CORESET based on at least one of: all CORESET may be split into non-overlapping P CORESET sets wherein each CORESET set with specific index p (p=1, . . . P) has at least one CORESET and at least two CORESET from different CORESET set have continuous CORESET index and/or CORESET configuration index; and each PDCCH with specific PDCCH identifier (PDCCHIdx=p (p=1, . . . P)) is associated with specific COREST set p wherein P equals to PDCCH number PDCCHNum.

In some embodiments, predefining the association further involves predefining an association table between PDCCH and CORESET with the PDCCH number and the CORESET number based on the CORESET configuration.

In some embodiments, for up to two PDCCH and up to three CORESET, the mapping table includes at least one of the following relationships:

| PDCCHNum | CORESET Number | Association |
|---|---|---|
| 1 | 1 | PDCCH1-CORESET0 |
| 1 | 2 | PDCCH1-CORESET0 |
|   |   | PDCCH1-CORESET1 |
| 2 | 2 | PDCCH1-CORESET0 |
|   |   | PDCCH2-CORESET1 |
| 2 | 3 | PDCCH1-CORESET0 |
|   |   | PDCCH1-CORESET1 |
|   |   | PDCCH2-CORESET2 |
|   |   | Or |
|   |   | PDCCH1-CORESET0 |
|   |   | PDCCH2-CORESET1 |
|   |   | PDCCH2-CORESET2 |

In some embodiments, in the table above, PDCCHNum=1 indicates in monitoring one PDCCH for PDSCH or one PDCCH for PUSCH, or both, in one, or multiple, CORESET; and PDCCHNum=2, indicates in monitoring two PDCCHs for PDSCH or two PDCCH for PUSCH, or both, in multiple CORESET and different PDCCH are monitored from different CORESET.

In some embodiments, PDCCHNum includes one PDCCHNum which is common for PDSCH and PUSCH.

In some embodiments, PDCCHNum includes one PDCCHNum set including one specific PDCCH number for PDSCH and one PDCCH number for PUSCH.

According to an aspect of the disclosure there is provided a method involving: receiving a signaling including a Physical Downlink Control Channel (PDCCH) number (PDCCH-Num, PDCCHNum≥1) configuration; receiving an indication for determining the PDCCH monitoring mode; and monitoring a number of PDCCH equal to the PDCCH number in at least one Control Resource Set (CORESET) within a monitoring occasion.

In some embodiments, the PDCCH monitoring mode comprises one of a first PDDCH monitoring mode that corresponds to monitoring different PDCCH in different CORESET for at least two PDCCH for PUSCH or at least two PDCCH for PUSCH based on a predefined association between PDCCH and CORESET or a second PDDCH monitoring mode corresponds to monitoring one, or multiple, PDCCH in all CORESET that are configured for one search space type.

In some embodiments, the predefined association includes one of a predefined association rule between PDCCH and CORESET or a predefined association table between PDCCH and CORESET.

In some embodiments, for up to two PDCCH and up to three CORESET, the predefined association table includes at least one of the following relationships

| PDCCHDLNum or PDCCHULNum (for configured PDSCH or PUSCH) | CORESET Number | Association |
|---|---|---|
| 2 | 2 | PDCCH1-CORESET1 |
|   |   | PDCCH2-CORESET2 |
| 2 | 3 | PDCCH1-CORESET1 |
|   |   | PDCCH1-CORESET2 |
|   |   | PDCCH2-CORESET3 |
|   |   | Or |
|   |   | PDCCH1-CORESET1 |
|   |   | PDCCH2-CORESET2 |
|   |   | PDCCH2-CORESET3 |

In some embodiments, the method, further involves, if the indication indicates a first PDDCH monitoring mode is to be used, the first PDDCH monitoring mode is used, otherwise a second PDDCH monitoring mode is used.

According to an aspect of the disclosure there is provided a method involving determining an initialization value for generating a scrambling sequence used to scramble a physical channel based on an associated Physical Downlink Control Channel (PDCCH) identity.

In some embodiments, the associated PDCCH identity is a PDCCH index.

In some embodiments, the physical channel is at least one of a PDCCH, a Physical Downlink Shared Channel (PDSCH), and a Physical Uplink Shared Channel (PUSCH).

In some embodiments, the method further involves determining an initialization value for scrambling a first physical channel which is associated with a first PDCCH identity and determining an initialization value for scrambling a second physical channel which is associated with a second PDCCH identity.

According to an aspect of the disclosure there is provided a method involving receiving multiple Physical Downlink Control Channels (PDCCHs) or Physical Downlink Shared Channel (PDSCHs), or both; and transmitting a single Physical Uplink Control Channel (PUCCH) for the transmission of a combination of multiple uplink control information (UCI) feedback, wherein each UCI feedback is associated with at least one of one specific PDCCH and one specific PDSCH.

According to an aspect of the disclosure there is provided a method involving receiving multiple respective Physical Downlink Control Channels (PDCCHs) or Physical Downlink Shared Channels (PDSCHs), or both; and transmitting multiple Physical Uplink Control Channels (PUCCHs) for the transmission of multiple uplink control information (UCI) feedback, wherein each UCI feedback is associated with at least one of one specific PDCCH and one specific PDSCH.

In some embodiments, the methods may further involve determining the single or multiple PUCCH resources.

In some embodiments, the single or multiple PUCCH resources include at least one of: a time resource; a frequency resource; a code or sequence resource; a frequency hopping pattern; a transmission beam; and PUCCH format.

In some embodiments, the multiple PUCCH resources used for the transmission of multiple respective PUCCH use the same or different PUCCH format.

In some embodiments, the multiple PUCCH resources used for the transmission of multiple respective PUCCH are located in a single slot, such that each PUCCH's starting OFDM symbol is located in a single slot and its duration is less than or equal to the duration of a slot.

In some embodiments, the multiple PUCCH resources used for the transmission of multiple respective PUCCH are located in multiple slots, such that each PUCCH's starting OFDM symbol is located in a single slot and its duration is less than, equal to, or longer than, the duration of a slot.

In some embodiments, the multiple PUCCH resources used for the transmission of multiple respective PUCCH are located in multiple slots, such that each PUCCH's ending OFDM symbol is located in a single slot and its duration is less than, equal to, or longer than, the duration of a slot.

In some embodiments, the multiple PUCCH resources used for the transmission of multiple respective PUCCH are located in separate slots, such that each PUCCH's starting OFDM symbol is located in a given slot and its duration is less than or equal to the duration of a slot.

In some embodiments, wherein the multiple PUCCH resources used for the transmission of multiple respective PUCCH use respective transmission beams that are derived using the quasi-collocated association between a respective PUCCH Demodulation Reference Signal (DMRS) and a respective Downlink Reference Signal (DL RS).

In some embodiments, the DL RS is a Channel State Information-Reference Signal (CSI-RS).

In some embodiments, the DL RS is a PDCCH DMRS.

In some embodiments, the DL RS is a PDSCH DMRS.

In some embodiments, resource information pertaining to the single or multiple PUCCH resource is configured with at least one of: RRC signaling; Downlink Control Information (DCI); Media Control Access Control Element (MAC CE); and a predefined rule.

In some embodiments, the methods involve determining a PUCCH feedback mode; and transmitting a single or multiple PUCCH based on the PUCCH feedback mode.

In some embodiments, the determining the PUCCH feedback mode is made by selecting one of two separate feedback modes.

In some embodiments, a first mode is for a single PUCCH and a second mode is for multiple PUCCH.

In some embodiments, determining the PUCCH feedback mode comprises making a determination based on an implicit mechanism using a PDCCH to CORESET association.

In some embodiments, determining the PUCCH feedback mode comprises receiving a higher-layer signaling.

In some embodiments, the higher-layer signaling at least one of RRC signaling, Downlink Control Information (DCI), and Media Control Access Control Element (MAC CE).

According to an aspect of the disclosure there is provided a method involving determining an association between multiple Channel State Information-Reference Signal (CSI-RS) configurations and multiple Physical Uplink Shared Channels (PUSCHs); and reporting one or multiple CSI-RS measurement over an associated separate PUSCH based on the association between multiple CSI-RS configuration and multiple PUSCHs.

In some embodiments, determining the association comprises receiving a signaling indicating the association.

In some embodiments, determining the association involves determining a CSI-RS configuration that is associated with a PUSCH which is scheduled by a PDCCH, the PDCCH being associated with a DMRS quasi co-located with a CSI-RS.

According to some embodiments of the disclosure, there is provided a device including a processor and a computer-readable medium. The computer-readable medium having stored thereon computer executable instructions, that when executed by the processor perform one or more of the various methods described above or detailed below.

In some embodiments, the device may be an electronic device, such as a user equipment.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 5 is a table showing two examples of potential associations between two PDCCH assignments and other parameters;

FIGS. 6A and 6B illustrate associations between transmission mode configuration used for one or more PDCCH;

FIGS. 8A to 8E illustrate examples of associations between PDCCH, CORESET and PDCCH identifiers, wherein the number of PDCCH is equal to M, which can be used for configuring UE with a common configuration;

FIGS. 13A and 13B illustrate examples of associations between PDCCH, CORESET and PDCCH identifiers, wherein the number of DL and UL PDCCH is equal to 2, which can be used for configuring UE with a common configuration;

FIG. 27 is a representative illustration of a portion of a transmission resource that has been sub-divided in different ways based on assignment identity, codeword or codeblock;

FIG. 29A is a representation of HARQ process numbers for a single assignment for a single data channel;

FIG. 29B is a representation of HARQ process numbers for a multiple assignments for a single data channel;

DETAILED DESCRIPTION OF ILLUSTRATIVE EMBODIMENTS

Embodiments of the present application pertain to control information for scheduling a transmission resource for downlink and uplink communications between one or more TRP and one or more UE. One Physical Downlink Control Channel (PDCCH) for DL control information transmission is assumed to carry at least one assignment or scheduling information block for at least one Physical Downlink Shared Channel (PDSCH) for DL data transmission or for at least one Physical Uplink Shared Channel (PUSCH) for UL data transmission. In some cases, a PDCCH is also known as Downlink Control Information (DCI). Moreover, in some implementations, one PDCCH can be associated with one HARQ process for one PDSCH or one PUSCH. The PDCCH for New Radio (NR), a next evolution for wireless communications, may be referred to as NR-PDCCH. The cell for New Radio (NR) may be referred to as a NR-cell. The PDSCH for New Radio (NR) may be referred to as a NR-PDSCH. The PUCCH for New Radio (NR) may be referred to as a NR-PUCCH. The PUSCH for New Radio (NR) may be referred to as a NR-PUSCH. Generally, NR-PDCCH, NR-PDSCH, NR-PUSCH, NR-PUCCH are used for discussion within this application. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. One control resource set (CORESET) group contains at least one CORESET. A CORESET is defined with a time (e.g. symbol/slot level)-frequency (e.g. PRB level) resource for PDCCH monitoring.

Table 1 below illustrates a relationship between two respective PDCCH and other characteristics associated with the respective PDCCH. PDCCH1 may have an associated resource assignment (Assignment1), an associated downlink control information (DCI1), an associated PDSCH (PDSCH1) an associated PUSCH (PUSCH1) and an associated hybrid automatic repeat request process (HARQ Process 1). Likewise, PDCCH2 may have an associated resource assignment (Assignment2), an associated downlink control information (DCI2), an associated PDSCH (PDSCH2) an associated PUSCH (PUSCH2) and an associated hybrid automatic repeat request process (HARQ Process 2). Each PDCCH does not necessarily include all of the associations all of the time, but they are examples of characteristics the PDCCH may have associations with.

TABLE 1

A clarification for mapping between different terminologies

| PDCCH1 | Assignment1 | DCI1 | PDSCH1 | PUSCH1 | HARQ PROCESS 1 |
|---|---|---|---|---|---|
| PDCCH2 | Assignment2 | DCI2 | PDSCH2 | PUSCH2 | HARQ PROCESS 2 |

Figure 1:
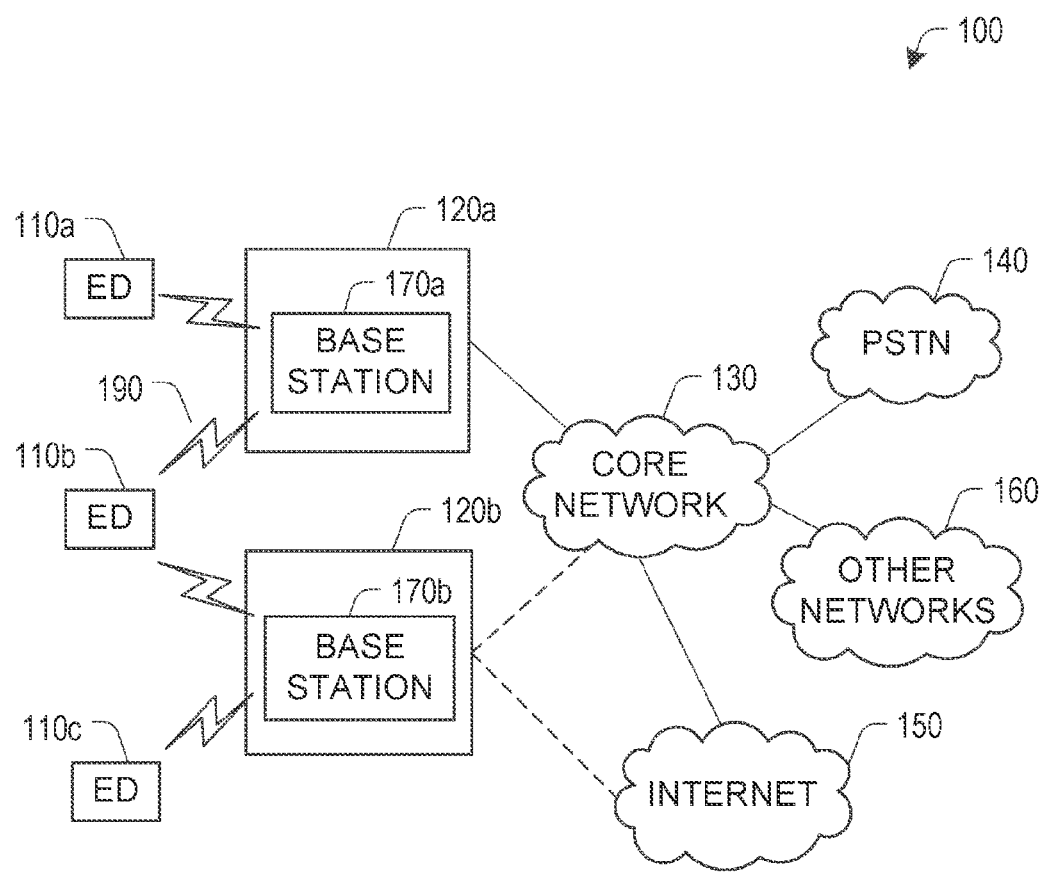
FIG. 1 illustrates an example communication system in which embodiments of the present disclosure could be implemented.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. When any of the example base stations listed above are described below, it is assumed that they are interchangeable with other types of base stations. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, multiple-input multiple-output (MIMO) technology may be employed having multiple transceivers for each coverage area. The number of RAN 120a-120b shown is exemplary only. Any number of RAN may be contemplated when devising the system 100.

The base stations 170a-170b communicate with one or more of the EDs 110a-110c over one or more air interfaces 190 using wireless communication links e.g. RF, Wave, IR, etc., The air interfaces 190 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing plain old telephone service (POTS). Internet 150 may include a network of computers and subnets (intranets) or both, and incorporate protocols, such as IP, TCP and UDP. EDs 110a-110c may be multimode devices capable of operation according to multiple radio access technologies, and incorporate multiple transceivers necessary to support such.

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, one or more TRPs within a NR cell may transmit a UE specific dedicated control channel, which serves a UE and carries UE-specific control information associated with the UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence and/or location of which are linked to the UE ID or other UE specific parameters.

In some embodiments, one or more of these channels, including the dedicated control channels and the data channels, may be generated in accordance with a UE specific parameter, such as a UE ID, and/or an NR cell ID. Further, the UE specific parameter and/or the NR cell ID can be used to differentiate transmissions of the data channels and control channels from different NR cells.

An ED, such as a UE, may access the communication system 100 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

It is obviously understood that any number of NR cells may be implemented in the communication system 100. For example, FIG. 2 illustrates two neighboring NR cells in an example communication system, in accordance with an embodiment of the present disclosure.

Figure 2:
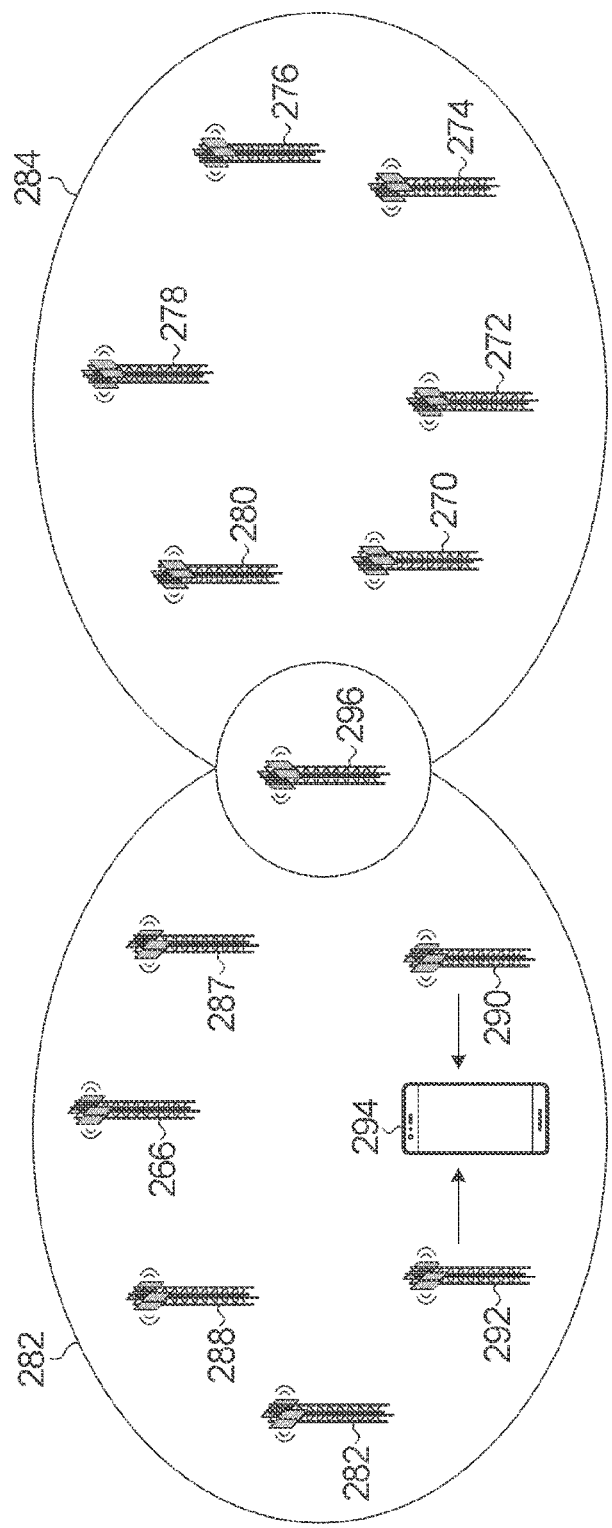
FIG. 2 illustrates two neighboring NR cells of an example communication system in which embodiments of the present disclosure could be implemented.

As illustrated in FIG. 2, NR cells 282, 284 each include multiple TRPs that are assigned the same NR cell ID. For example, NR cell 282 includes TRPs 286, 287, 288, 289, 290, and 292, where TRPs 290, 292 communicates with an ED, such as UE 294. It is obviously understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the system may switch the NR cell ID for transmit point 296 between the two NR cells 282 and 284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another example, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 296 from the NR cell ID of NR cell 282 to the NR cell ID of NR cell 284. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 296 can reduce interference for UEs located at the boundary between the two NR cells 282, 284. UEs that are located near the boundaries of two NR cells 282, 284 experience less handovers because the shared TRP is associated with either NR cell at different times, frequencies or spatial directions. Further, as a UE moves between the NR cells 282, 284, the transition is a smoother experience for the user. In one embodiment, the network changes the NR cell ID of the TRP 296 to transition a UE moving between NR cells 282, 284. Moreover, the system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as ZC sequences can be used as base sequences for SRS. The TRP reports a measurement of the detected uplink SRS sequence to the network, such as a controller. The controller then selects the optimal TRPs for all served UEs based on the measurements.

A UE can monitor one or more control resource sets (CORESET) for downlink control information. Long term Evolution (LTE) is known to support UE specific and/or case specific search space definitions. A time/frequency resource set (i.e. control resource set) can be defined as a set of Resource Element Groups (REGs) under a given numerology. In some implementations a REG is four consecutive Resource Elements (RE). An RE is a smallest transmission resource element, which may, for example, be 1 symbol by 1 sub-carrier.

A search space for one search space type may be defined by at least some of the following properties: one or more aggregation levels (AL), a number of decoding candidates (i.e. a candidate number (CN)) for each aggregation level and a set of Control Channel Elements (CCEs) for each decoding candidate. A candidate is a location in the search space that may include downlink control information for the UE. Thus, a candidate number is a defined number of potential locations in the search space. In some implementations, a CCE may be nine consecutive REGs. An aggregation level may be defined as 1, 2, 4, or 8 consecutive CCEs. As an example, an aggregation level of 2 would be 2 consecutive CCEs.

Table 2 below illustrates an example of Enhanced PDCCH (EPDCCH) for two example CORESETs, and the specifically associated search space both the aggregation level and candidate number. The values in the CORESET A and CORESET B columns of Table 2 represent the number of Physical Resource Blocks (PRB) used in the CORESET. The values of L=2 to L=32 are the different aggregation levels. The two numbers in each aggregation level column represent the number of candidates for the PRB size of CORESET A and CORESET B in a respective row. Where the number of candidates is zero, that particular aggregation level is not supported for the corresponding CORESET.

TABLE 2

Number of candidates for different aggregation levels for different CORESETS

| CORESET A | CORESET B | L = 2 | L = 4 | L = 8 | L = 16 | L = 32 |
|---|---|---|---|---|---|---|
| 2 | 2 | 4.4 | 2.2 | 1.1 | 0.0 | 0.0 |
| 4 | 4 | 3.3 | 3.3 | 1.1 | 1.1 | 0.0 |
| 8 | 8 | 3.3 | 2.2 | 1.1 | 1.1 | 1.1 |
| 4 | 2 | 5.3 | 3.2 | 1.1 | 1.0 | 0.0 |
| 8 | 2 | 4.2 | 4.2 | 1.1 | 1.0 | 1.0 |
| 8 | 4 | 3.3 | 2.2 | 2.1 | 1.1 | 1.0 |

Table 2 is merely an example of candidate numbers for respective aggregation levels for CORESTS of different sizes. It is to be understood that these are example values and are not intended to be limiting in nature.

In some implementations, in the time domain, a CORESET may comprise one OFDM symbol or a set of contiguous or non-contiguous OFDM symbols. The configuration for the CORESET may be defined in various different ways. For example, the CORESET can be defined based on a starting OFDM symbol and a time duration. Another example may include defining a number of OFDM symbols. In some embodiments, a CORESET may be configured with a single Control Channel Element-to-Resource Element Group (CCE-to-REG) mapping.

Figure 3A:
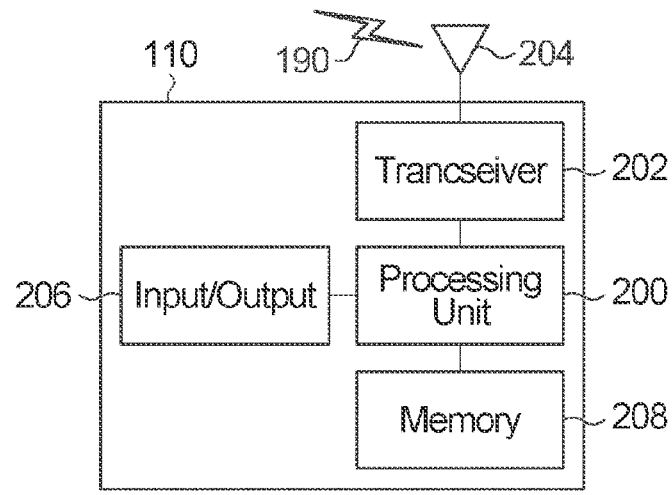
FIGS. 3A and 3B illustrate example devices that may implement the methods and teachings according to this disclosure.
Figure 3B:
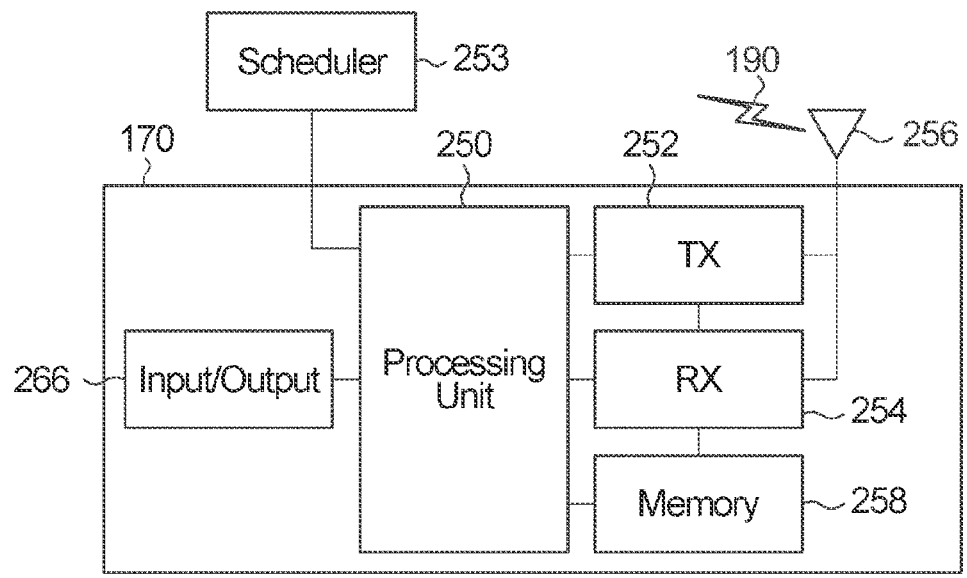

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless transmission and/or processing signals received wirelessly or by wire. Each antenna 204 includes any suitable structure for transmitting and/or receiving wireless signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces. The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 facilitates interaction with a user or other devices (network communications) in the network. Each input/output device 266 includes any suitable structure for providing information to or receiving/providing information from a user, including network interface communications.

It should be appreciated that one or more steps of the embodiment methods provided herein may be performed by corresponding units or modules, according to FIGS. 3A and 3B. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

A UE can monitor one or more control resource sets (CORESET) for downlink control information. Long term Evolution (LTE) is known to support UE specific and/or case specific search space definitions. A time/frequency resource set (i.e. control resource set) can be defined as a set of Resource Element Groups (REGs) under a given numerology. In some implementations a REG is four consecutive Resource Elements (REs). An RE is a smallest transmission resource element, which may, for example, be 1 symbol by 1 sub-carrier. A CORESET may be made up of multiples resource blocks (i.e, multiples of 12 REs) in the frequency domain.

A search space for one search space type may be defined by at least some of the following properties: one or more aggregation levels (AL), a number of decoding candidates (i.e. a candidate number (CN)) for each aggregation level and a set of Control Channel Elements (CCEs) for each decoding candidate. A candidate is a location in the search space that may include downlink control information for the UE. Thus, a candidate number is a defined number of potential locations in the search space. In some implementations, a CCE may be nine consecutive REGs. An aggregation level may be defined as 1, 2, 4, or 8 consecutive CCEs. As an example, an aggregation level of 2 would be 2 consecutive CCEs.

In some implementations, in the time domain, a CORESET may comprise one OFDM symbol or a set of contiguous or non-contiguous OFDM symbols. The configuration for the CORESET may be defined in various different ways. For example, the CORESET can be defined based on a starting OFDM symbol and a time duration. Another example may include defining a number of OFDM symbols. In some embodiments, a CORESET may be configured with a single Control Channel Element-to-Resource Element Group (CCE-to-REG) mapping.

Figure 4A:
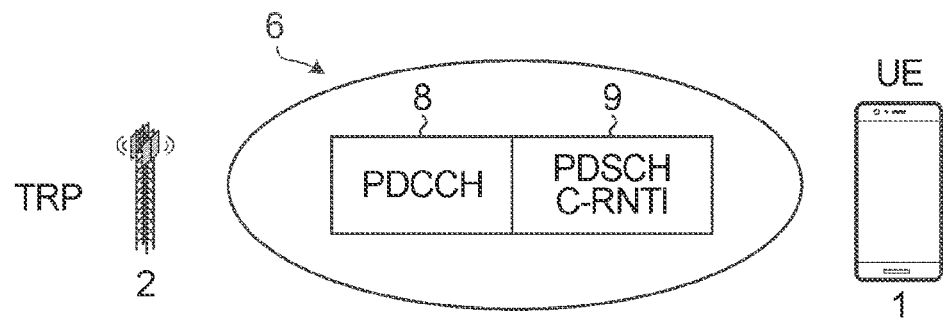
FIG. 4A is a representative illustration of a Physical Downlink Control Channel (PDCCH) and a Physical Downlink Shared Channel (PDSCH) communication between a transmit receive point (TRP) and a user equipment in a cell.

FIG. 4A illustrates, for a single cell 6, an example of conventional communication between a single TRP 2 and a single UE 4. FIG. 4A includes a representative example of a single Physical Downlink Control Channel (PDCCH) 8 being transmitted along with a single Physical Downlink Shared Channel (PDSCH) 9. One PDCCH 8 includes one assignment information for one PDSCH 9. One PDCCH 8 and/or one PDSCH 9 will be associated with a cell radio network temporary identifier (C-RNTI) for identifying the UE that the PDCCH and/or PDSCH is being transmitted for. It should be noted that a same UE may have multiple C-RNTIs. In FIG. 4A, as PDCCH and/or PDSCH is for UE 4, the C-RNTI identifies UE 4. The examples of the PDCCH and PDSCH in FIG. 4A are only intended to be representative. It is to be understood that an implementation specific scenario may include numerous UE, each having an allotted portion of the transmission resource for PDCCH and PDSCH.

Figure 4B:
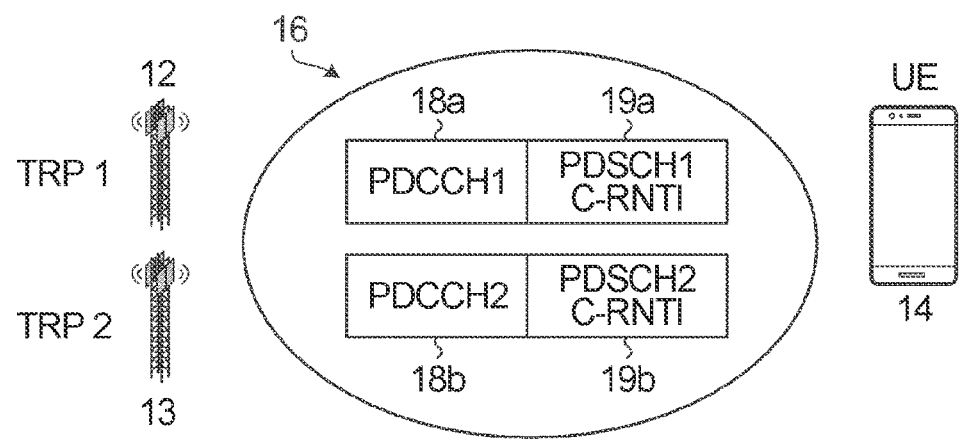
FIG. 4B is a representative illustration of PDCCH and PDSCH communications between two TRPs and a single user equipment in a cell.

Embodiments of the present disclosure pertain to communications between multiple TRPs in a single cell and UEs. FIG. 4B illustrates, for a region 16, an example of communication according to embodiments of the present application between a two TRPs, TRP 12 and TRP 13, and a single UE 14. FIG. 4B includes an example of PDCCH1 18a being transmitted along with PDSCH1 19a from TRP 12 and PDCCH2 18b being transmitted along with PDSCH2 19b from TRP 13. PDCCH1 18a is used to carry one assignment for PDSCH1 19a and PDCCH2 18b is used to carry another assignment for PDSCH2 19b. PDSCH 19a and 19b also are associated with a C-RNTI for identifying the UE that the assignment is for. In FIG. 4B, the C-RNTI identifies UE 14.

Embodiments of the present application include providing support for different aspects of signaling between TRPs (or more generally from the network side) and UEs when there are multiple PDCCH(s) for PDSCH and/or PUSCH, and a single data channel type (unicast or UE-specific), and one RNTI type (C-RNTI or configurable UE ID) in a single cell. Some embodiments that will be described herein are i) providing support for signaling the maximum number of PDCCH and an association between the PDCCH and other properties of a communication link, ii) providing support for detection of time unit information from multiple TRPs for the single data channel type, iii) providing support for HARQ codebook and PUCCH resource, iv) providing support for PDCCH configuration specific and control resource set specific, or both, search space definition, v) providing support for maximum HARQ process number and an association between the PDCCH and the HARQ process number and vi) providing support for an association between the PDCCH and control signaling for UL channel (e.g. PUSCH and/or PUCCH) and/or reference signal transmission (e.g. SRS).

In some implementations, there can be an association between PDCCH and other properties, such as the a control resource set, a QCL configuration, a radio network temporary identifier (RNTI) and/or a configurable UE ID, higher-layer sublayer, a HARQ entity, and a DMRS configuration. Support for Assignment Association and Configuration In some embodiments, a UE can be configured to monitor multiple PDCCHs carrying multiple assignments for multiple PDSCHs and/or multiple PUSCHs and each PDCCH is used to schedule a respective PDSCH or PUSCH, where each PDCCH and/or PDSCH is transmitted from a separate TRP which also can be transparent to UE. In this embodiment, multiple PDCCHs are associated with single NR-cell and can be simultaneously monitored by one UE within the same one monitoring occasion which can be at least an OFDM symbol group, a slot, a mini slot, a slot group, and a sub-frame. A mini slot is a portion of a slot and thus less than a full slot. A slot group is a group of slots and thus more than a full slot. Moreover, in some implementations multiple PDCCHs for multiple PDSCHs or multiple PUSCHs are associated with a single data channel type (unicast or UE-specific) and one RNTI type with one or more C-RNTI and/or one or more configurable UE ID (e.g. one C-RNTI1 is configured during random access procedure and another C-RNTI2 or UE ID is configured using RRC signaling). In a first example, a UE can be configured to monitor both PDCCH1 and PDCCH2 for scheduling UE-specific PDSCH1 and PDSCH2, respectively. In a second example, the UE can be configured to monitor PDCCH1, PDCCH2, PDCCH3 and PDCCH4 for scheduling UE-specific PDSCH1, PDSCH2, PUSCH1 and PUSCH2, respectively. Generally, when referring to one or more PDCCH in the present application it is to be understood that this at least corresponds to at least one different PDCCH which can be monitored simultaneously and associated with at least one UE-specific data channel, for DL or UL, with a same RNTI type.

In some implementations, the number of one or more PDCCH can be explicitly provided to the UE from the network, for example by broadcast signaling.

In other implementations, the number of one or more PDCCH can be implicitly derived from another property of the communication link. The following are a non-limiting list of examples of properties that the number could be implicitly derived from. A first example property is the CORESET group configuration that is associated with UE-specific search space for PDCCH monitoring. In this example, one or more CORESETs associated with UE-specific search space will be split into one or more CORESET groups and each CORESET group has at least one CORESET. The number of one or more PDCCH is same as the number of one or more configured CORESET groups. A second example property is a Quasi-Co-Location (QCL) association between a Demodulation Reference Signal (DMRS) of the PDCCH with one or more other DL Reference Signal (RS), for example a Channel Status Information-Reference Signal (CSI-RS) resource, and/or port information. In this example, the number of one or more PDCCH is same as the number of one or more different associated QCL configurations. Moreover, one or more QCL configurations also can be associated with at least one CORESET group that is associated with one search space type. A third example property is related to a high-layer sublayer such as the Medium Access Control (MAC) layer, the Radio Link Control (RLC) layer or the Packet Layer Convergence Protocol (PDCP) layer. In this example, the number of one or more PDCCH is same as the number of one or more MAC layer, or one or more RLC layer or one or more PDCP layer. A fourth example property is related to a HARQ entity. In this example, the number of one or more PDCCH is same as the number of one or more HARQ entity. A fifth example property is related to a C-RNTI, or possibly a configurable UE-specific ID. In this example, the number of one or more PDCCH is same as the number of one or more C-RNTI and/or UE-specific ID which can be configured RAR (MAC CE) and/or RRC configuration. A sixth example property is DMRS configuration which includes at least one of port number and/or index, pattern and sequence generation initialization identifier (ID). In this example, the number of one or more PDCCH is the same as the number of one or more DMRS configuration. Moreover, one or more DMRS configuration also can be associated with at least one CORESET and/or at least one search space which are associated with one search space type.

The network provides a UE with information detailing an association between the PDCCH for UL or DL assignment associated with the same channel type (unicast or UE-specific), one same RNTI type and another property. In a first example, each PDCCH is associated with specific CORESET group which is associated with specific CORESET group index. In this example, a first PDCCH is associated with a first CORESET group and a second PDCCH is associated with a second CORESET group. In a second example, each PDCCH is associated with specific QCL configuration between the DMRS of each PDCCH with other DL RS and specific QCL configuration is associated with a specific configuration index. In this example, a first PDCCH is associated with a first QCL configuration between the DMRS of a first PDCCH with other DL RS and a second PDCCH is associated with a second QCL configuration between the DMRS of the second PDCCH with other DL RS. Moreover, multiple QCL configurations also can be associated with at least one CORESET group and one search space type. In a third example, each PDCCH is associated with a specific high-layer sublayer such as the Medium Access Control (MAC) layer, the Radio Link Control (RLC) layer or the Packet Layer Convergence Protocol (PDCP) layer and each high-layer sublayer is associated with a specific high-layer sublayer index. In this example, a first PDCCH is associated with a first high-layer sublayer and a second PDCCH is associated with a second high-layer sublayer. In a fourth example, each PDCCH is associated with specific HARQ entity with specific HARQ entity index. In this example, a first PDCCH is associated with a first HARQ entity and a second PDCCH is associated with a second HARQ entity. A fifth example, each PDCCH is associated with specific C-RNTI and/or UE specific ID which is associated with a specific index, In this example, a first PDCCH is associated with a first C-RNTI and a second PDCCH is associated with a second C-RNTI, or possibly a configurable UE-specific ID. In a sixth example, each PDCCH is associated with a specific DMRS configuration for PDCCH and DMRS configuration is associated with a specific DMRS configuration index. In this example, a first PDCCH is associated with a first DMRS configuration and a second PDCCH is associated with a second DMRS configuration. Moreover, multiple DMRS configurations also can be associated with at least one CORESET group and/or at least one search space and one search space type. Generally, first and/or second can be regarded as the identity for PDCCH/assignment which can be associated with at least one of CORESET group index, QCL configuration index, high-layer sublayer index, HARQ entity index, C-RNTI/configurable ID index, and DMRS configuration index.

FIG. 5 includes a table having two rows and seven columns. The first row identifies six possible properties that could be associated with a first PDCCH (PDCCH1) that a UE may be monitoring and the second row identifies six similar properties that could be associated with a second PDCCH (PDCCH2) that the UE may be monitoring. The six properties are the same as those identified above, CORESET group, QCL association between DMRS of PDCCH with CSI-RS, higher layer sublayer, HARQ entity, UE identifier and DMRS configuration of PDCCH. A PDCCH could be associated with any one or a combination of more than one of the properties identified in the table. The association with one or more of the properties can be updated by the network if and when desired. While only two PDCCH and possible associated properties are indicated in FIG. 5, it is understood that appropriate associations for each PDCCH that the UE is monitoring would be provided to the UE by the network.

In some implementations, the UE may monitor only PDCCHs that have an associated CORESET group or a QCL association between DMRS of PDCCH with CSI-RS, or both.

In some implementations, one PDCCH can be monitored that is identified in the association that is one specific CORESET group, which is a subset of all CORESET defined for one search space type. This would be considered a UE-specific search space.

In some implementations, the UE may monitor multiple PDCCHs that are associated to only one CORESET group and each PDCCH is associated with a QCL configuration between the DMRS of the PDCCH with other DL RS.

PDCCH Identity Specific Search Space Splitting

In some embodiments, a UE can be configured by the network to monitor at least two different CORESET groups that are for a particular UE-specific search space. In such embodiments, different PDCCH can be associated with different CORESET groups and each CORESET group has at least one CORESET. Moreover, each CORESET group can have specific search space definition including specific aggregation level and/or candidate number.

Some aspects of the present disclosure also pertain to defining the configuration of the transmission mode for a single or multiple PDCCH. In this disclosure, one specific transmission mode may be associated with one specific DCI format. Generally, different DCI formats provide different scheduling information and can have the same or a different payload size, which refers to one total bit number of one DCI. (Solution 1-1) In some embodiments with multiple PDSCH/PUSCH transmission with similar spatial channel character, one common transmission mode configuration can achieve performance gain without extra configuration overhead. In some embodiments with multiple PDSCH/PUSCH transmission with different spatial channel character, specific transmission mode configuration supporting flexible transmission schemes matching the specific channel may achieve increased performance gain without limiting configuration overhead.

Aspects of the present disclosure relate to providing a common PDCCH configuration, for the case of monitoring either single or multiple PDCCH. Some implementations of the common configuration can be based on an explicit mechanism of the network informing the UE the parameters of the configuration. Some implementations of the common configuration can be based on an implicit mechanism of the UE determining relevant information about the configuration based on one or more associations with information known to the UE.

In some embodiments, the common configuration utilizes M PDCCH identifiers (M≥2) for each CORESET configuration, wherein each PDCCH identifier indicates two candidate values (e.g. 0/1, on/off, or true/false, etc.) to identify one PDCCH to be monitored in the respective CORESET (Solution 1-2-0). In some embodiments, the common configuration utilizes a single PDCCH identifier for each CORESET configuration, wherein each PDCCH identifier indicates M candidate values (e.g. 1, 2, . . . M) to identify one of maximum M PDCCH (M≥2) to be monitored in the respective CORESET (Solution 1-2-1). For both of these aspects of the disclosure, there can be a single or M individual PDCCH identifiers, or there can be a single or M pairs of PDCCH identifiers where each pair includes an downlink PDCCH identifier and an uplink PDCCH identifier. For embodiments mentioned in this section, the number of PDCCH and association between PDCCH and CORESET are determined by the CORESET configuration. In some embodiments with multiple PDCCH transmission with ideal scheduling coordination, a flexible association between PDCCH and CORESET with multiple identifiers supporting flexible resource allocations for PDCCH may achieve increased performance gain without limiting configuration overhead. In other embodiments with multiple PDCCH transmission with non-ideal scheduling coordination wherein flexible resource allocation for PDCCH is hard to realize, a limited association between PDCCH and CORESET with a single identifier can achieve performance gain without limiting configuration overhead With regard to an explicit mechanism with a separate indication of PDCCH number, in some embodiments, a predefined association is used between PDCCH and CORESET, for example a mapping between PDCCH and CORESET. In some implementations, the association, for example, could be in the form of a table or rule (can be regarded as Solutions 1-3-0). In some other implementations, the association can be also determined by the CORESET configuration. (Solutions 1-3-1 and 1-3-2). For embodiments mentioned in this section, the number of PDCCH is at least explicitly indicated in addition to CORESET configuration. In some embodiments, for some UE with a limited ability to support multiple PDCCH detection, it may not be necessary to support flexible maximum PDCCH number configuration. Then the PDCCH number can be separately configuration with limited flexibility. Moreover, for some UE with limited capability to supporting blind decoding for PDCCH monitoring, a limited association between PDCCH and CORESET can be supported. Then a predefined association can be a better solution without any extra configuration overhead. In some embodiments with multiple PDCCH transmission and with ideal scheduling coordination, a flexible association between PDCCH and CORESET with multiple identifiers supporting flexible resource allocation for PDCCH can achieve increased performance gain without limit configuration overhead. In some embodiments with multiple PDCCH transmission with non-ideal scheduling coordination wherein flexible resource allocation for PDCCH is hard to realize, a limited association between PDCCH and CORESET with a single identifier can achieve performance gain without limiting configuration overhead.

Some aspects of the present disclosure pertain to a monitoring configuration for PDCCH that is not common to all association cases between PDCCH and CORESET. In some embodiments, an explicit configuration is used to indicate to the UE to use a different association between PDCCH and CORESET. For example, with this configuration, different PDCCH can be monitored from different CORESET, otherwise, different PDCCH can be monitored from one same CORESET. (Solution 1-4). In some embodiments, for UEs with a different capability of supporting blind decoding for PDCCH monitoring, different UEs can be configured with specific association between PDCCH and CORESET. Based on a separate association configuration between PDCCH and CORESET for different cases, CORESET configuration does not necessarily need extra information related to association between PDCCH and CORESET.

Some aspects of the present disclosure pertain to utilizing PDCCH specific scrambling to realize interference randomization. In some embodiments, PDCCH identity or index can be used to scramble associated PDCCH/PDCHS/PUSCH channels. (Solution 2-1) In some embodiments, multiple channels simultaneously transmitted from or received by one UE can achieve further interference randomization based on the specific scrambling initial value for the performance gain.

Some aspects of the present disclosure pertain to PUCCH resource configuration for any of PUCCH with common configuration, PUCCH for separate configuration or a hybrid of both common and separate configuration. In some embodiments, at least one PUCCH resource can be associated with at least one PDCCH/PDSCH that is to be monitored within one time interval, such as a slot. (Solutions 3-1 and 3-2) In some embodiments, there is also provided a manner for reporting the PUCCH feedback mode. (Solution 3-3) In some embodiments with multiple PDSCH transmissions with ideal coordination, one PUCCH solution can make full use of the best channel out of multiple channels associated with multiple PDSCH transmissions without any feedback delay. In some embodiments with multiple PDSCH transmissions with non-ideal coordination, one PUCCH may face an unacceptable feedback delay. Separate PUCCH can make full use of a specific best channel for feedback without any feedback delay.

Some aspects of the present disclosure pertain to PUSCH associated CSI-RS measurement feedback in which the different CSI-RS measurement and feedback occurs in separate PUSCH. (Solution 4-1) In some embodiments, a specific association between different PUSCH and different CSI-RS measurements and reports can achieve lower delay. Solution 1-1

Some embodiments of the present disclosure are related to determining a configuration to be used for transmission of multiple PDCCH from a TRP to a UE and for PDCCH monitoring by a UE. An example method includes the TRP determining a transmission mode for at least one PDCCH for PDSCH and/or PUSCH. The determination may be made based on at least one of a single transmission mode configuration that is common for one or more PDCCH or a specific transmission mode configuration for each PDCCH.

In the embodiment of the single transmission mode configuration, the single transmission mode configuration that is common for one or more PDCCH for PDSCH and/or PUSCH can be predefined. In this embodiment, a single transmission mode configuration will be indicated to the UE through one signaling (e.g. RRC). Then UE will assume multiple PDCCH have the same transmission mode configuration from the signaling. FIG. 6A illustrates a representation of a single common transmission mode configuration 510 that is applied for transmitting/monitoring a single PDCCH or multiple PDCCH 515.

In the embodiment of the specific transmission mode (TM) configuration, the specific transmission mode configuration for each PDCCH for PDSCH or PUSCH can be signaled to the UE using a signaling (e.g., RRC signaling), Downlink Control Information (DCI), Media Access Control Control Element (MAC CE). Then UE will assume each PDCCH has one specific transmission mode configuration from the signaling. In some implementations, the specific transmission mode configuration also implies a PDCCH number for PDSCH or PUSCH, or both, within one monitoring occasion (e.g. slot) based on a transmission mode configuration number. In a first example, the UE may be configured for PDSCH with TM1 and TM2, then the number of PDCCH for PDSCH can be determined as 2. In a second example, the UE may be configured for PUSCH with TM3 and TM4, then the number of PDCCH for PUSCH can be determined as 2. It may be that TM1 and TM2 are equivalent to TM3 and TM4, respectively, in the first and second examples, but that is not always the case.

FIG. 6B illustrates a representation of two separate transmission mode configurations that are applied for transmitting/monitoring a respective PDCCH, i.e. TM configuration 1 520 used for PDCCH1 525 and TM configuration 2 530 used for PDCCH2 535.

Figure 17:
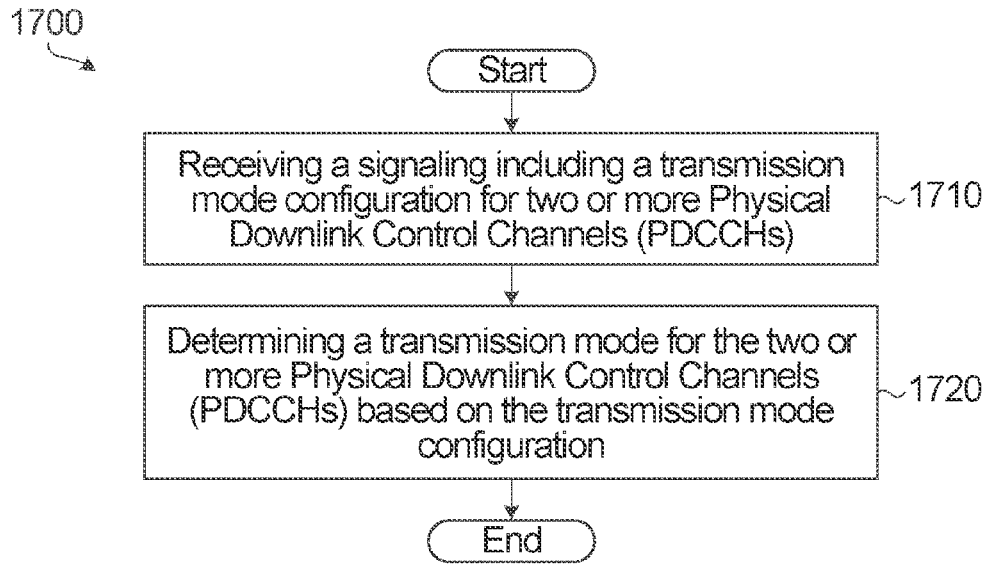
FIG. 17 is a flow chart describing a method according to an aspect of the disclosure.

FIG. 17 is a flow chart describing a method according to an aspect of the present application. Step 1710 involves receiving a signaling including a transmission mode configuration for two or more Physical Downlink Control Channels (PDCCHs). Step 1720 involves determining a transmission mode for the two or more Physical Downlink Control Channels (PDCCHs) based on the transmission mode configuration.

In some embodiments, the transmission mode configuration is common for two or more PDCCHs.

In some embodiments, the transmission mode is predefined.

In some embodiments, the transmission mode configuration indicates a respective transmission mode for each of the two or more PDCCHs.

In some embodiments, the transmission mode is different for each of the at least one PDCCH for PDSCH or PUSCH.

In some embodiments, the received transmission mode configuration is signaled using at least one of Radio Resource Control (RRC) signaling, Downlink Control Information (DCI), Media Access Control Control Element (MAC CE).

In some embodiments, a device that performs methods described above is an electronic device, such as a UE or baseband chip. A general example of such a device is described in FIG. 3A.

With regard to the implementation details of the transmission mode configuration, reference can be made to the above-discussed embodiments, with their combination and modification falling within the scope of the present application.

Solution 1-2-0

Some embodiments of the present disclosure are related to a UE monitoring one or more PDCCH for PDSCH and/or PUSCH within a monitoring occasion (e.g. slot). It is to be understood that the monitoring occasion could be a subslot (less than a slot) or multiple slots, or some other time duration. The slot can be a time duration definition. Moreover, based on CORESET configuration, the UE determines the number of PDCCH and an association between PDCCH and CORESET that should be clear for monitoring PDCCH for PDSCH and/or PUSCH.

In some implementations, the UE monitors an integer value P of PDCCH, where P is greater than or equal to one, within a monitoring occasion. The PDCCH that are being monitored can be configured for PDSCH or PUSCH, or both, within at least one CORESET. The at least one CORESET can be associated with one search space type (e.g. UE specific). Each CORESET configuration may include M PDCCH identifiers (PDCCHIdx), where M≥2 such that the M PDCCH identifiers may be defined as PDCCHIdxm, m={1 ... M}. In these implementations, each PDCCH identifier is used to indicate if a respective PDCCH (PDCCH with index m) should be monitored in a particular CORESET wherein each PDCCH identifier can indicate two candidate values (e.g. 0/1, on/off, or true/false, etc). If M=2, a maximum of 2 PDCCHs can be configured to be monitored in a particular CORESET. More generally, M can be greater than 2. Then, based on one exact value of a PDCCH identifier, i.e. PDCCHIdxm, PDCCH with index m, a particular one of the two PDCCH can be indicated to be monitored or not monitored. Moreover, this CORESET configuration including 2 PDCCH identifiers can be signaled to the UE with a signaling, e.g. a RRC signaling, then the UE monitors one PDCCH from the specific CORESET according to the associated identifier value. The CORESET configuration with M PDCCH identifiers can also imply that the exact number P of PDCCH for monitoring is not larger than M. One COREST can be configured to monitor one or more PDCCHs.

Based on an association between the CORESET and the PDCCH identifiers, the UE can monitor the mth PDCCH from all CORESET for which the PDCCH identifier PDCCHIdxm indicates that the mth PDCCH should be monitored. In a particular example, if PDCCHIdxm=1, then the UE should monitor the mth PDCCH and if PDCCHIdxm=0, the UE should not monitor the mth PDCCH. The value P is equal to the total number of all indexes m for which PDCCHIdxm=1 from all CORESET, i.e. PDCCH that are to be monitored. In a first example, for two CORESET with M=2 PDCCH identifiers, PDCCHIdx1 and PDCCHIdx2, a value of two PDCCH identifiers from two CORESET configurations are explained as {(PDCCHIdx1=1, PDCCHIdx2=0), (PDCCHIdx1=1, PDCCHIdx2=0)} indicates only PDCCH1 is to be monitored in both CORESET, meanwhile P=1. In a second example, for two CORESET a configuration of PDCCH identifiers {(PDCCHIdx1=1, PDCCHIdx2=1), (PDCCHIdx1=1, PDCCHIdx2=0)} indicates PDCCH1 is to be monitored in both CORESET and PDCCH2 is to be monitored in only the first CORESET, meanwhile P=2. In a third example, for two CORESET a configuration of PDCCH identifiers {(PDCCHIdx1=1, PDCCHIdx2=0), (PDCCHIdx1=0, PDCCHIdx2=1)} indicates PDCCH1 is to be monitored in only the first CORESET and PDCCH2 is to be monitored in only second CORESET meanwhile P=2;

If the UE is configured to monitor the PDCCH for PDSCH, then the UE monitors P PDCCH for PDSCH. If the UE is configured to monitor the PDCCH for PUSCH, then the UE monitors P PDCCH for PUSCH.

In some implementations, the PDCCH configuration for PDSCH and PUSCH is a common configuration for both PDSCH and PUSCH.

In some embodiments, each PDCCH can be associated with one, more than one, or all of the CORESET. Downlink and uplink components of the PDCCH can share the same CORESET configuration.

FIGS. 7A to 7E illustrate multiple examples of the relationship between one or more CORESET, one or more PDCCH, and one or more PDCCH identifiers, where M is equal to 2, i.e. there are a maximum of two PDCCHs that can be monitored in a given CORESET. Therefore, there are two PDCCH identifiers, PDCCHIdx1 associated with a first PDCCH (PDCCH1) and PDCCHIdx2 associated with a second PDCCH (PDCCH2).

Figure 7A:
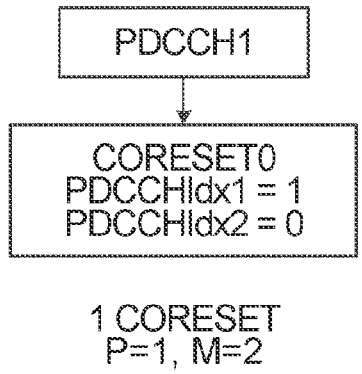
FIGS. 7A to 7E illustrate examples of associations between PDCCH, Control Resource Sets (CORESET) and PDCCH identifiers, where a number of PDCCH is equal to 2, which can be used for configuring user equipment (UE) with a common configuration.

FIG. 7A illustrates an example of a single CORESET (CORESET0) having a single PDCCH (PDCCH1) that is to be monitored. A second PDCCH2 does not need to be monitored in CORESET0. Since only PDCCH1 needs to be monitored, PDCCHIdx1=1 (monitor) and PDCCHIdx2=0 (do not monitor).

Figure 7B:
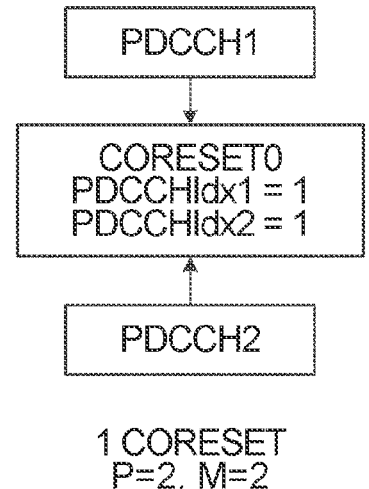

FIG. 7B illustrates an example of a single CORESET (CORESET0) having two PDCCH (PDCCH1 and PDCCH2) that are to be monitored. Since both PDCCH1 and PDCCH2 need to be monitored, PDCCHIdx1=1 (monitor) and PDCCHIdx2=1 (monitor).

Figure 7C:
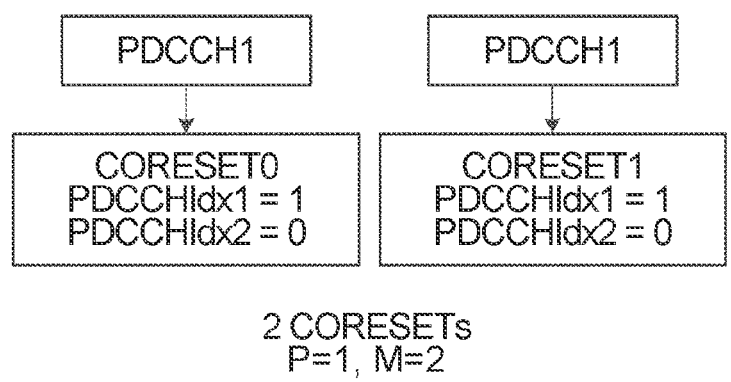

FIG. 7C illustrates an example of two CORESET (CORESET0 and CORESET1) for which only one PDCCH (PDCCH1) is to be monitored. For CORESET0, PDCCH1 needs to be monitored so PDCCHIdx1=1 (monitor) and PDCCH2 does not need to be monitored so PDCCHIdx2=0 (do not monitor). For CORESET1, again PDCCH1 needs to be monitored so PDCCHIdx1=1 (monitor) and PDCCH2 does not need to be monitored so PDCCHIdx2=0 (do not monitor).

Figure 7D:
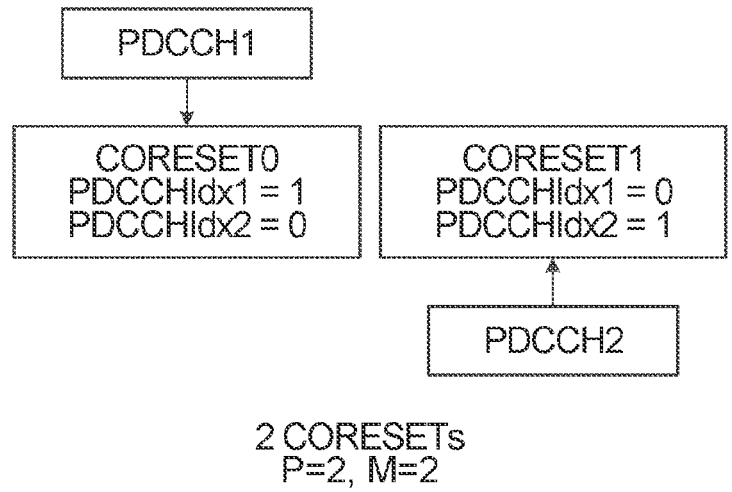

FIG. 7D illustrates an example of two CORESET (CORESET0 and CORESET1) each having a respective PDCCH (PDCCH1 for CORESET0 and PDCCH2 for CORESET1) that is to be monitored. For CORESET0, PDCCH1 needs to be monitored so PDCCHIdx1=1 (monitor) and PDCCH2 does not need to be monitored so PDCCHIdx2=0 (do not monitor). For CORESET1, PDCCH1 does not need to be monitored so PDCCHIdx1=0 (do not monitor) and PDCCH2 needs to be monitored so PDCCHIdx2=1 (monitor).

Figure 7E:
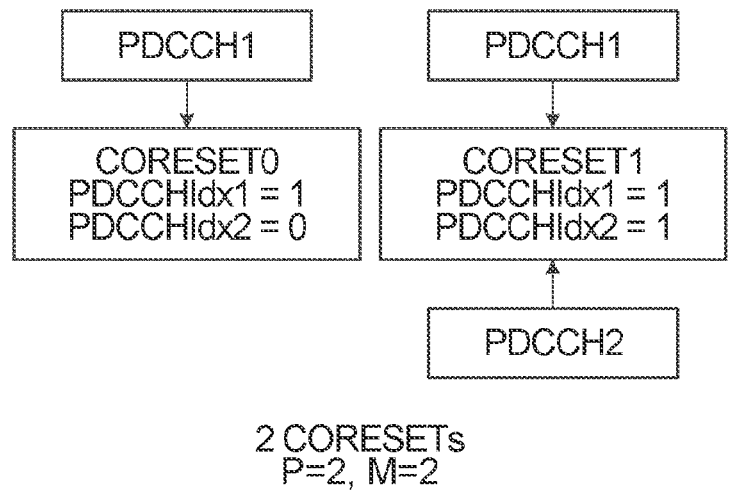

FIG. 7E illustrates an example of two CORESET (CORESET0 and CORESET1) in which CORESET0 has PDCCH1 to be monitored and CORESET1 has both PDCCH1 and PDCCH2 that are to be monitored. For CORESET0, PDCCH1 needs to be monitored so PDCCHIdx1=1 (monitor) and PDCCH2 does not need to be monitored so PDCCHIdx2=0 (do not monitor). For CORESET1, since both PDCCH1 and PDCCH2 need to be monitored, PDCCHIdx1=1 (monitor) and PDCCHIdx2=1 (monitor).

FIGS. 8A to 8E illustrates multiple examples of the relationship between one or more CORESET, one or more PDCCH, and one or more PDCCH identifiers, for a maximum of M PDCCHs that can be monitored in a given CORESET. The examples in FIGS. 8A to 8E generally correspond to the examples shown in FIGS. 7A to 7E, except there are M PDCCH identifiers that are set to either 0 or 1, depending if the PDCCH is to be monitored or not.

The examples shown in FIGS. 7A to 7E and 8A to 8E are non-exhaustive examples and one skilled in the art would understand how further permutations could be defined based on the provided examples.

Figure 9:
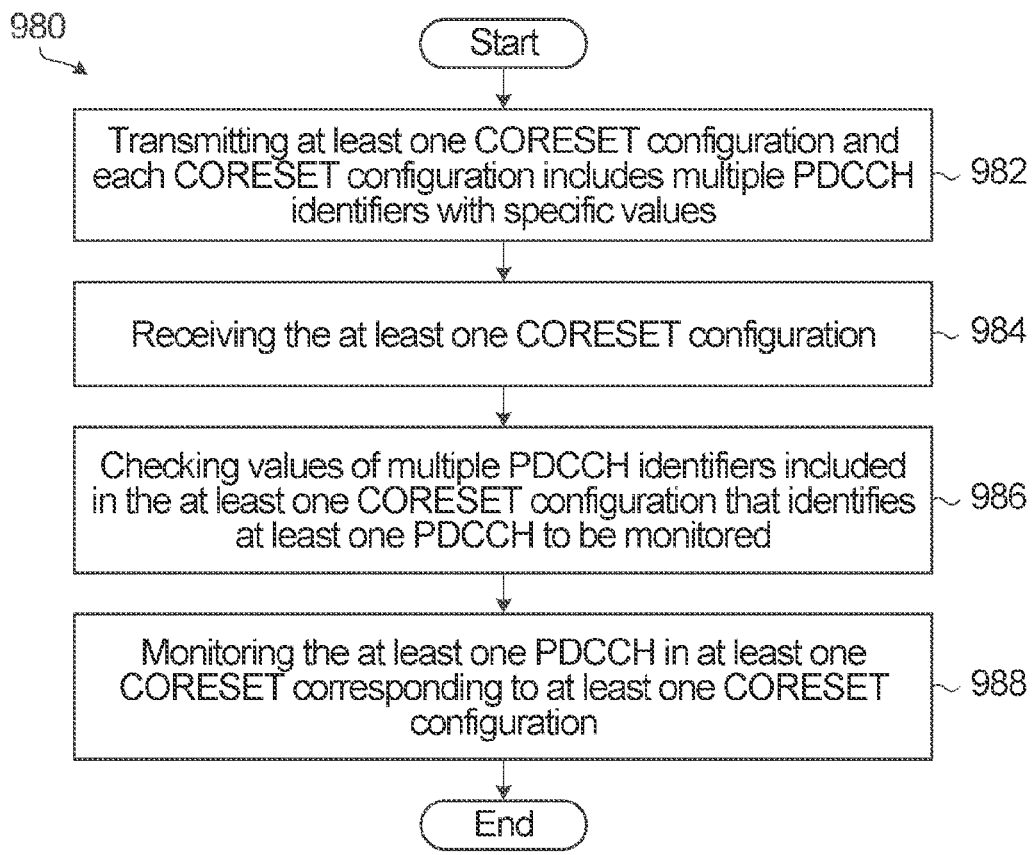
FIG. 9 is a flow chart describing operation of a network that includes configuring the UE to monitor the appropriate PDUCCH.

FIG. 9 is an example of a flow chart 980 in which steps are performed by multiple components of a network. In step 982, a network side device transmits at least one CORESET configuration and each CORESET configuration includes multiple PDCCH identifiers with specific values. The at least one CORESET configuration may be transmitted in a signaling, e.g., RRC signaling. In step 984, a UE receives the at least one CORESET configuration. In step 986, the UE checks values of multiple PDCCH identifiers included in the at least one CORESET configuration that identifies at least one PDCCH to be monitored. In step 988, the UE monitors the at least one identified PDCCH in at least one CORESET corresponding to the least one CORESET configuration. The implementation details of the CORESET configuration may be referred to the embodiments as discussed above.

In some embodiments, a device that performs a method described above is an electronic device, such as a UE, or a network device, such as a base station. A general example of such a device is described in FIG. 3A and FIG. 3B.

Other embodiments include the UE monitoring $P_{DL}$ PDCCH and $P_{UL}$ PDCCH within the monitoring occasion for PDSCH/PUSCH from at least one CORESET, wherein each CORESET configuration may include two sets of M PDCCH identifiers (PDCCHIdx), where M≥1 such that the PDCCHDLIdxm, m=1, ..., M and PDCCHULIdxm, m=1, ..., M. In such an implementation, the downlink and uplink components of the PDCCH have separate CORESET configurations based on a specific set of M PDCCH identifiers. The CORESET is associated with one search space type.

In some implementations, the UE can monitor the mth PDCCH for PDSCH from all CORESET for which the PDCCH identifier PDCCHIdxm indicates that the mth PDCCH, should be monitored. For example, if PDCCHDLIdxm=1, then the UE should monitor the mth PDCCH for PDSCH and if PDCCHDLIdxm=0, the UE should not monitor the mth PDCCH. If PDCCHULIdxm=1, then the UE should monitor the mth PDCCH for PUSCH and if PDCCHULIdxm=0, the UE should not monitor the mth PDCCH. $P_{DL}$ equals of all indexes m for PDCCHDLIdxm=1 for PDSCH and $P_{UL}$ equals the total number of all indexes m for PDCCHULIdxm=1 for PUSCH from all CORESET.

If configured to monitor PDCCH for PDSCH, the UE monitor $P_{DL}$ PDCCH for PDSCH. If configured to monitor PDCCH for PUSCH, the UE monitors $P_{UL}$ PDCCH for PUSCH.

In some embodiments, the PDCCH configuration for PDSCH and PUSCH are separate configurations for both PDSCH and PUSCH.

Figure 10A:
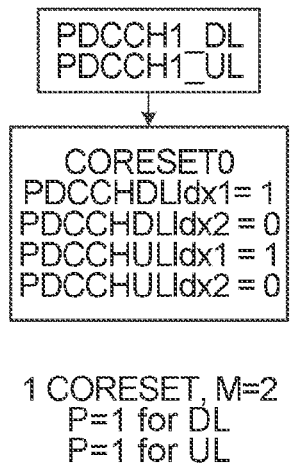
FIGS. 10A to 10C illustrate examples of associations between PDCCH, CORESET and PDCCH identifiers, wherein the number of downlink (DL) and uplink (UL) PDCCH is equal to M, which can be used for configuring UE with a common configuration.
Figure 10B:
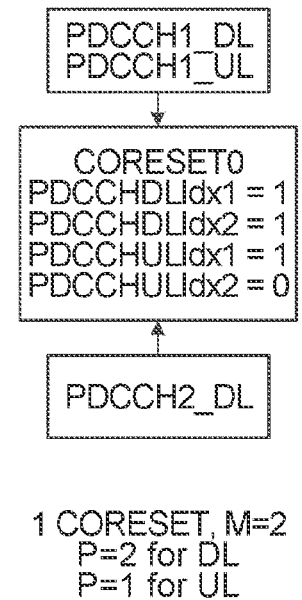
Figure 10C:
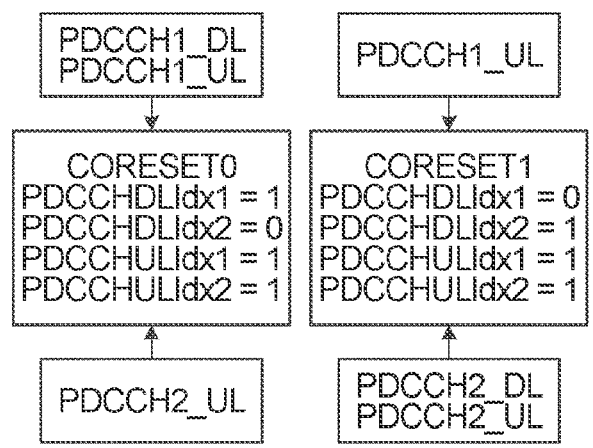

FIGS. 10A to 10C illustrate multiple examples of the relationship between one or more CORESET, one or more PDCCH, and one or more PDCCH identifiers, where M is equal to 2, i.e. there are a maximum of two PDCCHs that can be monitored for UL and a maximum of two PDCCHs that can be monitored for DL within a particular CORESET. Therefore, there are four PDCCH identifiers, PDCCHDLIdx1 and PDCCHULIdx1 associated with a first PDCCH (PDCCH1_DL or PDCCH1_UL) and PDCCHDLIdx2 and PDCCHULIdx2 associated with a second PDCCH (PDCCH2_DL or PDCCH2_UL).

FIG. 10A illustrates an example of a single CORESET (CORESET0) having a first PDCCH1 with DL information (PDCCH1_DL) and UL information (PDCCH1_UL) to be monitored. A second PDCCH2 with DL information (PDCCH2_DL) and UL information (PDCCH2_UL) are not to be monitored. Since there are PDCCH1_UL and PDCCH1_DL to be monitored, PDCCHDLIdx1=1 (monitor) and PDCCHULIdx1=1 (monitor). As there is no second PDCCH2 (i.e. PDCCH2_DL and PDCCH2_UL) to monitor, then PDCCHDLIdx2=0 (do not monitor) and PDCCHULIdx2=0 (do not monitor).

FIG. 10B illustrates an example of a single CORESET (CORESET0) having a first PDCCH1 with DL information (PDCCH1_DL) and UL information (PDCCH1_UL) to be monitored and a second PDCCH2 with DL information (PDCCH2_DL) to be monitored. Since there are PDCCH1_UL, PDCCH1_DL and PDCCH2_DL that need to be monitored, PDCCHDLIdx1=1 (monitor) PDCCHULIdx1=1 (monitor), and PDCCHDLIdx2=1 (monitor). As there is no PDCCH1_UL to be monitored, PDCCHULIdx2=0 (do not monitor). FIG. 8C illustrates an example of two CORESET (CORESET0 and CORESET1). For CORESET0, a first PDCCH1 with DL information (PDCCH1_DL) and UL information (PDCCH1_UL) are to be monitored and a second PDCCH2 with UL information (PDCCH2_UL) is to be monitored. Since there are PDCCH1_UL, PDCCH1_DL and PDCCH2_UL that need to be monitored, PDCCHDLIdx1=1 (monitor), PDCCHULIdx1=1 (monitor), and PDCCHULIdx2=1 (monitor). As there is no PDCCH2_DL to be monitored, PDCCHDLIdx2=0 (do not monitor). For CORESET1, a first PDCCH1 with UL information (PDCCH1_UL) is to be monitored and a second PDCCH2 with DL information (PDCCH2_DL) and UL information (PDCCH2_UL) are to be monitored. Since there are PDCCH1_UL, PDCCH2_DL and PDCCH2_UL that need to be monitored, PDCCHULIdx1=1 (monitor) PDCCHDLIdx2=1 (monitor), and PDCCHULIdx2=1 (monitor). As there is no PDCCH1_DL to be monitored, PDCCHDLIdx1=0 (do not monitor).

Figures 11A, 11B, 11C:
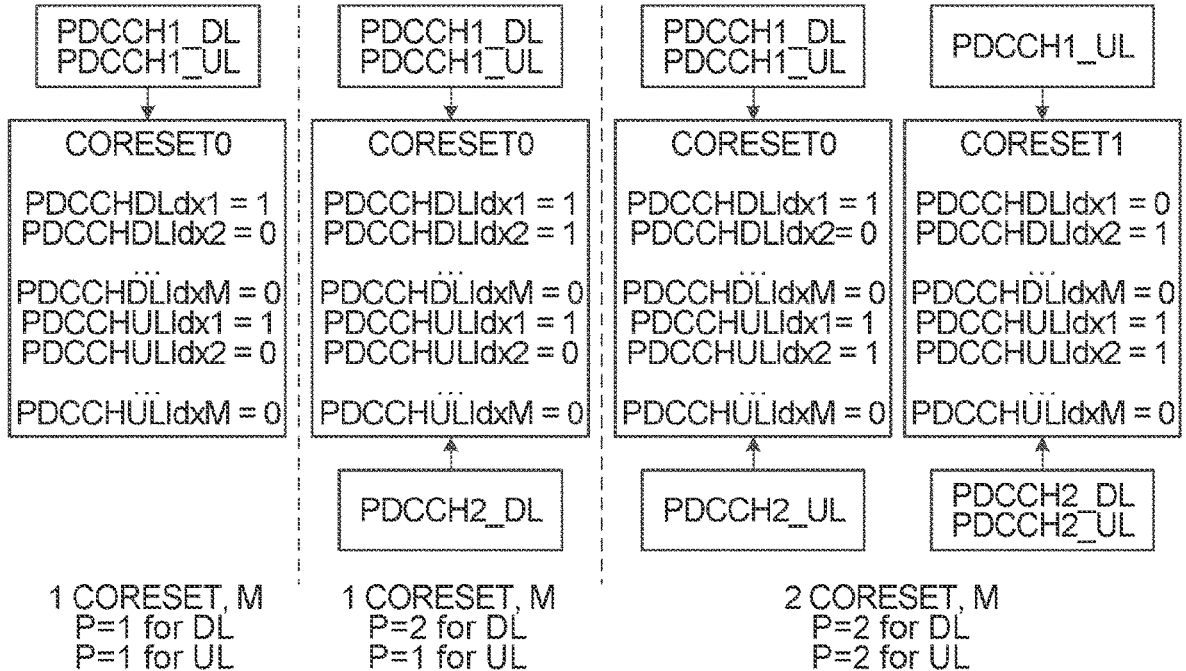
FIGS. 11A to 11D illustrate examples of associations between PDCCH, CORESET and PDCCH identifiers, wherein the number of DL and UL PDCCH is equal to M, which can be used for configuring UE with a common configuration.
Figure 11D:
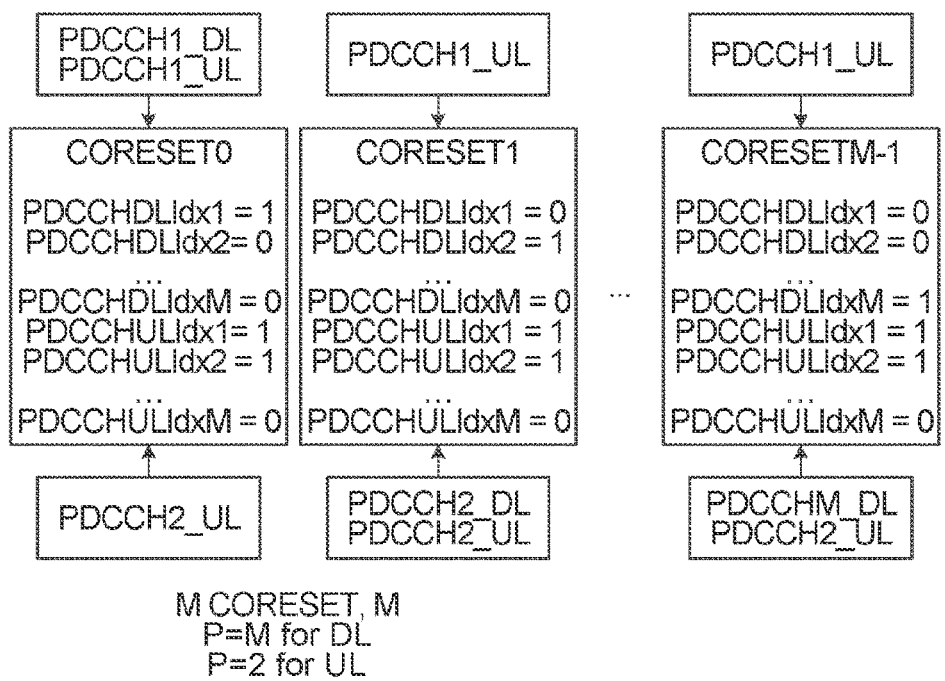

FIGS. 11A to 11D illustrates multiple examples of the relationship between one or more CORESET, one or more PDCCH, and one or more PDCCH identifiers, for a maximum of M PDCCHs that can be monitored in a given CORESET. The first three of the examples in FIGS. 11A to 11C generally correspond to the examples shown in FIGS. 10A to 10C, except there are M PDCCH identifiers for each of UL and DL that are set to either 0 or 1, depending if the PDCCH is to be monitored or not. FIG. 11D illustrates a scenario in which there are M CORESET and up to M PDCCH that could be monitored for UL or DL, or both.

The examples shown in FIGS. 10A to 10C and 11A to 11D are non-exhaustive examples and one skilled in the art would understand how further permutations could be defined based on the provided examples.

Solution 1-2-1

Other embodiments include the UE monitoring P PDCCH within a monitoring occasion (e.g. slot) for PDSCH and/or PUSCH from at least one CORESET. In some implementations, each CORESET configuration includes a single PDCCH identifier, i.e. PDCCHIdx, wherein each PDCCH identifier can indicate M candidate values (e.g. 1, 2, ... M, M≥1). There can be a maximum M PDCCH that could be monitored from all CORESET, but in some instances only a single PDCCH may be monitored per CORESET. One exact value of a single PDCCH identifier, m is used to indicate if a PDCCH with index m should be monitored in a particular CORESET. Actually, the number of PDCCH to monitor, P is determined by the total number of PDCCH identifiers with different values from all configured CORESET. Moreover, this configuration can be signaled with RRC. The RRC can also imply that the exact number P of PDCCH for monitoring is not larger than M.

The PDCCH identifier PDCCHIdx=m is used to indicate the PDCCH with index m (1≤m≤M) should be monitored in a given CORESET. In a first example, for two CORESET with M=2 PDCCH identifiers, a configuration of PDCCH identifiers defined as {PDCCHIdx=1, PDCCHIdx=1)} indicates only PDCCH1 needs to be monitored from both two CORESET meanwhile P=1. In a second example, for two CORESET with M=2 PDCCH identifiers, a configuration of PDCCH identifiers defined as {PDCCHIdx=1, PDCCHIdx=2)} indicates PDCCH1 is to be monitored from only the first CORESET and PDCCH2 is to be monitored from only the second CORESET, meanwhile P=2. In a third example, for two CORESET with M=2 PDCCH identifiers, a configuration of PDCCH identifiers defined as {PDCCHIdx=2, PDCCHIdx=2)} indicates only PDCCH2 needs to be monitored from both CORESET, meanwhile P=1. It can be understood that the configuration for this third example is the same as the first example, because the UE may regard P PDCCH with a continuous index starting from 1 to P (P≤M).

In some embodiments, when the UE is configured to monitor PDCCH for PDSCH, the UE monitors P PDCCH for PDSCH. In some embodiments, when the UE is configured to monitor PDCCH for PUSCH, the UE monitors P PDCCH for PUSCH.

In some implementations, the PDCCH configuration for PDSCH and PUSCH are a common configuration for both PDSCH and PUSCH.

Figure 12A:
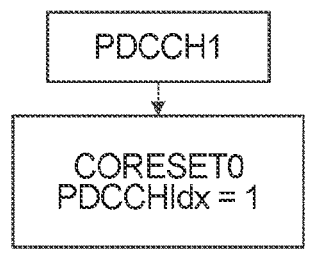
FIGS. 12A to 12C illustrate examples of associations between PDCCH, CORESET and PDCCH identifiers, wherein the number of PDCCH is equal to 2, which can be used for configuring UE with a common configuration.
Figure 12B:
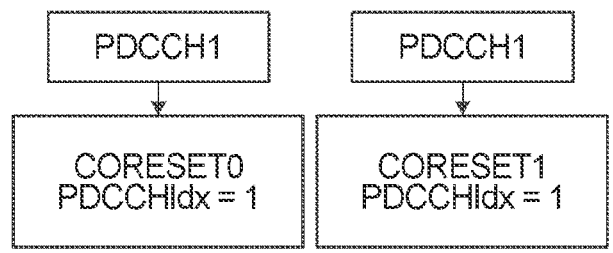
Figure 12C:
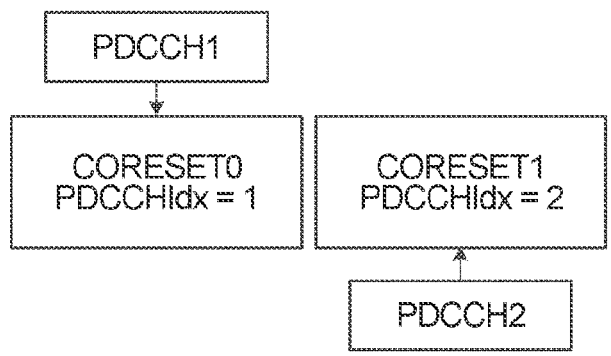

FIGS. 12A to 12C illustrate multiple examples of the relationship between one or more CORESET, one or more PDCCH, and one or more PDCCH identifiers, where M is equal to 2, i.e. there are a maximum of two PDCCHs that can be monitored, but only one per CORESET. Therefore, there is a single PDCCH identifier, PDCCHIdx associated with each of two PDCCH (PDCCH1 and PDCCH2).

FIG. 12A illustrates an example of a single CORESET (CORESET0) having a first PDCCH (PDCCH1) to be monitored. Since there is only PDCCH1 that needs to be monitored, PDCCHIdx=1 (monitor PDCCH1).

FIG. 12B illustrates an example of two CORESET (CORESET0 and CORESET1). For both CORESET0 and CORESET1, PDCCH1 is to be monitored. Therefore, for both CORESET0 and CORESET1, PDCCHIdx=1 (monitor PDCCH1).

FIG. 12C illustrates an example of two CORESET (CORESET0 and CORESET1). For CORESET0, PDCCH1 is to be monitored and for CORESET1, PDCCH2 is to be monitored. Therefore, for CORESET0, PDCCHIdx=1 (monitor PDCCH1) and for CORESET1, PDCCHIdx=2 (monitor PDCCH2).

The three examples shown in FIGS. 12A to 12C are non-exhaustive examples and one skilled in the art would understand how further permutations could be defined based on the particular examples.

Figure 12D:
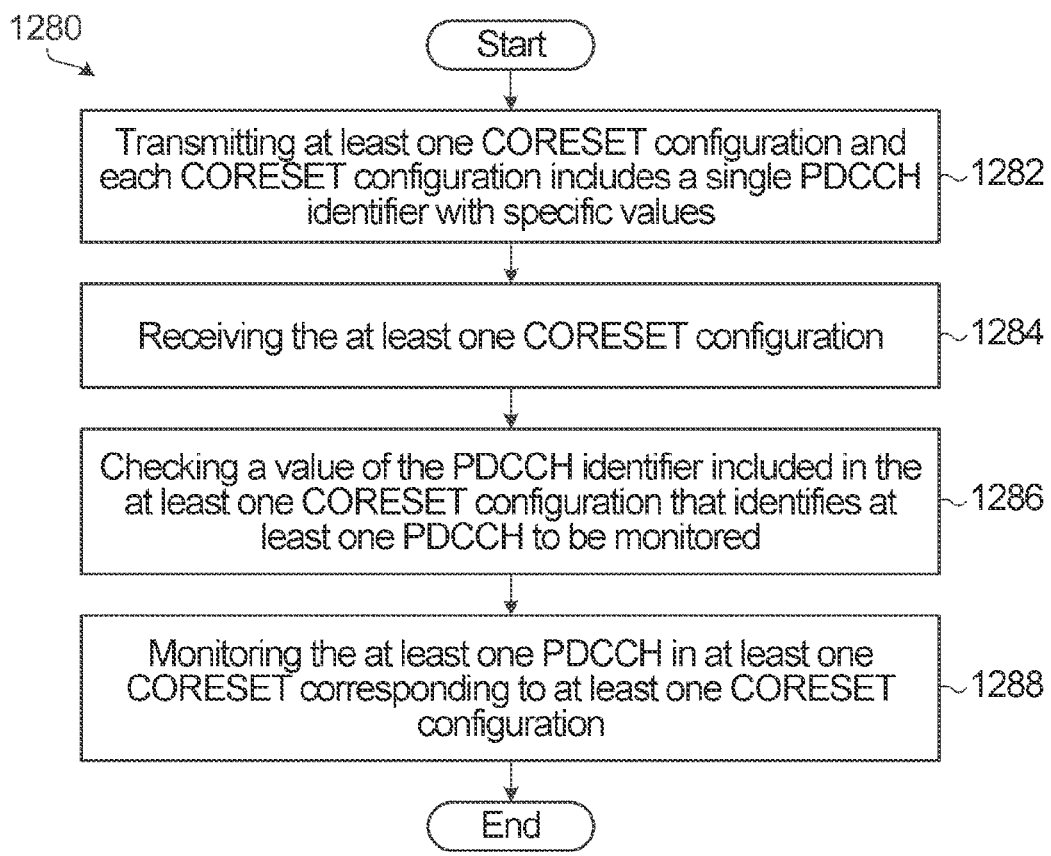
FIG. 12D is a flow chart describing operation of a network that includes configuring the UE to monitor the appropriate PDUCCH.

FIG. 12D is an example of a flow chart 1280 in which steps are performed by multiple components of the network. The example of FIG. 12D is for a scenario of M=2, i.e. there are only two PDCCH that could be monitored. In step 1282, a network side device transmits at least one CORESET configuration and each CORESET configuration includes a single PDCCH identifier with specific values. In step 1284, a UE receives the at least one CORESET configuration. In step 1286, the UE checks a value of the PDCCH identifier included in the at least one CORESET configuration that identifies at least one PDCCH to be monitored. In step 1288, the UE monitors the at least one PDCCH in at least one CORESET corresponding to at least one CORESET configuration. In step 1288, the UE monitors PDCCH1 from all CORESET with a PDCCHIdx=1 or PDCCH2 from all CORESET with a PDCCHIdx=2, or both. More generally, if there were more PDCCH that could be monitored, then there would be a larger number of PDCDH identifiers. The implementation details of the CORESET configuration may be referred to the embodiments as discussed above.

In some embodiments, a device that performs a method described above is an electronic device, such as a UE, or a network device, such as a base station. A general example of such a device is described in FIG. 3A and FIG. 3B.

In another implementation, each CORESET configuration includes two PDCCH identifiers one for downlink and one for uplink, i.e. PDCCHDLIdx and PDCCHULIdx wherein different PDCCH identifiers may indicate the same or a different candidate value. For example, the same candidate value can be (1, 2, ... M), M≥1 while a different candidate value can be (1, 2, ... M1, M1≥1) and (1, 2, ... M2, M2≥1) for DL and UL respectively. In a case where M=2, a first PDCCH, PDCCH1, has an associated PDCCH DL identifier PDCCHDLIdx=1 and an associated PDCCH UL identifier PDCCHULIdx=1. A second PDCCH, PDCCH2, has an associated PDCCH DL identifier PDCCHDLIdx=2 and an associated PDCCH UL identifier PDCCHULIdx=2. The PDCCH DL and UL identifiers can each be equal to either 1 or 2.

In a particular example for M=2, the UE monitors PDCCH1 from all CORESET with an identifier PDCCHDLIdx=1 for PDSCH and/or PDCCH2 from all CORESET with an identifier PDCCHDLIdx=2 for PDSCH. The UE monitors PDCCH1 from all CORESET with an identifier PDCCHULIdx=1 for PUSCH and/or PDCCH2 from all CORESET with an identifier PDCCHULIdx=2 for PUSCH.

The value of P is equal to the total number of all of the different PDCCHDLIdx (i.e. P_DL) or PDCCHULIdx (i.e. P_UL) for a given group of CORESET. For example, P_DL is equal to 1 for a group of CORESET with only PDCCHDLIdx=1 or PDCCHDLIdx=2. P_DL is equal to 2 for a group of CORESET that have at least one CORESET with PDCCHDLIdx=1 and at least one CORESET with PDCCHDLIdx=2.

In some embodiments, when the UE is configured to monitor PDCCH for PDSCH, the UE monitors P PDCCH for PDSCH. In some embodiments, when the UE is configured to monitor PDCCH for PUSCH, the UE monitors P PDCCH for PUSCH In some implementations, the PDCCH configuration for PDSCH and PUSCH are separate configurations for both PDSCH and PUSCH.

FIGS. 13A and 13B illustrate multiple examples of the relationship between one or more CORESET, one or more PDCCH, and one or more PDCCH identifiers, where M is equal to 2, i.e. there are a maximum of two PDCCHs that can be monitored, for UL and DL. Therefore, there are two PDCCH identifiers, PDCCHDLIdx associated with either a first PDCCH (PDCCH1_DL) or a second PDCCH (PDCCH2_DL) for PDSCH and PDCCHULIdx associated with the first PDCCH (PDCCH1_UL) or the second PDCCH (PDCCH2_UL) for PUSCH.

FIG. 13A illustrates an example of a single CORESET (CORESET0) having a first PDCCH1 with DL information (PDCCH1_DL) and UL information (PDCCH1_UL) to be monitored. Since there are PDCCH1_UL and PDCCH1_DL that need to be monitored, PDCCHDLIdx=1 (monitor PDCCH1_DL) and PDCCHULIdx=1 (monitor PDCCH1_UL).

FIG. 13B illustrates an example of two CORESET (CORESET0 and CORESET1). For CORESET0, a first PDCCH1 with DL information (PDCCH1_DL) and UL information (PDCCH1_UL) are to be monitored. Since there are PDCCH1_UL and PDCCH1_DL that need to be monitored, PDCCHDLIdx=1 (monitor PDCCH1_DL) and PDCCHULIdx=1 (monitor PDCCH1_UL). For CORESET1, a first PDCCH1 with UL information (PDCCH1_UL) is to be monitored and a second PDCCH2 with DL information (PDCCH2_DL) is to be monitored. Since there are PDCCH1_UL and PDCCH2_DL that need to be monitored, PDCCHULIdx=1 (monitor PDCCH1_UL) and PDCCHDLIdx=2 (monitor PDCCH2_DL).

The two examples shown in FIGS. 13A and 13B are non-exhaustive examples and one skilled in the art would understand how further permutations could be defined based on the particular examples.

Figure 18:
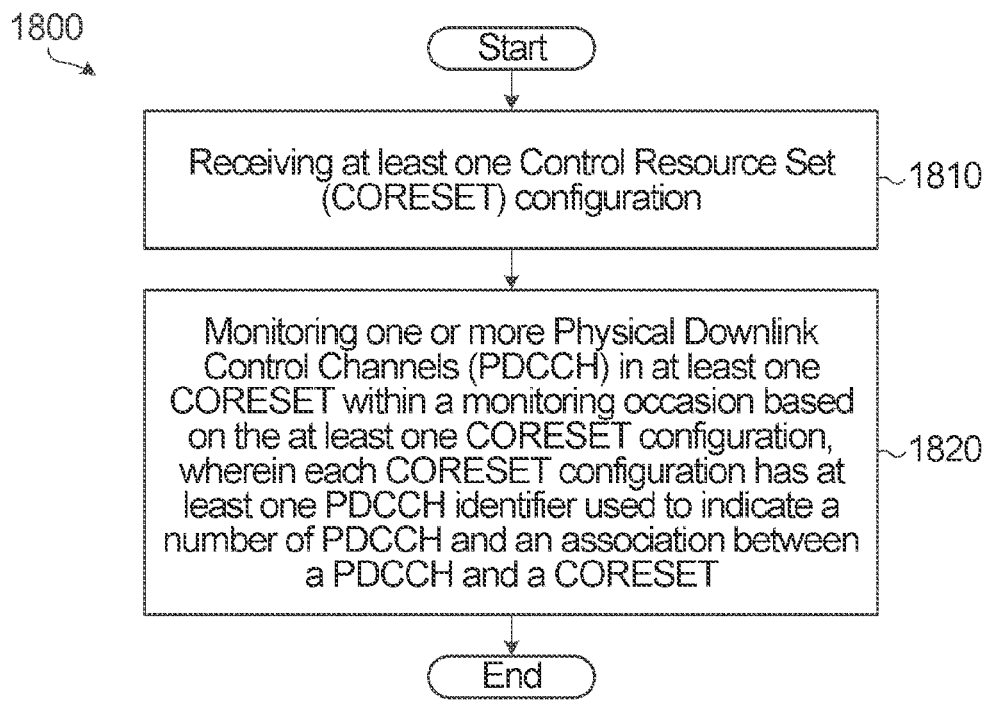
FIG. 18 is a flow chart describing a method according to another aspect of the disclosure.

FIG. 18 is a flow chart describing a method according to an aspect of the present application. Step 1810 involves receiving at least one Control Resource Set (CORESET) configuration. Step 1820 involves monitoring one or more Physical Downlink Control Channels (PDCCH) in at least one CORESET within a monitoring occasion based on the at least one CORESET configuration. Each CORESET configuration has at least one PDCCH identifier used to indicate a number of PDCCH and an association between a PDCCH and a CORESET.

In some embodiments, one PDCCH identifier includes one PDCCH identifier which is common for PDSCH and PUSCH.

In some embodiments, one PDCCH identifier includes one PDCCH identifier set including one specific PDCCH identifier for PDSCH and one specific PDCCH identifier for PUSCH.

In some embodiments, at least one PDCCH identifier of each CORESET configuration refers to M PDCCH identifiers, where M is an integer≥1, and each of the M PDCCH identifiers is used to indicate whether a particular PDCCH of the maximum M PDDCH is monitored or is not monitored in the CORESET.

In some embodiments, each of the M PDCCH is associated with one specific PDCCH identifier of the M PDCCH identifiers.

In some embodiments, each of the M PDCCH is indicated to be monitored, or not, based on the value of the associated PDCCH identifier configured for each CORESET.

In some embodiments, the value of the associated PDCCH identifier is set as any one of: 0/1; on/off; or true/false.

In some embodiments, each of the M PDCCH is indicated to be monitored in all configured CORESET with the value of PDCCH identifier associated with the specific PDCCH is any one of: 1; on or true.

In some embodiments, a number P of PDCCH which needs to be monitored in one monitoring occasion equals to the total number of different PDCCH which is configured to be monitored in at least one CORESET.

In some embodiments, the at least one associated PDCCH identifier of each CORESET configuration is a single PDCCH identifier that indicates that a single PDCCH associated with a specific value of the single PDCCH identifier is to be monitored in the CORESET.

In some embodiments, the at least one associated PDCCH identifier of each CORESET configuration is a single PDCCH identifier that indicates that a single PDCCH associated with a specific value of the single PDCCH identifier is to be monitored in the CORESET.

In some embodiments, a single PDCCH identifier of each CORESET configuration is configured with one specific value out of M different values, where M is an integer≥1, which are used to indicate the maximum M PDDCH that may be monitored in at least one CORESET configured for one search space type.

In some embodiments, each of the M PDCCH is associated with one specific value of the single PDCCH identifier.

In some embodiments, M different values of the single PDCCH identifier are 1, . . . , M.

In some embodiments, each of the M PDCCH is indicated to be monitored in at least one CORESET which has the PDCCH identifier value associated for the specific PDCCH, otherwise, the PDCCH is not monitored.

In some embodiments, a number P of PDCCH to be monitored in one monitoring occasion equals a total number of different PDCCH which are configured to be monitored in at least one CORESET.

In some embodiments, the single PDCCH identifier includes one PDCCH identifier which is common for Physical Downlink Shared Channel (PDSCH) and Physical Uplink Shared Channel (PUSCH).

In some embodiments, the single PDCCH identifier includes a PDCCH identifier set including a specific PDCCH identifier for PDSCH and a specific PDCCH identifier for PUSCH.

In some embodiments, a device that performs methods described above is an electronic device, such as a UE or baseband chip. A general example of such a device is described in FIG. 3A.

With regard to the implementation details of the CORESET configuration, reference can be made to the above-discussed embodiments, with their combination and modification falling within the scope of the present application.
Solution 1-3-1

Some embodiments of the present disclosure are related to a UE determining an association between PDCCH for PDSCH or PUSCH, or both, and CORESET and the number PDCCHNum of PDCCH for PDSCH and PUSCH is explicitly indicated in addition to CORESET configuration. PDCCHNum is the same as the variable P mentioned in the previous embodiments and is common to both PDSCH and PUSCH.

In some embodiments, the association between PDCCH and CORESET may be based on a CORESET configuration including Solution 1-1 and Solution 1-2-1, as described above, where P and M are always the same or equal to PDCCHNum.

In some embodiments, the association between PDCCH and CORESET can be predefined based on one rule determined by at least one of PDCCH number P and the number of all CORESET configured for one search space type (e.g. UE-specific). In a particular example, a predefined rule can be based on two features. A first feature is that all CORESET may be split into non-overlapping P CORESET sets wherein each CORESET set with a specific index p (e.g. 1, ... P) has at least one CORESET, and at least two CORESET from different CORESET sets have continuous CORESET indices and/or CORESET configuration indices. A second feature is that each PDCCH with specific PDCCHIdx=p (e.g. 1, ... , P) is associated with specific COREST set p. This means different PDCCH can be monitored from different CORESET sets. This example also implies that one PDCCH can be monitored from all CORESET if P=1.

In some embodiments, the association between PDCCH and CORESET can be predefined based on a mapping table determined by at least one of PDCCH number P and number of all CORESET configured for one search space type (e.g. UE-specific). Such a table may follow the predefined rules mentioned in the previous embodiments.

In a particular example, when PDCCHNum=1, the UE monitors one PDCCH for PDSCH or one PDCCH for PUSCH, or both, within one or multiple CORESET. When PDCCHNum=2, the UE monitors two PDCCHs for PDSCH or two PDCCH for PUSCH, or both, within multiple CORESET based on the predefined mapping table. Table 3 shows a non-limiting number of examples of the association between the PDCCHNum value and CORESET number.

TABLE 3

Relationship between on PDCCHNum value, CORESET number and PDCCH-CORESET Association

| PDCCHNum | CORESET Number | Association |
| --- | --- | --- |
| 1 | 1 | PDCCH1-CORESET0 |
| 1 | 2 | PDCCH1-CORESET0 |
|   |   | PDCCH1-CORESET1 |
| 2 | 2 | PDCCH1-CORESET0 |
|   |   | PDCCH2-CORESET1 |
| 2 | 3 | PDCCH1-CORESET0 |
|   |   | PDCCH1-CORESET1 |
|   |   | PDCCH2-CORESET2 |
|   |   | Or |
|   |   | PDCCH1-CORESET0 |
|   |   | PDCCH2-CORESET1 |
|   |   | PDCCH2-CORESET2 |

The example associations shown in Table 3 are non-exhaustive examples and one skilled in the art would understand how further permutations could be defined based on the particular examples.

In some embodiments, each PDCCH is monitored from a non-overlapping subset of CORESET from all of the CORESET.

Figure 19:
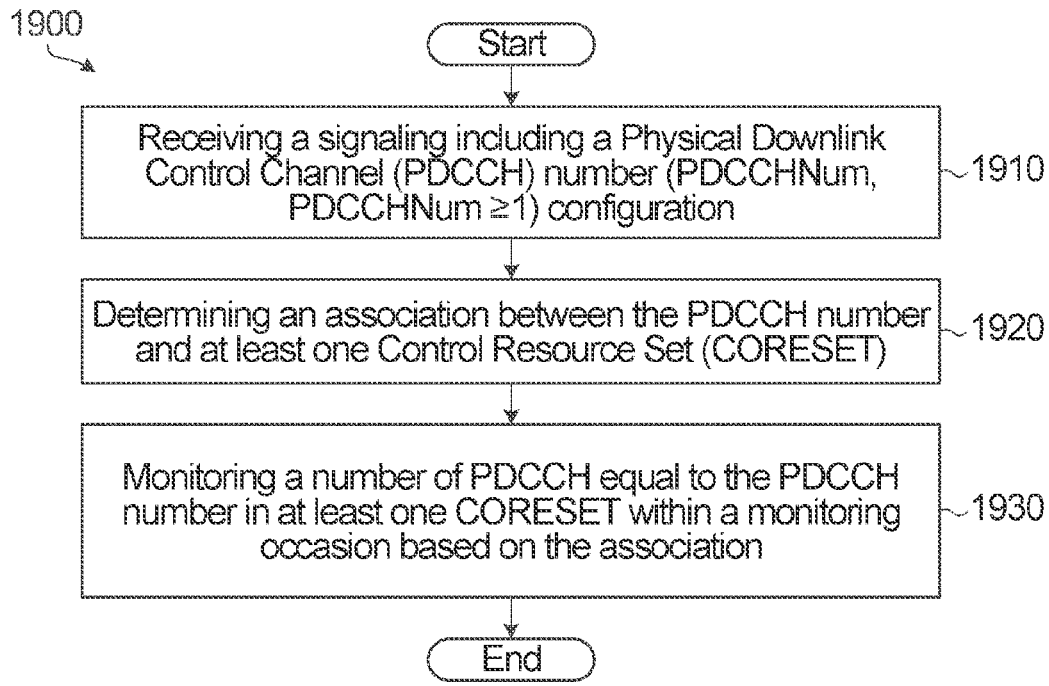
FIG. 19 is a flow chart describing a method according to a further aspect of the disclosure.

FIG. 19 is a flow chart describing a method according to an aspect of the present application. Step 1910 involves receiving a signaling including a Physical Downlink Control Channel (PDCCH) number (PDCCHNum, PDCCHNum≥1) configuration. Step 1920 involves determining an association between the PDCCH number and at least one Control Resource Set (CORESET). Step 1930 involves monitoring a number of PDCCH equal to the PDCCH number in at least one CORESET within a monitoring occasion based on the association.

In some embodiments, determining the association between the PDCCH number and at least one CORESET further involves receiving at least one CORESET configuration. Each CORESET configuration of the at least one CORESET has at least one PDCCH identifier used to indicate an associated PDCCH to be monitored or not in the CORESET.

In some embodiments, at least one PDCCH identifier of each CORESET configuration refers to a number of PDCCH identifiers equal to the PDCCH number that is used to indicate an associated PDCCH to be monitored, or not, in the CORESET.

In some embodiments, at least one PDCCH identifier of each CORESET configuration refers to a single PDCCH identifier which may be configured with one value out of the PDCCH number of different values used to indicate an associated PDCCH to be monitored, or not, in the CORESET.

In some embodiments, determining the association between the PDCCH and the at least one CORESET further involves predefining an association between PDCCH and CORESET with a specific PDCCH number and a specific CORESET number.

In some embodiments, predefining the association further involves predefining an association rule between PDCCH and CORESET based on at least one of: all CORESET may be split into non-overlapping P CORESET sets wherein each CORESET set with specific index p (p=1, ... P) has at least one CORESET and at least two CORESET from different CORESET set have continuous CORESET index and/or CORESET configuration index; and each PDCCH with specific PDCCH identifier (PDCCHIdx=p (p=1, ... P)) is associated with specific COREST set p.

In some embodiments, predefining the association further involves predefining an association table between the PDCCH and the CORESET with PDCCH number and CORESET number based on the CORESET configuration.

In some embodiments, a device that performs methods described above is an electronic device, such as a UE or baseband chip. A general example of such a device is described in FIG. 3A.

With regard to the implementation details of the association, reference can be made to the above-discussed embodiments, with their combination and modification falling within the scope of the present application.

Solution 1-3-2

Some embodiments of the present disclosure are related to a UE determining the association between PDCCH for PDSCH or PUSCH, or both, and CORESET. In some implementations, the association between PDCCH for PDSCH and PUSCH and CORESET is specifically determined based on the specific PDCCH number for PDSCH (PDCCHDLNum, i.e. P_DL) and for PUSCH (PDCCHULNum, i.e. P_UL), CORESET configuration and predefined rule and/or table. The predefined rule and/or table can be the same as those for previous embodiments and common for PDSCH and PUSCH.

In a first example, with a single CORESET configuration and one PDCCH for PDSCH and/or one PDCCH for PUSCH, the PDCCH for PDSCH and/or PUSCH may be monitored from one CORESET if PDCCHDLNum=1 and PDCCHULNum=1. In a second example, with two CORESET configurations and two PDCCH for PDSCH and/or two PDCCH for PUSCH, the PDCCH for PDSCH and/or the PDCCH for PUSCH may be monitored from two CORESET if PDCCHDLNum=2 and PDCCHULNum=2. In such an example, one PDCCH for PDSCH or PUSCH is only from one COREST. In a third example, with two CORESET configurations and two PDCCH for PDSCH, PDCCH for PDSCH may be monitored with each PDCCH from different CORESET if PDCCHDLNum=2 while one PDCCH for PUSCH may be monitored from two CORESET if PDCCHULNum=1.

Each PDCCH is monitored from one subset of CORESET of all CORESET.

Solution 1-4

Some embodiments of the present disclosure are related to supporting two separate PDCCH monitoring configurations based on one explicit monitoring mode configuration which is common for PDSCH and PUSCH.

A first monitoring mode may include the UE being configured to monitor different PDCCH from different CORESET. In this configuration the UE can monitor one PDCCH from one CORESET subset of all configured CORESETs for one search space type. In some embodiments, the monitoring can be performed as predefined rule and/or mapping table described above. In other embodiments, the monitoring may be based on a mapping table as shown in Table 4 below.

A second monitoring mode may include monitoring one or multiple PDCCH for PDSCH and/or PUSCH from all CORESET, which are configured for one search space type. Moreover, this monitoring mode may be one default configuration.

TABLE 4

Relationship between on PDCCHNum, CORESET number and PDCCH-CORESET Association

| PDCCHNum | CORESET Number | Association |
|---|---|---|
| 2 | 2 | PDCCH1-CORESET1 |
|   |   | PDCCH2-CORESET2 |
| 2 | 3 | PDCCH1-CORESET1 |
|   |   | PDCCH1-CORESET2 |
|   |   | PDCCH2-CORESET3 |
|   |   | Or |
|   |   | PDCCH1-CORESET1 |
|   |   | PDCCH2-CORESET2 |
|   |   | PDCCH2-CORESET3 |

The example associations shown in Table 4 are non-exhaustive examples and one skilled in the art would understand how further permutations could be defined based on the particular examples.

Figure 20:
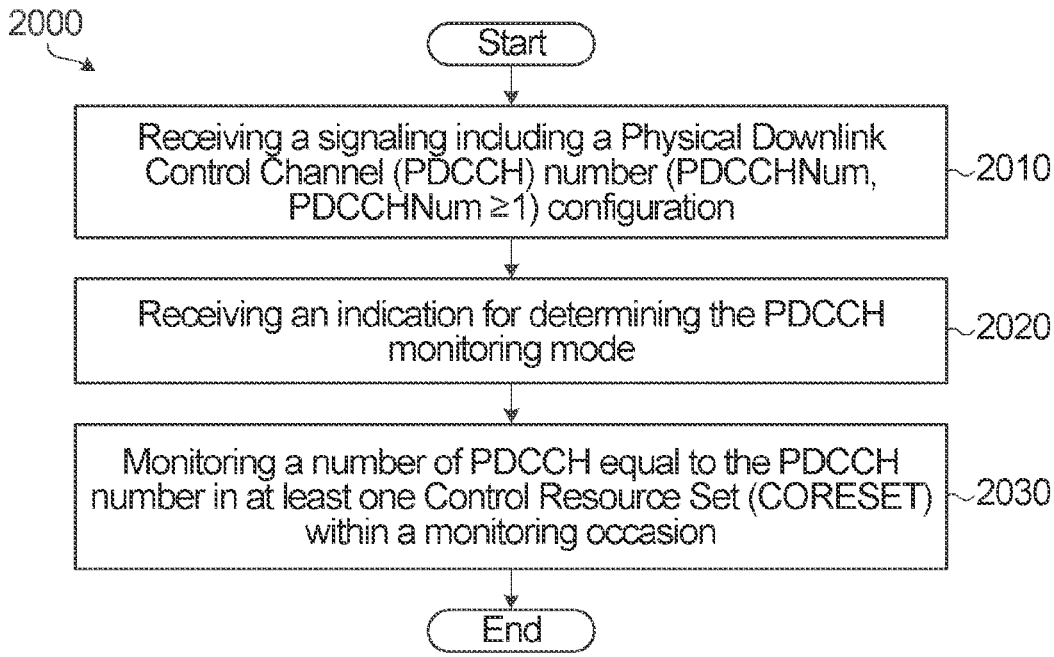
FIG. 20 is a flow chart describing a method according to yet another aspect of the disclosure.

FIG. 20 is a flow chart describing a method according to an aspect of the present application. Step 2010 involves receiving a signaling including a Physical Downlink Control Channel (PDCCH) number (PDCCHNum, PDCCHNum≥1) configuration. Step 2020 involves receiving an indication for determining the PDCCH monitoring mode. In some embodiments, the indication may define which monitoring mode is to be used. For example, the indication may indicate whether a first monitoring mode is to be used or not. If the indication indicates that a first monitoring mode is not to be used, then it is determined that a second monitoring mode is to be used. Step 2030 involves monitoring a number of PDCCH equal to the PDCCH number in at least one Control Resource Set (CORESET) within a monitoring occasion based on the determined monitoring mode.

In some embodiments, the PDCCH monitoring mode includes one of: a first PDDCH monitoring mode that corresponds to monitoring different PDCCH in different CORESET for at least two PDCCH for PUSCH or at least two PDCCH for PUSCH based on a predefined association between PDCCH and CORESET; and a second PDDCH monitoring mode corresponds to monitoring one, or multiple, PDCCH in all CORESET that are configured for one search space type.

In some embodiments, the predefined association includes one of: a predefined association rule between PDCCH and CORESET; or a predefined association table between PDCCH and CORESET.

With regard to the implementation details of the monitoring mode, reference can be made to the above-discussed embodiments, with their combination and modification falling within the scope of the present application.

In some embodiments, a device that performs methods described above is an electronic device, such as a UE or baseband chip. A general example of such a device is described in FIG. 3A.

Solution 2-1

Some embodiments of the present disclosure are related to determining scrambling information used to scramble a portion of a communication based on one PDCCH identity/index (i.e. for example the PDCCHIdx mentioned in previous embodiments). This determining can be predefined or configured for the UE.

In some implementations, PDCCH identity (PDCCHIdx) may be used to generate a scrambling initialization value. For example, this initialization value may be defined as $c_{init}$ shown below for PDSCH scrambling. An example of a $c_{init}$ for PDSCH or PUSCH is $$c_{init}=n_{RNTI}*2^{14}+q*2^{13}+[n_s/2]*2^9+N_{ID}^{cell}$$

where in q can be codeword index for one PDCCH or can be PDCCH identity for multiple PDCCH;

In this example, the initialization value can be used for scrambling a channel which is at least one of PDSCH or PUSCH. This implies that different PDCCHIdx can be used to scramble different channels that are associated with a PDCCH identified with PDCCHIdx.

Solution 3-1

Some embodiments of the present disclosure are related to the UE determining a single PUCCH resource that can be used by the UE that is associated with multiple PDCCH/PDSCH that may be used by one or multiple respective transmission points.

Figure 14:
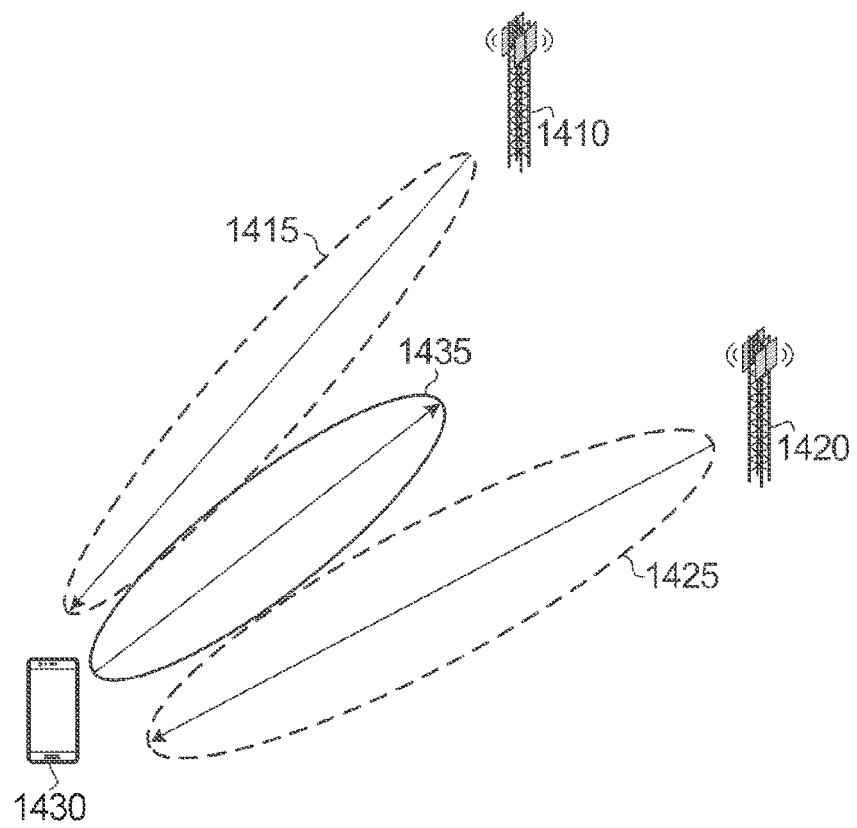
FIG. 14 is an illustration of a portion of a network including two transmit-receive points (TRP) and a UE and the transmission beams that are used for communication between the TRPs and UE for at least PDCCH and PUCCH.

FIG. 14 illustrates an example scenario in which two TRPs 1410 and 1420 are communicating with a single UE 1430. TRP 1410 is communicating in the DL direction on beam 1415 using PDCCH/PDSCH allocated for TRP 1410. TRP 1420 is communicating in the DL direction on beam 1425 using PDCCH/PDSCH allocated for TRP 1420. The UE 1430 communicates with both TRPs 1410 and 1420 in the UL direction using beam 1435. PUCCH used by the UE 1430 occurs over beam 1435 and each TRP 1410 and 1420 needs to be able to decode the portion of the PUCCH relevant to the respective TRP.

The UE may determine the single PUCCH resource information, which is at least one of time resource information, frequency resource information, code or sequence resource information, frequency-hopping pattern and transmission beam information, or any subset thereof. Time resource information that can include at least one of: a starting symbol index; a symbol duration within a slot; an ending symbol index; a starting slot index; a slot duration and an ending slot index. Frequency resource information than can include at least one of: a starting physical resource block (PRB) index; a PRB number for one PUCCH and an ending PRB index. Code or sequence resource information that can include at least one of orthogonal cover code (OCC) index and cyclic shift index. A frequency-hopping pattern. Transmission beam information that can include at least one of: UL Beam Pair Link (BPL), QCL assumption between DMRS of PUSCH with another DL RS which can be at least one of CSI-RS, SS block and DMRS for associated PDCCH, DMRS for associated PDSCH.

Any PUCCH resource information can be received by a RRC signaling and/or a specific DCI. A specific DCI might be selected from multiple PDCCH based on one predefined rule. For example, a PDCCH with the lowest Identity/index (i.e. PDCCH1) will be selected. A specific DCI might be selected from one of the multiple PDCCH by receiving another RRC signaling indicating PDCCH Identity/index which is used for PDCCH selection.

The UE determining a PUCCH format (e.g. long or short) for a single PUCCH can be determined based on a combination of multiple uplink control information (UCI) feedback associated with multiple PDCCH/PDSCH wherein each UCI feedback is associated with one specific PDCCH/PDSCH and each UCI includes at least one of ACK/NACK, channel quality information (CQI), Pre-coding Matrix indicator (PMI), rank indicator (RI), scheduling request (SR). In a first example, the determination can be based on the UCI combination type, in which a first PUCCH format can be for ACK/NACK and/or SR and a second PUCCH format can be for any one or more of an ACK/NACK SR, or CSI report (e.g. CQI/PMI/RI/SRI, etc.). In a second example, the determination can be based on the payload size (i.e. total bit number) for a UCI combination. In such an example, a first PUCCH format can be used for UCI combination with payload size less than one threshold number; otherwise second PUCCH format can be used.

Figure 21:
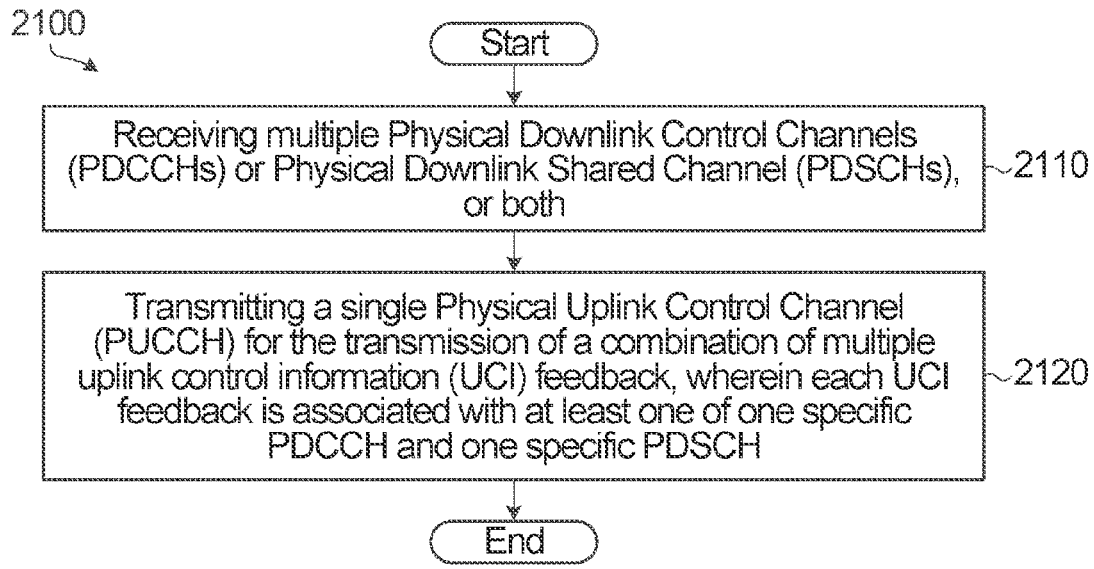
FIG. 21 is a flow chart describing a method according to still another aspect of the disclosure.

FIG. 21 is a flow chart describing a method according to an aspect of the present application. Step 2110 involves receiving multiple Physical Downlink Control Channels (PDCCHs) or Physical Downlink Shared Channel (PD-SCHs), or both. Step 2120 involves transmitting a single Physical Uplink Control Channel (PUCCH) for the transmission of a combination of multiple uplink control information (UCI) feedback, wherein each UCI feedback is associated with at least one of one specific PDCCH and one specific PDSCH.

In some embodiments, the method further involves determining the single PUCCH resource.

In some embodiments, the single PUCCH resource includes at least one of: a time resource; a frequency resource; a code or sequence resource; a frequency hopping pattern; a transmission beam; and a PUCCH format.

In some embodiments, a device that performs methods described above is an electronic device, such as a UE or baseband chip. A general example of such a device is described in FIG. 3A.

With regard to the implementation details of the PUCCH and UCI, reference can be made to the above-discussed embodiments, with their combination and modification falling within the scope of the present application.

Solution 3-2

Some embodiments of the present disclosure are related to the UE determining multiple PUCCH resources for the transmission of multiple PUCCH associated with multiple PDCCH/PDSCH. In some implementations, each PUCCH resource is associated with one specific PDCCH/PDSCH. For example, the PUCCH may be associated with a specific PDCCH identity.

FIG. 14 described above was directed to a single beam being used for a common PUCCH for multiple TRPs. An alternative to such an approach involves using separate PUCCH for each of two or more TRPs. FIGS. 15A to 15F illustrate six different non-limiting examples of separate PUCCH resource configurations.

Figure 15A:
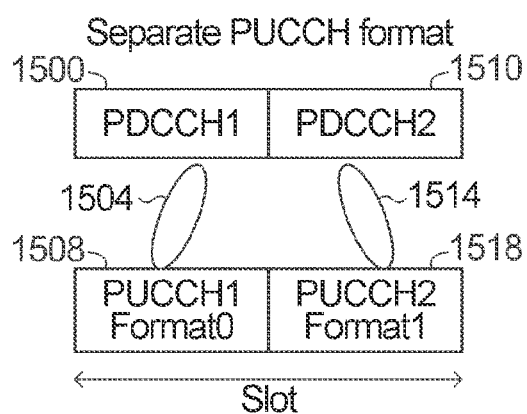
FIGS. 15A to 15F illustrate examples of resource configurations used by a UE for separate PUCCH to respective TRPs.

In FIG. 15A, a UE determines multiple PUCCH resources for the transmission of multiple PUCCH, where each PUCCH is associated to a respective PDCCH/PDSCH and each PUCCH uses a separate PUCCH format. For a given slot, two separate PDCCH 1500, 1510 are shown. Each PDCCH may be considered a time-frequency resource. A portion of each PDCCH 1500, 1510 is allocated for a PUCCH 1508, 1518 associated with the respective PDCCH 1500, 1510. The contents of each PUCCH 1508, 1518 is transmitted on a respective beam 1504, 1514 from the UE to a respective TRP, using a respective PUCCH format.

Figure 15B:
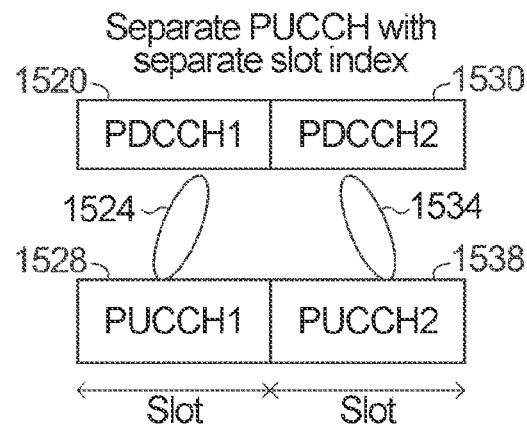

In FIG. 15B, a UE determines multiple PUCCH resources for the transmission of multiple PUCCH, where each PUCCH is associated to a respective PDCCH/PDSCH and each PUCCH is transmitted in one or multiple slots. Two separate PDCCHs 1520, 1530 are shown, each associated with a separate slot. Associated with each PDCCH 1520, 1530 is a respective PUCCH 1528, 1538. The contents of each PUCCH 1528, 1538 is transmitted on a respective beam 1524, 1534 from the UE to a respective TRP.

Figure 15C:
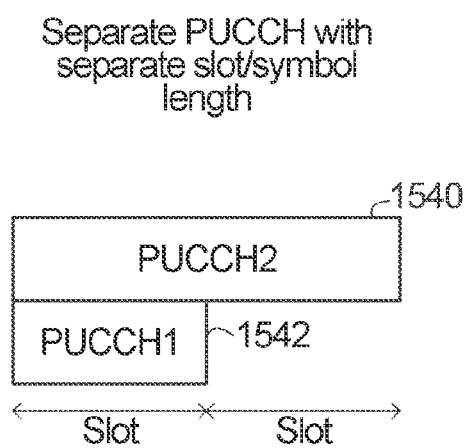

In FIG. 15C, a UE determines multiple PUCCH resources for the transmission of multiple PUCCH, where each PUCCH is associated to a respective PDCCH/PDSCH and each PUCCH is transmitted in one or multiple slots. Two separate slots are shown in which a first PUCCH 1540 occupies a portion of the resources of both slots and a second PUCCH 1542 occupies a portion of the resources of only one slot of the two slots. For example, the only one slot may be the first slot. In some implementations (not shown in FIG. 15C), the second PUCCH 1542 may occupy a portion of the resources of both slots. It is understood the two slots as shown in FIG. 15C are only examples for the purpose of illustration, this embodiment may apply to more than two slots.

Figure 15D:
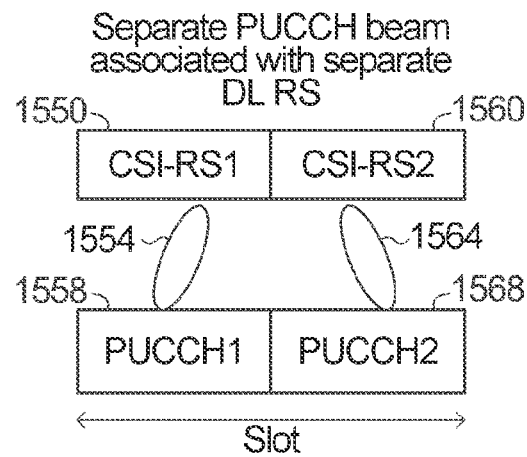

In FIG. 15D, a UE determines multiple PUCCH resources for the transmission of multiple PUCCH, where each PUCCH is transmitted in a single slot on a separate beam that is derived from the QCL association between the PUCCH DMRS and a respective CSI-RS. For a single slot, two separate CSI-RS 1550, 1560 are shown. Associated with each CSI-RS 1550, 1560 is a respective PUCCH 1558, 1568. The content of each PUCCH 1558, 1568 is transmitted on a respective beam 1554, 1564 from the UE to a respective TRP.

Figure 15E:
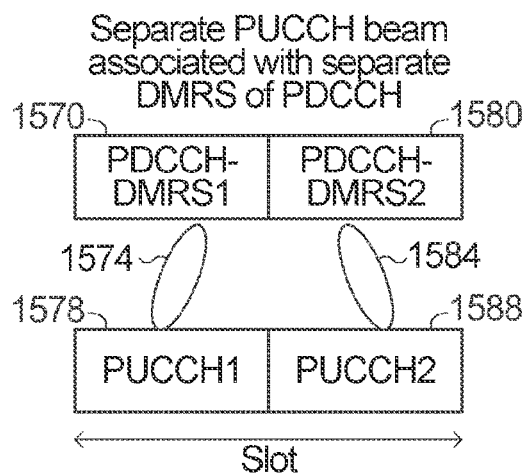

In FIG. 15E, a UE determines multiple PUCCH resources for the transmission of multiple PUCCH, where each PUCCH is transmitted in a single slot on a separate beam that is derived from the QCL association between the PUCCH DMRS and a respective PDCCH DMRS. For a given slot, two separate PDCCH-DMRS 1570, 1580 are shown. Associated with each PDCCH-DMRS 1570, 1580 is a respective PUCCH 1578, 1588. The content of each PUCCH 1578, 1588 is transmitted on a respective beam 1574, 1584 from the UE to a respective TRP.

Figure 15F:
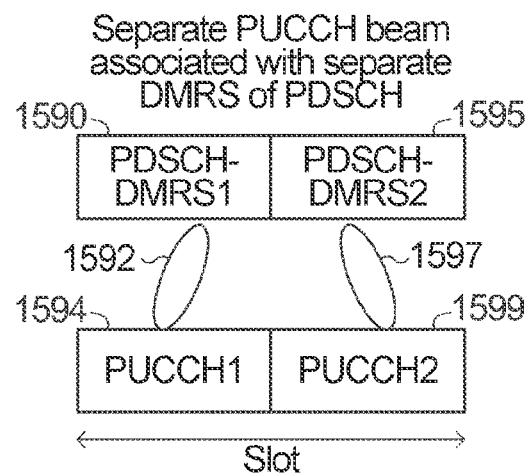

In FIG. 15F, a UE determines multiple PUCCH resources for the transmission of multiple PUCCH, where each PUCCH is transmitted in a single slot on a separate beam that is derived from the QCL association between the PUCCH DMRS and a respective PDSCH DMRS. For a given slot, two separate PDSCH-DMRS 1590, 1595 are shown. Associated with each PDSCH-DMRS 1590, 1595 is a respective PUCCH 1594, 1599. The contents of each PUCCH 1594, 1599 is transmitted on a respective beam 1592, 1597 from the UE to a respective TRP.

While FIGS. 15A to 15F are described with regard to a slot, it is to be understood that this is one example of a time duration. More generally, the time duration could be an OFDM symbol, a group of OFDM symbols, a mini-slot, a subslot (a shorter duration than a slot) or multiple slots The UE determining multiple PUCCH resource information in which each of the multiple PUCCH resource information associated with one specific PDCCH/PDSCH is based on sub-resource information, which is at least one of time resource information, frequency resource information, code or sequence resource information, frequency-hopping pattern and transmission beam information. Time resource information which can include at least one of: a starting symbol index; a symbol duration within a slot; a starting symbol index; a starting slot index; and a slot duration and an ending slot index. Frequency resource information which can include at least one of: PRB index; PRB number for one PUCCH and bandwidth part index. Code or sequence resource information which can include at least one of OCC index and cyclic shift index. A frequency-hopping pattern. Transmission beam information which can include at least one of UL BPL; QCL assumption between DMRS of PUCCH with another DL RS which can be at least one of CSI-RS; SS block and DMRS for associated PDCCH; and DMRS for associated PDSCH.

Any sub-resource information can be configured by receiving RRC signaling or a DCI. Some sub-resource information configured by receiving RRC signaling may be shared between multiple PUCCH resource information. For example, frequency resource information can be shared for multiple PUCCH resources. Some sub-resource information configured by DCI may be received from specific PDCCH, for example, transmission beam information for first PUCCH resource information can be from first PDCCH while transmission beam information for second PUCCH resource information can be from second PDCCH.

In some implementations, multiple PUCCH resources may share at least one common resource information (e.g. starting slot index, frequency-hopping pattern) that are discussed above. The at least one common resource information may be configured with RRC and common for multiple PUCCH.

Specific PUCCH format (e.g. long or short) for multiple PUCCH can be determined based on specific uplink control information (UCI) feedback associated with specific PDCCH/PDSCH, wherein each UCI feedback includes at least one of ACK/NACK, CQI, PMI, RI, and SR.

Figure 22:
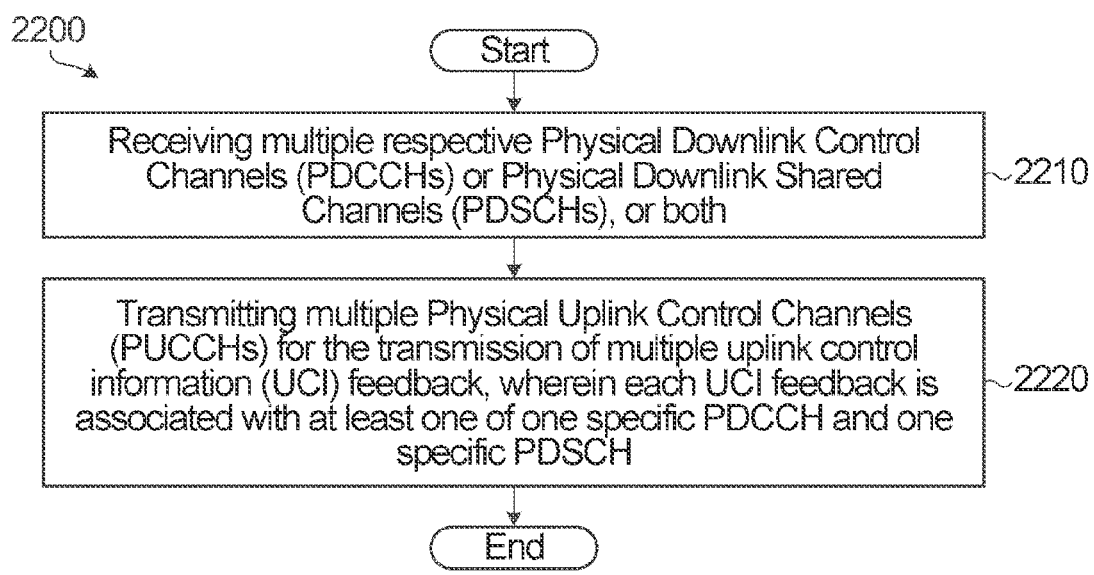
FIG. 22 is a flow chart describing a method according to yet a further aspect of the disclosure.

FIG. 22 is a flow chart describing a method according to an aspect of the present application. Step 2210 involves receiving multiple respective Physical Downlink Control Channels (PDCCHs) or Physical Downlink Shared Channels (PDSCHs), or both. Step 2220 involves transmitting multiple Physical Uplink Control Channels (PUCCHs) for the transmission of multiple uplink control information (UCI) feedback, wherein each UCI feedback is associated with at least one of one specific PDCCH and one specific PDSCH.

In some embodiments, the method further involves determining the multiple PUCCH resources.

In some embodiments, the single or multiple PUCCH resources include at least one of: a time resource; a frequency resource; a code or sequence resource; a frequency hopping pattern; a transmission beam; and a PUCCH format.

In some embodiments, the multiple PUCCH resources used for the transmission of multiple respective PUCCH use the same or different PUCCH format.

In some embodiments, the multiple PUCCH resources used for the transmission of multiple respective PUCCH are located in a single slot, such that each PUCCH's starting OFDM symbol is located in a single slot and its duration is less than or equal to the duration of a slot.

In some embodiments, the multiple PUCCH resources used for the transmission of multiple respective PUCCH are located in multiple slots, such that each PUCCH's starting OFDM symbol is located in a single slot and its duration is less than, equal to, or longer than, the duration of a slot.

In some embodiments, the multiple PUCCH resources used for the transmission of multiple respective PUCCH are located in multiple slots, such that each PUCCH's ending OFDM symbol is located in a single slot and its duration is less than, equal to, or longer than, the duration of a slot.

In some embodiments, the multiple PUCCH resources used for the transmission of multiple respective PUCCH are located in separate slots, such that each PUCCH's starting OFDM symbol is located in a given slot and its duration is less than or equal to the duration of a slot.

In some embodiments, the multiple PUCCH resources used for the transmission of multiple respective PUCCH use respective transmission beams that are derived using the quasi-collocated association between a respective PUCCH Demodulation Reference Signal (DMRS) and a respective Downlink Reference Signal (DL RS).

In some embodiments, the DL RS is a Channel State Information-Reference Signal (CSI-RS). In some embodiments, the DL RS is a PDCCH DMRS. In some embodiments, the DL RS is a PDSCH DMRS.

In some embodiments, resource information pertaining to the single or multiple PUCCH resource is configured with at least one of: RRC signaling; Downlink Control Information (DCI); Media Control Access Control Element (MAC CE); and a predefined rule.

In some embodiments, the method may further comprise: determining a PUCCH feedback mode; and transmitting a single or multiple PUCCH based on the PUCCH feedback mode.

In some embodiments, the determining the PUCCH feedback mode is made by selecting one of two separate feedback modes.

In some embodiments, a first mode is for a single PUCCH and a second mode is for multiple PUCCH.

In some embodiments, determining the PUCCH feedback mode comprises making a determination based on an implicit mechanism using a PDCCH to CORESET association.

In some embodiments, determining the PUCCH feedback mode comprises receiving a higher-layer signaling.

In some embodiments, the higher-layer signaling includes at least one of: RRC signaling; Downlink Control Information (DCI); and Media Control Access Control Element (MAC CE).

In some embodiments, one or more of the above described embodiments may be combined.

In some embodiments of the methods described above for Solutions 3-1 and 3-2, resource information pertaining to the single or multiple PUCCH resource is configured with at least one of: RRC signaling; Downlink Control Information (DCI); Media Control Access Control Element (MAC CE); and a predefined rule.

In some embodiments of the methods described above for Solutions 3-1 and 3-2, the method further involves: determining a PUCCH feedback mode; and transmitting a single or multiple PUCCH based on the PUCCH feedback mode.

In some embodiments, the determination is made by selecting one of two separate feedback modes.

In some embodiments, a first mode is for a single PUCCH; and a second mode is for multiple PUCCH.

In some embodiments, determining the PUCCH feedback mode comprises making a determination based on an implicit mechanism using a PDCCH to CORESET association.

In some embodiments, determining the PUCCH feedback mode comprises receiving a higher-layer signaling.

In some embodiments, the higher-layer signaling includes at least one of RRC signaling, Downlink Control Information (DCI), and Media Control Access Control Element (MAC CE).

In some embodiments, a device that performs methods described above is an electronic device, such as a UE or baseband chip. A general example of such a device is described in FIG. 3A.

With regard to the implementation details of PUCCH and UCI, reference can be made to the above-discussed embodiments, with their combination and modification falling within the scope of the present application.

Solution 3-3

Some embodiments of the present disclosure are related to the UE determining a PUCCH feedback mode, also known as a report mode. In some implementations, the determination may be made between two separate modes. A first mode (Mode 1) may be for a single PUCCH a second mode (Mode 2) may be for multiple PUCCH. In some embodiments, the determination may be made based on an explicit RRC configuration. The explicit RRC configuration may be in conjunction with the CORESET configuration.

In some embodiments, the determination may also be made implicitly based on the CORESET configuration that is defined with RRC signaling or a predefined mapping table. A non-limiting example of a mapping table is shown in Table 5 below.

TABLE 5

Relationship between PDCCHNum value, CORESET number, PDCCH-CORESET Association and PUCCH mode

| PDCCHNum | CORESET Number | Association | PUCCH mode |
|---|---|---|---|
| 1 | 1 | PDCCH1-CORESET0 | Mode1 |
| 1 | 2 | PDCCH1-CORESET0 PDCCH1-CORESET1 | Mode1 |
| 2 | 1 | PDCCH1-CORESET0 PDCCH2-CORESET0 | Mode1 |
| 2 | 2 | PDCCH1-CORESET0 PDCCH2-CORESET1 | Mode2 |
| 2 | 3 | PDCCH1-CORESET0 PDCCH1-CORESET1 PDCCH2-CORESET2 Or PDCCH1-CORESET0 PDCCH2-CORESET1 PDCCH2-CORESET2 | Mode2 |

In some embodiments, Mode1 is the PUCCH feedback mode to be used by the UE for the following cases: single PDCCH received on a single CORESET; single PDCCH received on multiple CORESETs; or multiple PDCCHs received on a single CORESET. Mode 2 is the PUCCH feedback mode selected by the UE for all other cases.

The example associations shown in Table 5 are non-exhaustive examples and one skilled in the art would understand how further permutations could be defined based on the particular examples.

Solution 4-1

Some embodiments of the present disclosure are related to the UE determining multiple CSI-RS configurations sent from the network and then reporting multiple CSI-RS based measurements over separate PUSCH to the network based on an association between one PUSCH and one or multiple CSI-RS configurations.

In some embodiments, the association between one PUSCH and one or multiple CSI-RS configurations may be received by the UE in a high-layer signaling, e.g., a RRC signaling. For example, multiple CSI-RS configurations will be divided into multiple CSI-RS configuration groups (one CSI-RS configuration group includes at least one CSI-RS configuration), then a measurement for one CSI-RS configuration group can be reported with one specific PUSCH based on the association. (e.g. PUSCH1 for CSI-RS configuration group1 and PUSCH2 for CSI-RS configuration group2).

In some embodiments, the association between one PUSCH and one or multiple CSI-RS configurations may be implicitly derived by the UE. The implicit derivation can be based on a QCL assumption between a specific DMRS of PDCCH and one particular CSI-RS configuration. For example, DMRS of PDCCH1 for PUSCH1 may be quasi co-located with CSI-RS1 configuration while DMRS of PDCCH2 for PUSCH2 may be quasi co-located with CSI-RS2 configuration. Then measurement of CSI-RS1 can be reported with PUSCH1 and measurement of CSI-RS2 can be reported with PUSCH2 based on the association as explained above. It is understood that multiple CSI-RS configurations in one CSI-RS configuration group may be associated with one PUSCH.

Figure 16A:
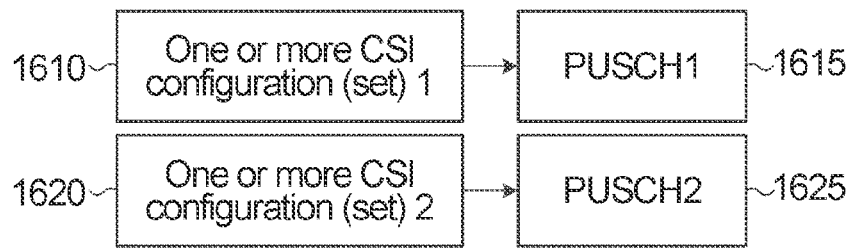
FIGS. 16A and 16B illustrate example associations between one or more respective channel state information (CSI) and PUSCH.

FIG. 16A illustrates a representation of two groups of one or more CSI configurations 1610 and 1620 each being associated with a respective PUSCH, one group with PUSCH1 1615 and one group with PUSCH2 1625.

Figure 16B:
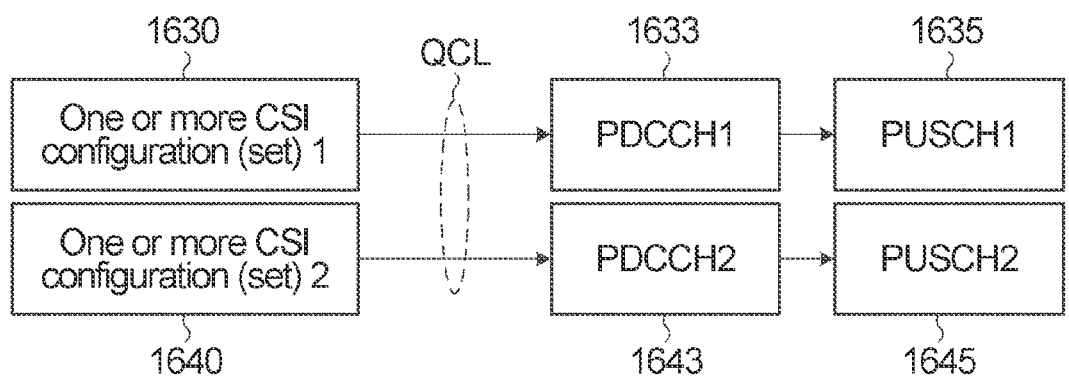

FIG. 16B illustrates a representation of two groups of one or more CSI configurations 1630 and 1640 each being associated with a respective PDCCH, PDCCH1 1633 and PDCCH2 1643, based on a QCL assumption. PDCCH1 1633 and PDCCH2 1643 are respectively associated with PUSCH1 1635 and PUSCH2 1645.

Figure 23:
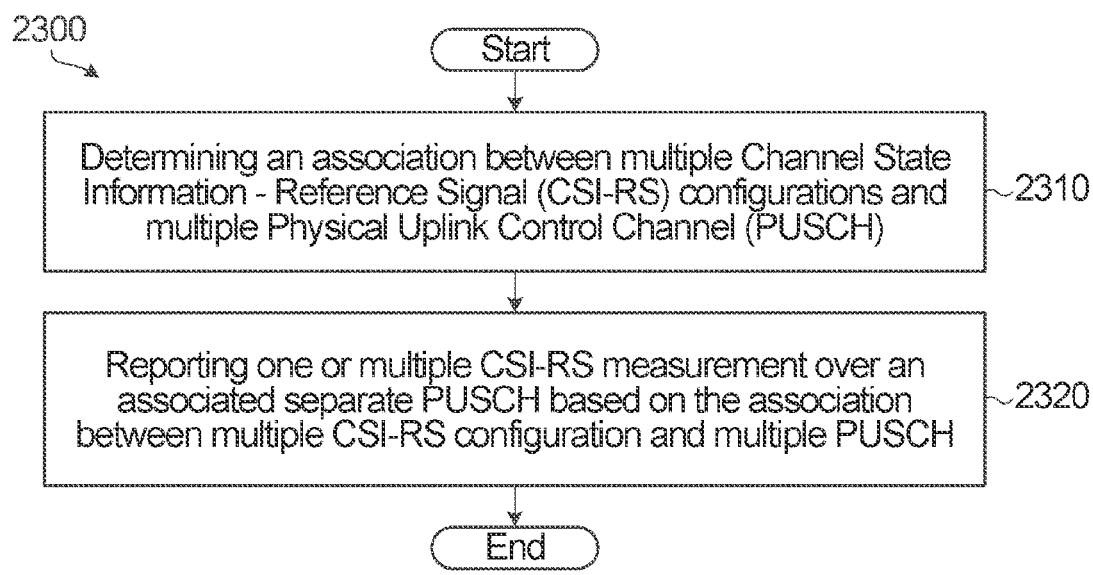
FIG. 23 is a flow chart describing a method according to yet a further aspect of the disclosure.

FIG. 23 is a flow chart describing a method according to an aspect of the present application. Step 2310 involves determining an association between multiple Channel State Information-Reference Signal (CSI-RS) configurations and multiple Physical Uplink Control Channel (PUSCH). Step 2320 involves reporting one or multiple CSI-RS measurement over an associated separate PUSCH based on the association between multiple CSI-RS configuration and multiple PUSCH.

In some embodiments, determining the association comprises receiving a signaling indicating the association.

In some embodiments, determining the association involves determining a CSI-RS configuration that is associated with a PUSCH which is scheduled by a PDCCH, the PDCCH being associated with a DMRS quasi co-located with a CSI-RS.

In some embodiments, a device that performs methods described above is an electronic device, such as a UE or baseband chip. A general example of such a device is described in FIG. 3A.

With regard to the implementation details of the association, reference can be made to the above-discussed embodiments, with their combination and modification falling within the scope of the present application.

Figure 24A:
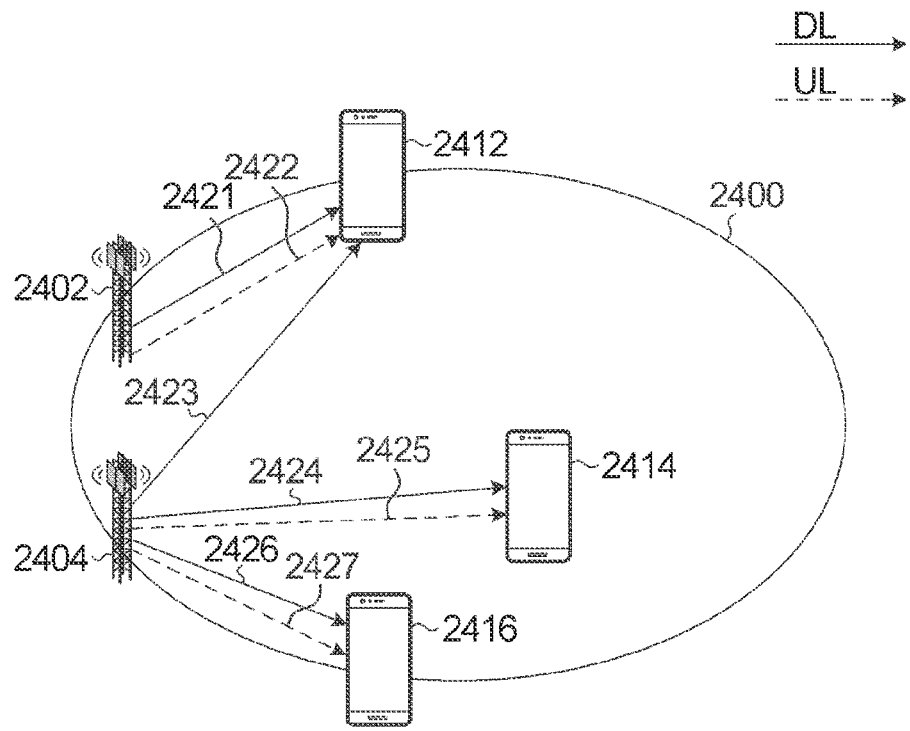
FIG. 24A is a representative illustration of downlink and uplink assignments between multiple TRPs and various UEs in a single cell.

FIG. 24A illustrates an example of a cell 2400 with two TRPs 2402 and 2404. There are three UEs 2412, 2414, 2416 being served within the cell 2400. UE 2412 is allocated a DL assignment 2421 and an uplink assignment 2422 by TRP 2402 and by downlink assignment 2423 by TRP 2404. UE 2414 is allocated a DL assignment 2424 and an uplink assignment 2425 by TRP 2404. UE 2416 is allocated a DL assignment 2426 and an uplink assignment 2427 by TRP 2404. In this particular example, two TRPs are transparently (from the UE perspective) associated with two separate CORESET groups (also two CORESETs) configured for a single UE.

Figure 24B:
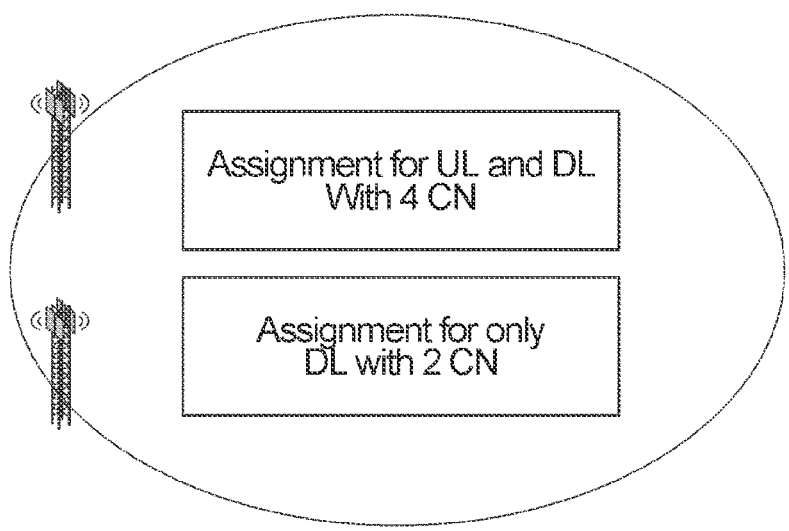
FIG. 24B is a representative illustration of an assignment of transmission resources for downlink and uplink communications for multiple TRPs in a single cell.

FIG. 24B illustrates an example of the DL and UL assignments for UE 2412 from each of TRP 2402 and TRP 2404. The assignments from TRP 2402 are for DL and UL as shown in FIG. 24A and include four candidate numbers (CN), in this particular example. The assignments from TRP 2404 are for DL only as shown in FIG. 24A and include two candidate numbers, in this particular example. In this particular example, two TRPs are transparently associated with two separate CORESET groups (also two CORESETs) configured for one UE. Each PDCCH is associated with a specific CORESET which is associated with a different search space with different candidate numbers (2 and 4 in the figure) for a same aggregation level.

Table 6 illustrates an example that defines multiple search spaces (both aggregation level and candidate number) for EPDCCH candidates and for NR-PDCCH candidates associated with two different CORESETs (also generally corresponding to two CORESET groups). The contents of the rows and columns are as defined above for Table 2. The values in the CORESET 1 and CORESET2 columns of Table 6 represent the number of Physical Resource Blocks (PRB) used in the CORESET.

ber CN_AL is determined by one predefined CN_ALo and the configured total number of PDCCH (N_PDCCH) for PUSCH and/or PDSCH which can be simultaneously detected or received from the associated the specific CORESET in the form CN_AL=CN_ALo*N_PDCCH.

Referring back to Table 6, there are several aspects pertaining to the candidate numbers that should be noted.

For example, in the third row it is noted that CORESET1 has 8 PRB and CORESET2 has 8 PRB. The number of the candidates (CN) for the EPDCCH scenario for L=1 is 4 for CORESET1 and 4 for CORESET2. In this case, the CN for the two CORESETs are equal. The same is shown for L=2, 4, 8 and 16, even though the number of candidates decreases with increasing aggregation level. However, in the NR-PDCCH scenario, the CN for L=2 is equal to 4 for CORESET1 and equal to 2 for CORESET2. The CN for the different CORESETs with same size is different.

In the fifth row it is noted that for L=1 CORESET1 has 8 PRB and CORESET2 has 2 PRB. The number of the candidates (CN) for the EPDCCH scenario for L=1 is 4 for CORESET1 and 2 for CORESET2. In this case the CORESET with the larger number of PRBs also has the large CN. However, in the NR-PDCCH scenario, the CN is equal to 2 for CORESET1 and equal to 4 for CORESET2. Therefore, the CORESET with the larger number of PRBs has the smaller CN.

As can be seen by at least the two above examples from Table 6, the candidate number for the NR-PDCCH scenarios can be independent of the CORESET size.

In implementations of the present application, the maximum PDCCH number for all channels within each CORESET may be different. Each CORESET can be shared by a different UE or by different groups of UEs. For example, referring back to FIG. 24A, for UE 2412, a first CORESET (CORSET1) is used for both UL and DL assignment as allocated by TRP 2402 and a second CORESET (CORSET2) is used for only for DL assignment as allocated by TRP 2404. In such a scenario, CORESET1 likely has a

TABLE 6

Number of candidates for different aggregation levels for different CORESETS

| | | Number of EPDCCH candidates for two CORESETs | | | | | Number of NR-PDCCH candidates for two CORESETs | | | | |
|---|---|---|---|---|---|---|---|---|---|---|---|
| CORESET1 | CORESET2 | L = 1 | L = 2 | L = 4 | L = 8 | L = 16 | L = 1 | L = 2 | L = 4 | L = 8 | L = 16 |
| 2 | 2 | 4.4 | 2.2 | 1.1 | 0.0 | 0.0 | 4.4 | 2.2 | 1.1 | 0.0 | 0.0 |
| 4 | 4 | 3.3 | 3.3 | 1.1 | 1.1 | 0.0 | 3.3 | 3.3 | 1.1 | 1.1 | 0.0 |
| 8 | 8 | 3.3 | 2.2 | 1.1 | 1.1 | 1.1 | 4.2 | 4.2 | 2.1 | 2.1 | 2.1 |
| 4 | 2 | 5.3 | 3.2 | 1.1 | 1.0 | 0.0 | 4.2 | 4.2 | 2.1 | 1.1 | 0.0 |
| 8 | 2 | 4.2 | 4.2 | 1.1 | 1.0 | 1.0 | 2.4 | 2.4 | 1.2 | 1.1 | 1.1 |
| 8 | 4 | 3.3 | 2.2 | 2.1 | 1.1 | 1.0 | 3.3 | 2.2 | 2.1 | 1.1 | 1.0 |

In some implementations, for different CORESETs that may be monitored by a UE, the configuration information provided to the UE for each potential CORESET may have the same aggregation level (AL) set associated with non-zero CN for each AL, i.e. {1, 2, 4, 8, 16}. For the same aggregation level, the CN can be independently configured for each CORESET. In a first example, different CORESETs with a same size (time resource and/or frequency resource) can be configured with different CN for the same aggregation level. In a second example, a first CORESET with a smaller size can be configured for a larger CN and a second CORESET with a larger size can be configured for a smaller CN for the same aggregation level. In a third example, for a specific aggregation level AL, associated candidate numlarger CN than CORESET2 to accommodate that CORESET1 is providing assignment for both UL and DL. However, for UE 2414, CORESET2 is used for both UL and DL assignment as allocated by TRP 2404.

Table 6 is again merely an example of candidate numbers for respective aggregation levels for CORESTS of same and/or different sizes that would be consistent with the present application. It is to be understood that these are example values and are not intended to be limiting in nature.

Assignment Number Specific Search Space Splitting

In some implementations, a case specific search space has a configuration that is different with respect to a maximum number of PDCCH a UE is configured to monitor for one data channel type (unicast or UE-specific) and one RNTI type of one cell within one same monitoring occasion. A configuration for each case specific search space defines the association among a given CORESET and for a given aggregation level and candidate number. Various examples are shown in Table 7 below.

TABLE 7

Number of candidates for different aggregation levels for different size CORESETS for one and two assignment scenarios

| | | Number of PDCCH candidates for one assignment case | | | | | Number of PDCCH candidates for two assignment case | | | | |
|---|---|---|---|---|---|---|---|---|---|---|---|
| CORESET1 | CORESET2 | L = 2 | L = 4 | L = 8 | L = 16 | L = 32 | L = 1 | L = 2 | L = 4 | L = 8 | L = 16 |
| 2 | 2 | 4.4 | 2.2 | 1.1 | 0.0 | 0.0 | 6.6 | 3.3 | 2.2 | 0.0 | 0.0 |
| 4 | 4 | 3.3 | 3.3 | 1.1 | 1.1 | 0.0 | 6.6 | 3.3 | 2.2 | 1.1 | 0.0 |
| 8 | 8 | 3.3 | 2.2 | 1.1 | 1.1 | 1.1 | 3.3 | 2.2 | 2.1 | 1.1 | 1.1 |
| 4 | 2 | 5.3 | 3.2 | 1.1 | 1.0 | 0.0 | 5.3 | 3.2 | 2.1 | 2.1 | 0.0 |
| 8 | 2 | 4.2 | 4.2 | 1.1 | 1.0 | 1.0 | 4.2 | 4.2 | 1.1 | 1.2 | 1.1 |
| 8 | 4 | 3.3 | 2.2 | 2.1 | 1.1 | 1.0 | 3.5 | 2.2 | 2.1 | 1.1 | 1.1 |

Purely by way of example, a UE may be provided with all of the information in Table 7. In a scenario in which the UE is to operate for only one assignment, the UE can use the pertinent information in the portion of Table 7 defining the number of candidates for the one assignment case. In a scenario in which the UE is to operate for two assignments, the UE can use the pertinent information in the portion of Table 7 defining the number of candidates for the two assignment case.

Table 7 is again merely an example of candidate numbers for respective aggregation levels for CORESTS of same and/or different sizes for different number of assignments that would be consistent with the present application. While example AL and CN information is provided for one and two assignment scenarios, it is to be understood that similar information may be provided to the UE for scenarios with a larger number of assignments than two. It is to be understood that these are example values and are not intended to be limiting in nature.

In some implementations, configuration sets associated with CORESETS having defined aggregation levels and candidate numbers that are being used for existing communication standards may be used as a default configuration sets, for example for a one assignment case, to ensure compatibility with existing systems.

Time Resource Information for Specific Case

Time resource information for multiple PDCCHs and/or associated PDSCHs and/or PUSCHs and/or PUCCHs from one or more TRPs for a single data channel type (unicast or UE-specific) can be the same or different.

In some implementations, the UE is configured with different indications for different time resource information for different PDCCH and/or other associated channels and each indication is associated with one specific time resource information. In a first example, in which there are two PDCCH (PDCCH1 and PDCCH2), the starting symbol and/or ending symbol for PDCCH1 and PDCCH2 can be different. In a second example in which there are two PDCCH (PDCCH1 and PDCCH2) and associated PDSCH (PDSCH1 and PDSCH2), the starting symbol and/or ending symbol for PDSCH1 associated with PDCCH1 and for PDSCH2 associated with PDCCH2 can be different. In a third example in which there are two PDCCH (PDCCH1 and PDCCH2) and associated PUSCH (PUSCH1 and PUSCH2), the starting symbol and/or ending symbol for PUSCH1 associated with PDCCH1 and for PUSCH2 associated with PDCCH2 can be different. In a fourth example, in which there are two PDCCH (PDCCH1 and PDCCH2) and associated PUCCH (PUCCH1 and PUCCH2), the starting symbol and/or ending symbol for PUCCH1 associated with PDCCH1 and for PUCCH2 associated with PDCCH2 can be different. Table 8 below illustrates an association for a first PDCCH (PDCCH1) and for a second PDCCH (PDCCH2) with other channel types.

TABLE 8

Association between multiple PDCCH and PDSCH and/or PUSCH and/or PUCCH

| PDCCH1 | PDSCH1 | PUSCH1 | PUCCH1 |
| PDCCH2 | PDSCH2 | PUSCH2 | PUCCH2 |

Figure 25A:
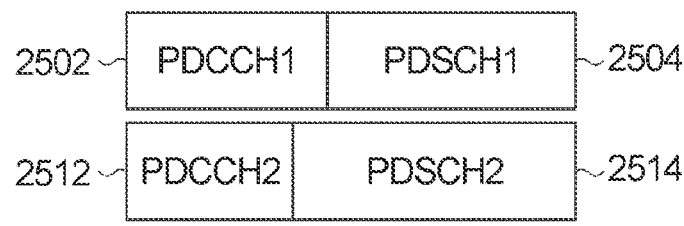
FIG. 25A is a representative illustration of two PDCCH and associated PDSCH having different time unit segments.

FIG. 25A illustrates an example of a different time resource information for different PDCCH and associated PDSCH. FIG. 25A illustrates a PDCCH1 2502 with a corresponding PDSCH1 2504 occupying at least a portion of a time unit and a PDCCH2 2512 with a corresponding PDSCH2 2514 occupying at least a portion of the time unit. While the overall duration of PDCCH1 2502 and PDSCH1 2504 is the same for PDCCH2 2512 and PDSCH2 2514, the duration and ending symbol of the respective PDCCH(s) are different and the duration and starting symbol of the respective PDSCHs are different.

In some implementations, the UE is configured to determine the time resource information for different PDCCHs and/or associated PDSCH and/or PUSCH and/or PUCCH. The time resource information can be based on an indication scheme. As a particular example, a first time resource information can be derived from a first indication scheme and a second time resource information can be derived from a second indication scheme.

General examples of indication schemes may include dynamic DL control signaling and semi-static RRC signaling used by the network. Specific examples of combinations of indication schemes may include dynamic control indication (DCI) and semi-static RRC signaling, a first semi-static RRC signaling and a second semi-static RRC signaling, and a first DCI and a second DCI.

Time Resource Information for Common Case

In some implementations, the UE is configured with same time resource information with one common indication for different PDCCH and/or other associated channels. In a first example in which there are two PDCCH (PDCCH1 and PDCCH2), the starting symbol and/or ending symbol for PDCCH1 and PDCCH2 can be same. In a second example in which there are two PDCCH (PDCCH1 and PDCCH2)

and associated PDSCH (PDSCH1 and PDSCH2), the starting symbol and/or ending symbol for PDSCH1 associated with PDCCH1 and for PDSCH2 associated with PDCCH2 can be same. In a third example in which there are two PDCCH (PDCCH1 and PDCCH2) and associated PUSCH (PUSCH1 and PUSCH2), the starting symbol and/or ending symbol for PUSCH1 associated with PDCCH1 and for PUSCH2 associated with PDCCH2 can be same. For fourth example, the starting symbol and/or ending symbol for PUCCH1 associated with PDCCH1 and PUCCH2 associated with PDCCH2 can be same.

Figure 25B:
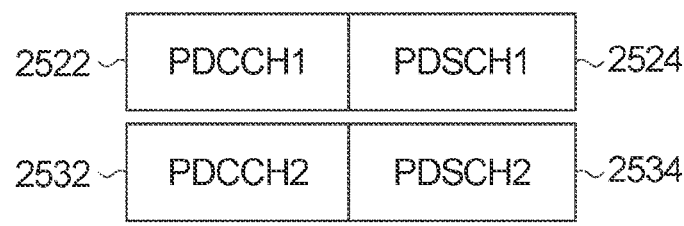
FIG. 25B is a representative illustration of two PDCCH and associated PDSCH having the same respective time unit segments.

FIG. 25B illustrates an example of same time resource information. FIG. 25B illustrates a PDCCH1 2522 with a corresponding PDSCH1 2524 occupying at least a portion of a time unit and a PDCCH2 2532 with a corresponding PDSCH2 2534 occupying at least a portion of the time unit. The overall duration of PDCCH1 2522 and PDSCH1 2524 is the same as for PDCCH2 2532 and PDSCH4 2534 and the duration and starting symbol of the respective PDCCHs and PDSCH are the same as well.

In some implementations, the UE is configured to determine time resource information that is common for multiple PDCCHs and/or associated PDSCHs and/or PUSCHs and/or PUCCHs. The time resource information can be defined or shared based on a common indication scheme. The indication scheme may include DL control signaling or semi-static RRC signaling used by the network.

For either the case of a different or a common time resource used by different PDCCHs and/or associated PDSCHs and/or PUSCHs and/or PUCCHs, a list of examples of time resource information, which is not intended to be limiting in nature, includes information such as PDCCH starting symbol, PDCCH ending symbol, PDSCH starting symbol, PDSCH ending symbol, PUSCH starting symbol, PUSCH ending symbol, PUCCH starting symbol, and PUCCH ending symbol.

HARQ Feedback

Figure 26A:
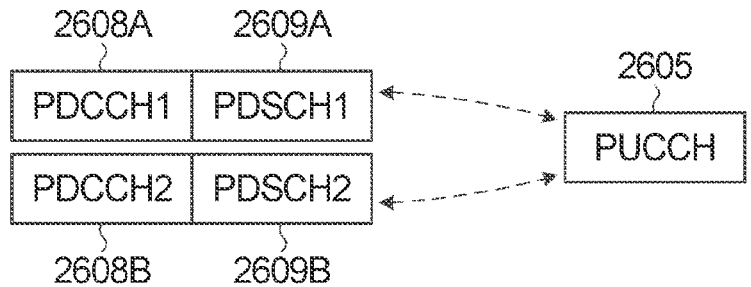
FIG. 26A is a representative drawing of a common PUCCH associated with two PDCCH and PDSCH.

When using HARQ feedback an uplink control channel is assigned to allow the UE a channel for providing an acknowledgement or negative acknowledgement (ACK/NACK) as to whether information (codeword and/or code block and/or code block group) transmitted in the downlink direction was received and decoded. In some implementations according to the present application, one common Physical Uplink Control Channel (PUCCH) is allocated for transmission of all ACK/NACK bits that are associated with multiple PDCCHs and/or PDSCHs and with one PDCCH and/or PDSCH that is associated with one or multiple codewords (CW) of PDSCH and with one CW that is associated with one or multiple code blocks (CB) or code block groups (CBG) of PDSCH, wherein one CBG includes at least one CB. An example of this is illustrated in FIG. 26A. FIG. 26A illustrates, similarly to FIG. 25B an example of a transmission resource including PDCCH1 2608A being transmitted along with PDSCH1 2609A from a first TRP and PDCCH2 2608B being transmitted along with PDSCH2 2609B from a second TRP. Also included in FIG. 26A is a single common PUCCH 2605 for transmission of ACK/NACK bits associated with PDSCHs 2609A and 2609B.

Figure 27:
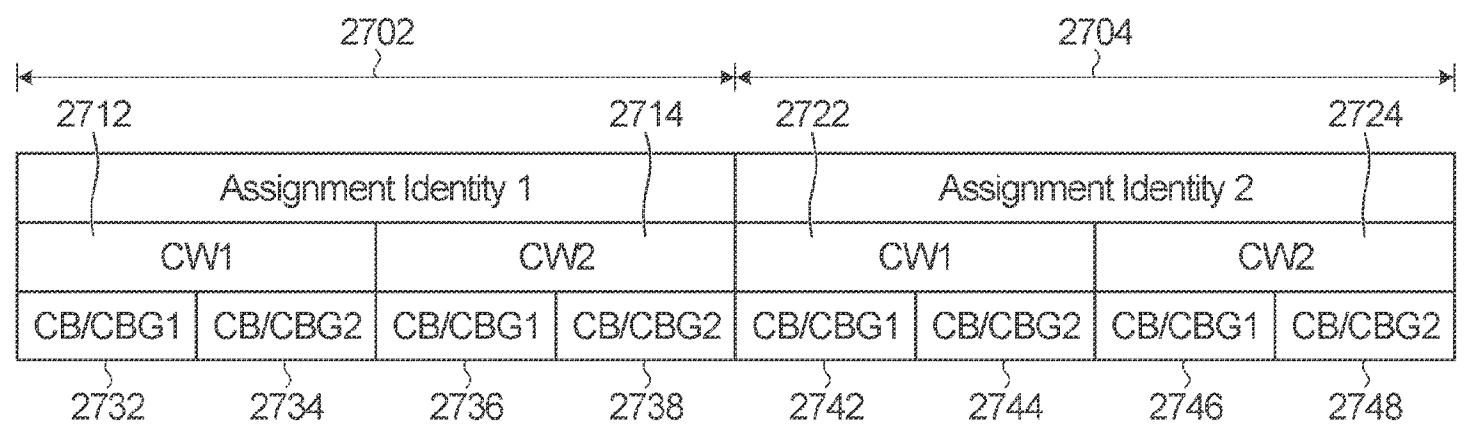

The total number of combined ACK/NACK bits may be determined based on one or more of the following three numbers wherein the first number is the number of semi-statically configured maximum PDCCHs and the second number is the number of semi-statically configured CWs or transport blocks (TB) associated with the specific PDCCH and the third number is the number of semi-statically configured code blocks (CB) or code block groups (CBG) associated with the specific CB/TB and specific PDCCH. One or more CB or CBG form a codeword, as can be seen in the example of FIG. 27. In a first example, the total number of combined ACK/NACK bits is the same as the number of PDCCH and one PDCCH is associated with one CW/TB ACK/NACK bit. In a second example, the total number of combined ACK/NACK bits is the same as the total number of CW/TB associated multiple PDCCHs and one PDCCH is associated with a specific number of CW/TB ACK/NACK bit. In a third example, the total number of combined ACK/NACK bits is the same as the total number of CB/CBG associated multiple PDCCHs and one PDCCH is associated with a specific number of CB/TB and one CW/TB is associated with a specific number of CB/CBG ACK/NACK bit.

FIG. 27 illustrates examples of three numbers for two successive ACK/NACK segments for two assignments (i.e. PDCCHs) associated all feedback bits each having a respective assignment identity. For a first scenario, the first ACK/NACK segment 2702 is associated with a first assignment identity and the second ACK/NACK segment 2704 is associated with a second assignment identity. Each assignment identity has an associated index number, i.e. Assignment Identity1 and Assignment Identity2. As indicated above, the number of assignments associated with the respective ACK/NACK segments 2702 and 2704 can be used to determine the number of ACK/NACK bits that will be concatenated together and transmitted on the PUCCH.

For a second scenario, the first ACK/NACK segment 2702 is shown to have two codewords 2712 and 2714. Similarly, in the second ACK/NACK segment 2704 there are two codewords 2722 and 2724. Each respective codeword has an associated index number, i.e. CW1 and CW2, in the respective ACK/NACK segment. As indicated above, the number of codewords in the respective ACK/NACK segments can be used to determine the number of ACK/NACK bits that will be concatenated together and transmitted on the PUCCH.

For a third scenario, the first ACK/NACK segment 2702 is shown to have four codeblocks or codeblock groups 2732, 2734, 2736 and 2738. Similarly, in the second ACK/NACK segment 2704 there are four codeblocks or codeblock groups 2742, 2744, 2746 and 2748. Each respective codeblock or codeblock group has an associated index number i.e. CB/CBG1, CB/CBG2 in within each codeblock or codeblock group of the respective ACK/NACK segment. As indicated above, the number of codeblock or codeblock group in the respective ACK/NACK segments can be used to determine the number of ACK/NACK bits that will be concatenated together and transmitted on the PUCCH.

In some embodiments, the ACK/NACK bit codebook size is associated with the maximum number of PDCCH.

If the ACK/NACK bits for multiple assignments are transmitted together in the PUCCH, there is to be an agreed upon manner of concatenating the ACK/NACK bits to ensure that both the network and the UEs know how the ACK/NACK bits are combined and thus which bits correspond to which assignments. The manner in which the PUCCH ACK/NACK bits are concatenated may be based on at least one of the following ordering and mapping rules for arranging the ACK/NACK bits.

In some embodiments, for ACK/NACK bits that correspond to different assignments as shown in FIG. 27, the ACK/NACK bits corresponding to an assignment with a lower index number precede the ACK/NACK bits corresponding to an assignment with a higher index number.

In some embodiments, for ACK/NACK bits corresponding to one assignment, the ACK/NACK bits corresponding to a codeword with a lower index number precede the ACK/NACK bits corresponding to a codeword with a higher index.

In some embodiments, for ACK/NACK bits corresponding to one codeword, the ACK/NACK bits corresponding to a code block or code block group with a lower index precede the ACK/NACK bits corresponding to the code block or code block group with a higher index.

The UE can be provided with the common PUCCH resource for the concatenated ACK/NACK bits via semi-static dedicated signaling, such as RRC. The resource can be at least one of a time resource, a frequency resource, a combination time/frequency resource, a code, a layer and port resource.

Figure 26B:
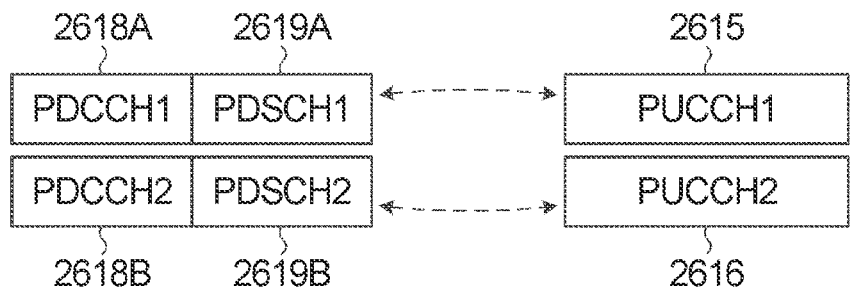
FIG. 26B is a representative drawing of a two PUCCH, each associated with a respective PDCCH and PDSCH.

In another implementation, as shown in FIG. 26B, separate PUCCH(s) are transmitted for ACK/NACK bits that are associated with different assignments. FIG. 26B illustrates an example of a transmission resource including PDCCH1 2618A being transmitted along with PDSCH1 2619A from a first TRP and PDCCH2 2618B being transmitted along with PDSCH2 2619b from a second TRP. Also included in FIG. 26B are two PUCCH, PUCCH1 2615 for transmission of ACK/NACKs associated with the PDCCH1 2618A and/or PDSCH1 2619A and PUCCH2 2616 for transmission of ACK/NACKs associated with the PDCCH2 2618B and/or PDSCH2 2619B.

A single PUCCH resource is only used for all ACK/NACK bits associated with the one data channel type assignment. Each PUCCH can have specific resource information. Examples of the information include specific assignment resource information (for example, a first CCE index, CORESET index), specific semi-static PUCCH resource index and time, frequency, code, layer, and/or port resource information.

HARQ Feedback by Piggybacking UCIs

Figure 26C:
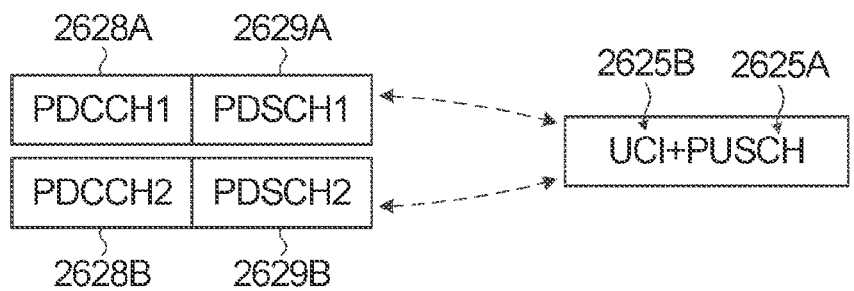
FIG. 26C is a representative drawing of a common Uplink Control Information (UCI) associated with two PDCCH piggybacked on top of a PUSCH.

When using HARQ feedback an uplink data channel is assigned to allow the UE a channel for providing an acknowledgement or negative acknowledgement as to whether information transmitted in the downlink direction was received and decoded. In some implementations according to the present application, one common Physical Uplink Shared Channel (PUSCH) is allocated for transmission of all ACK/NACK bits, carried in an Uplink Control Information (UCI) message, that are associated with various DL PDCCHs. An example of this is illustrated in FIG. 26C. FIG. 26C illustrates an example of a transmission resource including PDCCH1 2628a being transmitted along with PDSCH1 2629A from a first TRP and PDCCH2 2628B being transmitted along with PDSCH2 2629B from a second TRP. Also included in FIG. 26C is a single common PUSCH 2625A for transmission of ACKs and NACKs associated with PDSCHs 2629A and 2629B carried inside a single common UCI 2625B.

The total number of combined ACK/NACK bits may be determined based on one or more of the following scenarios. In a first scenario, the number of ACK/NACK bits that are transmitted by the UE is based on a number of semi-statically configured maximum PDCCHs. In a second scenario, the number of ACK/NACK bits is based on a number of semi-statically configured codewords, for example the number of codewords in a transport block (TB). In a third scenario, the number of ACK/NACK bits is based on a number of semi-statically configured code blocks (CB) or code block groups (CBG). One or more CB or CBG form a codeword, as can be seen in the example of FIG. 27.

Figure 26D:
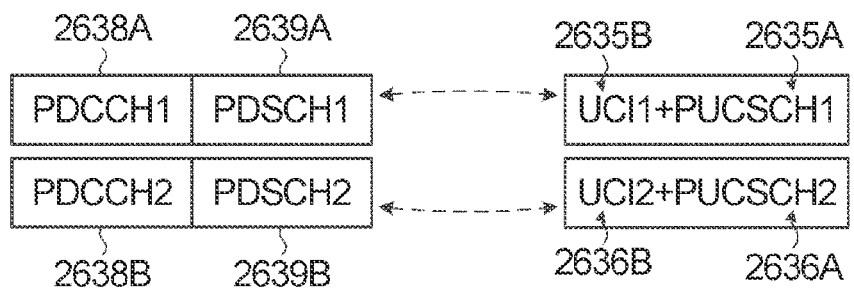
FIG. 26D is a representative drawing of two UCIs associated with one of two possible PDCCH piggybacked on top of one out of two possible PUSCH.

In another implementation, as shown in FIG. 26D, separate PUSCH(s) are transmitted for ACK/NACK bits that are associated with different assignments. FIG. 26D illustrates an example of a transmission resource including PDCCH1 2638A being transmitted along with PDSCH1 2639A from a first TRP and PDCCH2 2638B being transmitted along with PDSCH2 2639B from a second TRP. Also included in FIG. 7D are two UCIs, UCI1 2635B for transmission of ACKs and NACKs associated with the DL assignments found in the PDSCH1 2639A and UCI2 2636B for transmission of ACKs and NACKs associated with the DL assignments found in the PDSCH2 2639B.

A single PUSCH resource is only used for all ACK/NACK bits associated with the one data channel type assignment. Each PUSCH can have specific resource information. Examples of the information include specific assignment which can be any one or more of time, frequency, code, layer, and/or port resource information.

Figure 26E:
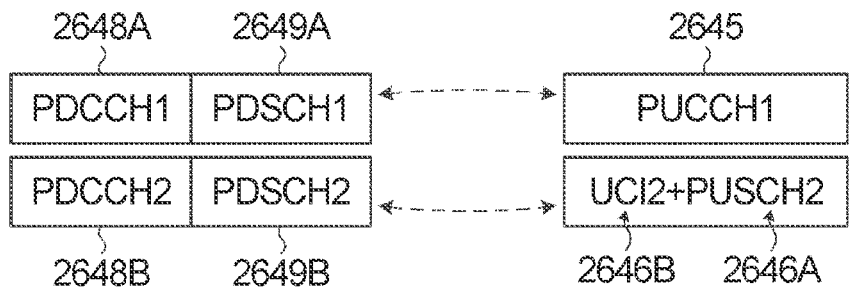
FIG. 26E is a representative drawing of one PUCCH associated to one of two possible PDCCH and one UCI associated with one of two possible PDCCH piggybacked on top of one of two possible PUSCH.

In another implementation, as shown in FIG. 26E, a hybrid approach can be used whereby some ACKs and NACKs associated with a given DL assignment are transmitted over the PUCCH resources associated to that DL assignment, while other ACKs and NACKs associated with another DL assignment are transmitted over the PUSCH resources associated with that other DL assignment. FIG. 26E illustrates an example of a transmission resource including PDCCH1 2648A being transmitted along with PDSCH1 2649A from a first TRP and PDCCH2 2648B being transmitted along with PDSCH2 2649B from a second TRP. Also included in FIG. 26E is PUCCH1 2645 for transmission of ACKs and NACKs associated with the DL assignments found in the PDSCH1 2649A and PUSCH2 2646A and UCI2 2646B for transmission of ACKs and NACKs associated with the DL assignments found in the PDSCH2 2649B.

Figure 26F:
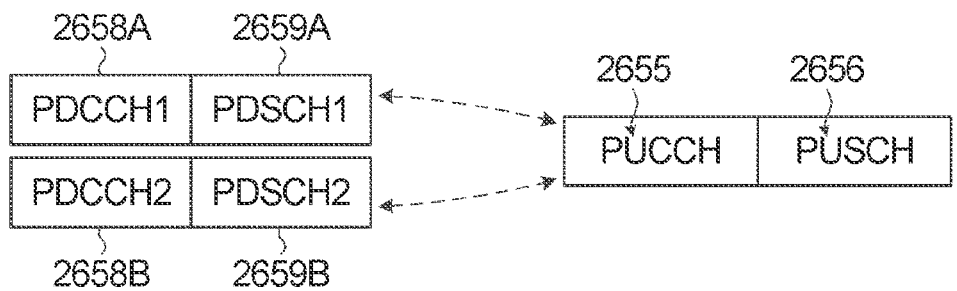
FIG. 26F is a representative drawing of a common PUCCH associated with two PDCCH and a single common PUSCH associated with one of two possible PDCCH.

In another implementation, as shown in FIG. 26F, a single common PUCCH 2655 is used for all ACK/NACK bits associated with the PDCCHs 2658a and 2659a that the UE received. The UE also transmits a single common PUSCH 2656 which is associated with one out of all the PDCCHs but no UCI is piggybacked on the single common PUSCH.

Figure 26G:
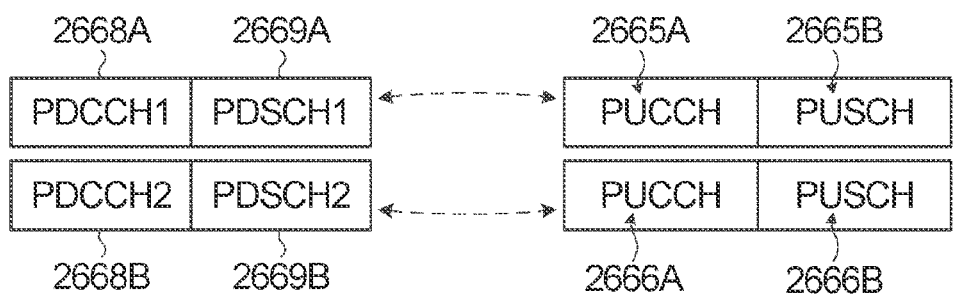
FIG. 26G is a representative drawing of two PUCCHs, each associated with a respective PDCCH, and separate PUSCH, each associated with a respective PDCCH.

In another implementation, as shown in FIG. 26G, separate PUCCHs 2665A and 2666A are used for ACK/NACK bits associated with different PDCCHs 2668A and 2669A that the UE received. The UE also transmits separate PUSCHs 2665B and 2666B where each PUSCH is associated with one out of all the PDCCHs but no UCIs are piggybacked on the separate PUSCHs.

Association Between UL and Assignment

In some embodiments, the network provides the UE with an association between UL power control parameters and a reference PDCCH of multiple PDCCHs that can be used for scheduling PDSCH and which contain dynamic transmission power control or transmission power command (TPC). The association may be provided using RRC signaling. In a first example in which there are two PDCCH (PDCCH1 and PDCCH2), a UE is configured to use TPC from PDCCH1 or PDCCH2 for the dynamic adjustment for PUSCH and/or PUCCH power control, in this example, PDCCH1 or PDCCH2 can be a reference PDCCH for TPC operation. In a second example in which there are two PDCCH (PDCCH1 and PDCCH2), one PDCCH is associated with the specific PUSCH and/or PUCCH, then this PDCCH will be regarded as a default reference PDCCH for the specific PUSCH and/or PUCCH TPC operation. In a third example, for multiple PUSCHs and/or PUCCHs which are associated different PDCCHs, the specific and/or common open-loop power control parameter can be configured. In this example, specific open-loop power control parameter can be at least one of first nominal power, second UE-specific power, pathloss compensation factor and common open-loop power control parameter can be at least one of first nominal power, second UE-specific power, pathloss compensation factor.

Figure 28A:
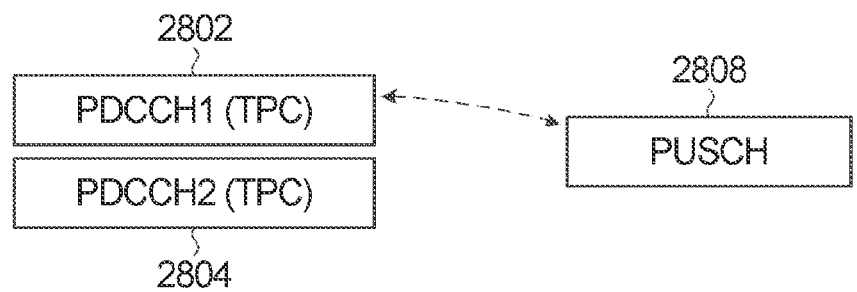
FIG. 28A is a representative drawing of a PUSCH associated with a particular one of two possible PDCCH.

A representative example of this is shown in FIG. 28A. FIG. 28A illustrates a first PDCCH1 2802 and a second PDCCH2 2804 which are both for scheduling PDSCH and contains dynamic TPC. The two PDCCH 2802 and 2804 may be channels in a transmission source shared by two TRPs. FIG. 28A also includes a PUSCH 2808. The PDCCH can include TPC information for use by the UE when transmitting in the uplink direction. The network may provide an association to the UE that TPC information that is part of a PDCCH1 2802 should be used for uplink power control (UL PC) for a physical uplink shared channel (PUSCH). As shown in FIG. 24A, a TRP may schedule PUSCH, PDSCH, or both, for a given UE. With relation to FIG. 28A, the TRP associated with PDCCH2 2804 may not schedule a PUSCH for the UE and thus the UE should not use TPC information that is transmitted by the TRP associated with PDCCH2 2804

Figure 28B:
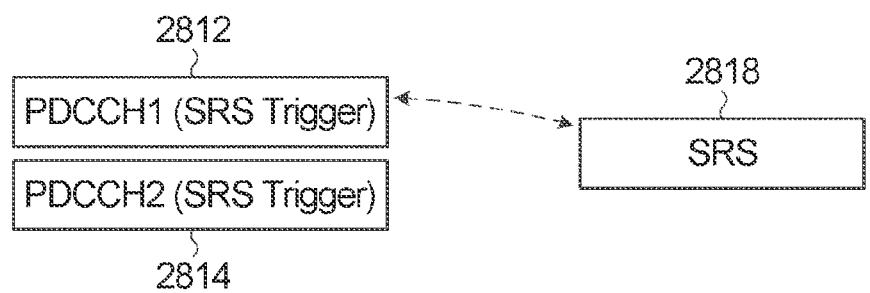
FIG. 28B is a representative drawing of a Sounding Reference Signal (SRS) associated with a particular one of two possible PDCCH.

In some embodiments, the UE is provided with an association between an uplink sounding resource signal (UL SRS) triggering parameter and a reference PDCCH of multiple PDCCHs that can be used for carrying SRS triggering parameter. The association may be provided using RRC signaling. In a first example in which there are two PDCCH (PDCCH1 and PDCCH2) and each PDCCH has one SRS trigger, a UE is configured to use SRS trigger from PDCCH1 or PDCCH2 for SRS transmission, in this example, PDCCH1 or PDCCH2 can be a reference PDCCH for TPC operation. A representative example of this is shown in FIG. 28B. FIG. 28B illustrates a first PDCCH1 2812 and a second PDCCH2 2814. FIG. 28B also includes a SRS transmission 2818. The PDCCH 2812 and 2814 may include a SRS triggering parameter respectively. The network may provide an association to the UE that and the SRS triggering parameter that is part of a PDCCH1 2812 should be used for SRS transmission. Defining and utilizing such an association may help the UE avoid errors to using an incorrect SRS trigger.

Association Between UL and Assignment

Figure 28C:
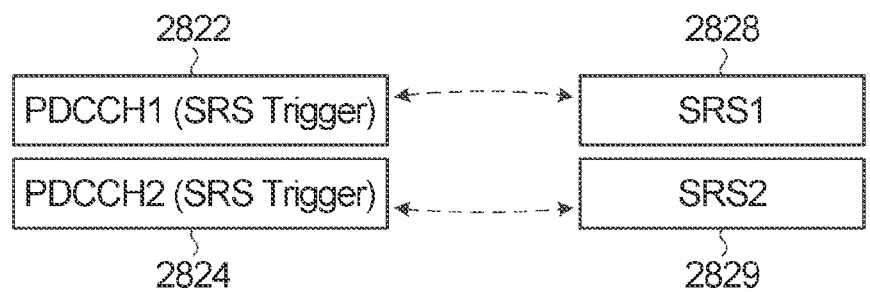
FIG. 28C is a representative drawing of two Sounding Reference Signals (SRS) associated with a particular one of two possible PDCCH.

In some embodiments, the UE is provided with an association between separate uplink sounding resource signal (UL SRS) triggering parameters and the assignment identity. The association may be provided using RRC signaling. A representative example of this is shown in FIG. 28C. FIG. 28C illustrates a first PDCCH1 2822 and a second PDCCH2 2824. FIG. 28C also includes SRS1 2828 associated to PDCCH1 2822 and SRS2 2829 associated to PDCCH2 2824. The PDCCH 2822 and 2824 may include a SRS triggering parameter. The network may provide an association to the UE that the SRS triggering parameter that is part of PDCCH1 2822 should be used for SRS transmission SRS1 2828 and the SRS triggering parameter that is part of PDCCH2 2824 should be used for SRS transmission SRS2 2829. Defining and utilizing such an association may help the UE avoid errors to using incorrect SRS triggers. The network may provide the separate UL SRS triggers a set of configuration parameters such that the UE services the separate SRS triggers using different time resource, frequency resource, code resource, layer resource, port resource, period information and bandwidth information.

In some embodiments, the network may define any further higher-layer signaling parameters using long-term coordination rules used to ensure that different TRPs do not send UL SRS triggers using the same set of configuration parameters. The network may also provide separate UL SRS triggers the exact same set of configuration parameters, in which case the UE treats them as one and the same request.

ARQ Process Association

In some implementations, one UE can be configured with a different maximum HARQ process number for PUSCH or PDSCH according to the configured number of PDCCH for one channel type (unicast or UE-specific) and the same C-RNTI type and one cell or component carrier. The maximum HARQ process number for PUSCH and PDSCH is two separate definitions. In a first example, the UE is configured with a first maximum HARQ process number associated with first PDCCH number for PDSCH or PUSCH that is configured to be monitored simultaneously and the UE is configured with a second maximum HARQ process number for second PDCCH number for PDSCH or PUSCH that is configured to be monitored simultaneously. In this example, first and/or second maximum HARQ process number is configured with RRC signaling. In a second example, the UE is configured to derive the maximum HARQ process number based on the number of PDCCH and the one maximum HARQ process number which is defined for one PDSCH or PUSCH. In this example UE is configured with one maximum HARQ process number Nmax for one PDCCH for PDSCH or PUSCH and derive another maximum HARQ process number by Nmax*N wherein N is another configured number of PDCCH for PDSCH or PUSCH.

In some implementations, a HARQ process ID (HPID) associated with a specific assignment can be derived from parameters known to the UE. For example, the UE can use an initial HARQ process ID (HPIDIni) carried by the assignment, an assignment identity (AI) associated with the assignment and a maximum number of HARQ processes per assignment (Nmax). In such a scenario, the HPID can then be determined using the relationship of HPID=HPIDIni+ AI×Nmax.

In a particular example scenario for a single TRP (i.e. one PDCCH) in a cell there are eight possible HARQ processes, i.e. 0 to 7, defined using three bits. This can be seen in FIG. 29A, i.e. HP1 to HPN, where N=8. For a scenario having two TRPs (i.e. two PDCCHs) in the cell, each TRP (associated with specific PDCCH) may have eight respective HARQ processes, each defined by three bits. If each TRP has a unique assignment identity value within the cell then the assignment identity can be combined with the HARQ process numbers for each respective TRP to avoid confusion between HARQ processes. In the case of two TRPs, utilizing a single additional bit can be used as the assignment identity, i.e. a "0" bit for assignments from a first TRP and a "1" bit assignments for the second TRP. The assignment identity is known by the UE, either explicitly or implicitly, as described above, and enables the HARQ process to be determined for assignments from the respective TRPs. This can be seen in FIG. 29A, i.e. HP1 to HP2×N, where N=8.

While the above example describes the use of three bits for a total of eight values of HP, it is to be understood that this is merely an example and in some implementation 2 bits for four HP or more than three bits could be used. In addition, as the second example described a situation with two TRP, each having an associated assignment identity that could be identified with a single value of one bit, it should be understood that for a large number of TRP, the assignment identity may be two or more bits.

In some embodiments, when multiple TRPs are being used in the same region, or in adjacent regions, in for example the case of handoff, there are various joint transmission options that can be utilized for communicating with UEs. As discussed above, in one option, information can be transmitted using a single PDCCH from one TRP and information can be transmitted using a same PDSCH from one or multiple TRPs or information can be transmitted on different layers of a same PDSCH from more than one TRP. In another option, information can be transmitted using a single PDCCH that schedules information on different PDSCHs transmitted from more than one respective TRP. In a further option, multiple and independent PDCCHs can be transmitted that schedule information on different PDSCHs transmitted from more than one respective TRP.

Scheduling by multiple TRPs can be either coordinated or non-coordinated. The TRPs can schedule transmission using the same or different physical layer (PHY) resources. As mentioned above, PDCCHs from more than one TRP can map to same or different CORESETs or CORESET group and data channels or PDSCHs of the respective PDCCHs may be assigned orthogonal resources or overlapping resources.

In some implementations, the TRPs may perform joint pre-emption of part of resources assigned a traffic/service type to provide enhanced reliability to a transmission of another traffic/service type. In particular, transmission can be scheduled for multiple traffic types and/or services in a shared time-frequency region. One traffic type such as Ultra Reliable Low Latency Communications (URLLC) may require more reliability and faster transmission opportunity than other traffic type such as enhanced Mobile Broadband (eMBB). Joint pre-emption by multiple TRPs may benefit at least the cell-edge URLLC UEs. For example, a serving TRP, or a network controller controlling a serving TRP and a TRP in an adjacent region in a same or a different cell, may cause a portion of a transmission resource utilized by the TRP in the adjacent region to be punctured and thus not transmit during a time when the serving TRP is transmitting to URLLC UE to avoid potential interference at the URLLC UE between transmissions from the serving TRP and the TRP in the adjacent region.

Some implementation of the present application may exploit cooperation of multiple TRPs to further to enhance reliability of PDCCH and PDSCH, or both. Particular examples of techniques that could be used are using shared transmission or data duplication from TRPs, within the limits of backhaul latency constraints, using coded transmissions from multiple TRPs, and soft handover and data duplication via reserved/configured resources.

Figure 30A:
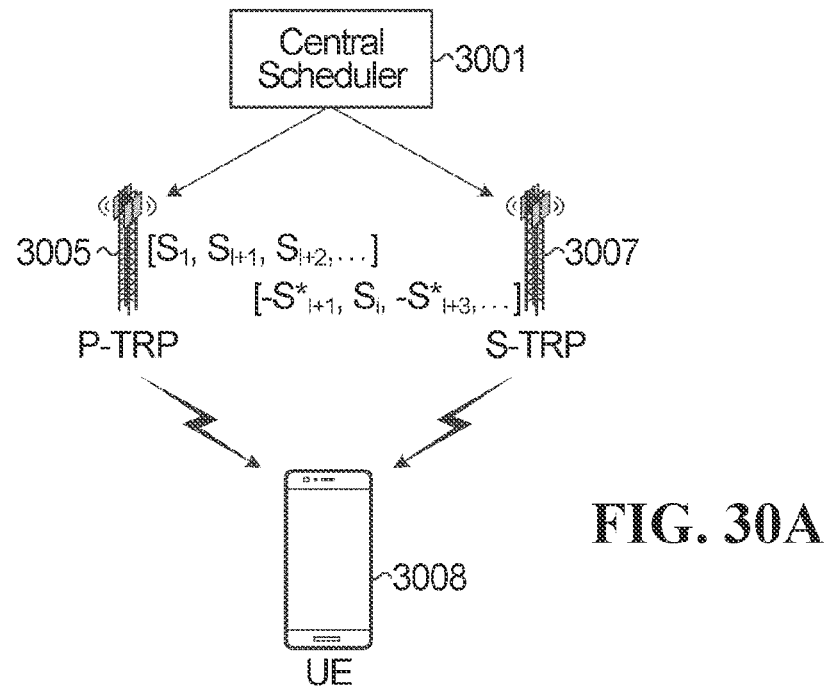
FIG. 30A is a schematic diagram illustrating centralized scheduling for TRP cooperation.
Figure 30B:
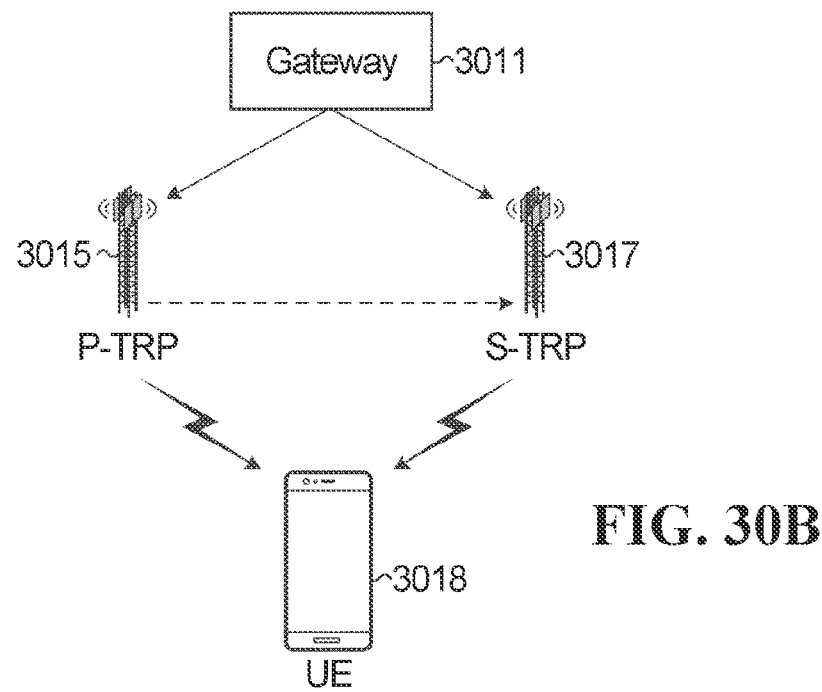
FIG. 30B is a schematic diagram illustrating independent scheduling for TRP cooperation.

For cooperation between TRPs, scheduling can occur either centrally or independently. FIG. 30A illustrates an example of central scheduling in which a central scheduler 3001 communicates scheduling information and UE data to both a Primary TRP (P-TRP) 3005 and a Secondary TRP (S-TRP) 3007. The P-TRP 3005 and the S-TRP 3007 then share transmission. The S-TRP can transmit a separately encoded version of the same transmission block (TB). The particular example shown in FIG. 30A is shown to be an Alamouti-type shared transmission, which when received by UE 3008 provides all the relevant information to the UE 3008 for decoding based on packets received from TRPs. FIG. 30B illustrates an example of independent scheduling in which there are different HARQ entities from each of P-TRP 3015 and the S-TRP 3017. There is no PHY layer combining as can be achieved in FIG. 30A, because the radio link control (RLC) packet segmentation is different at the TRPs.

Note that the TRPs are mentioned in the application in a general context. TRPs can belong to a same or different TRP group, where TRP groups may belong to a same or different cell. A P-TRP or S-TRP as discussed below may refer to single TRP or a TRP group.

Generally, when referring to multiple PDCCH(s) in the following, it is to be understood that this at least corresponds to multiple different PDCCH(s) associated with at least one UE-specific data channel, for DL and UL, with a same or different RNTI type.

For soft-handover between TRPs, either within a region/cell or between adjacent regions/cells, a resource set comprising a time-frequency resource can be configured for a UE and activated for the UE for the purpose of dual connectivity (DC), i.e. a UE connecting to at least two TRPs and receiving/transmitting over multiple links. In some embodiments, the configured resources can be assigned in a semi-persistent scheduling (SPS) manner. A new PDCCH may not be required for using the configured resources that contain data duplication. As a result, the UE may save battery power by not having to monitor for additional PDCCH during DC.

The configured resource can be different from the scheduled resources from the P-TRP.

The resource set is activated before the handover begins. An activation signal notifies the UE when to expect a transmission over the configured resources from an S-TRP. The activation signal may also notify start time and duration of the configured resource set. The activation signal can be provided to the UE by any one of or a combination of the following types of signaling: a UE specific DCI or a group DCI; RRC signaling; or Media Access Control Control Element (MAC CE) signaling. A de-activation signal can be provided to the UE by any one of or a combination of the following types of signaling: a UE specific DCI or a group DCI; RRC signaling; or Media Access Control Control Element (MAC CE) signaling.

The UE receives transmission from multiple links. The data transmission from multiple TRPs can be based on same information bits or same TB. One application of this scheme is data duplication during the handover process. At least one TRP provides dynamically scheduled transmission via PDCCH and optionally, at least one TRP transmits over one or more configured resources. In one example, transmission over the configured resource set can be performed using semi-persistent signaling as opposed to using a dynamic PDCCH transmission. Here in the context of semi-persistent scheduling, it is assumed that a resource set is configured and an activation signal is provided before using the resource set for transmission. The de-activation signal may follow which instructs the UE not to receive or transmit further in the configured resource. Data duplication may be used over the configured resource set, possibly in conjunction with scheduled transmission from at least one of the TRPs. Data duplication during the handover phase can increase URLLC reliability.

Data duplication can be performed in different ways. For example the duplication may be performed using different variations of protocol stacks; duplication at PDCP layer, at the RLC layer or at the MAC layer. Duplication can also be shared via backhaul from the P-TRP to the S-TRP via the X2 or Xn interface.

Both inter-frequency handover, changing from one frequency to another during handover, and intra-frequency handover, maintaining the same frequency during handover, are contemplated for DC.

Resources can be configured for use for transmission from different cells at different times during the handover process. When activated, the configured resource allows RRC configuration or re-configuration, or both, between the serving cell and the target cell. The use of the configured resources can be transparent to the UE, i.e., different TRP can use the configured resource for transmission to the UE at different time occasions during the handover phase.

Figure 31A:
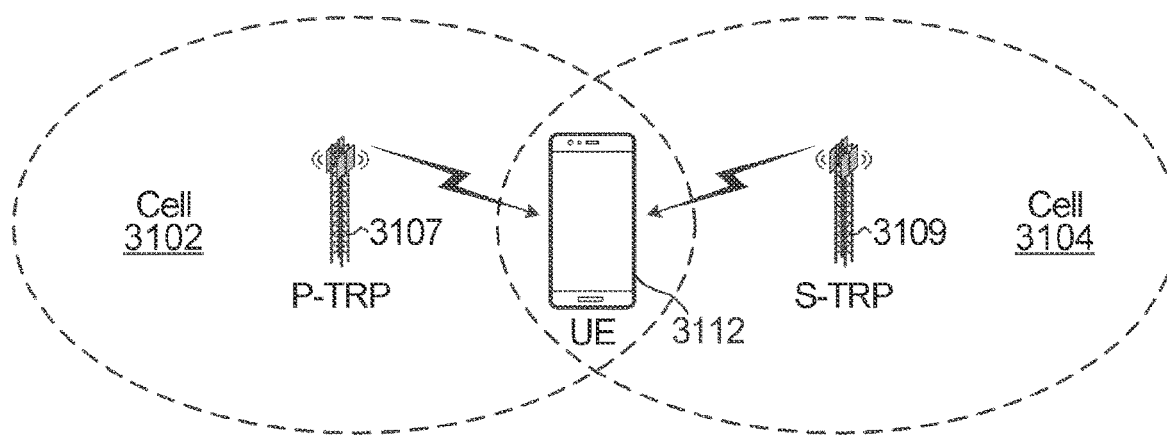
FIG. 31A is a schematic diagram illustrating TRP cooperation using dual connectivity (DC)
Figure 31B:
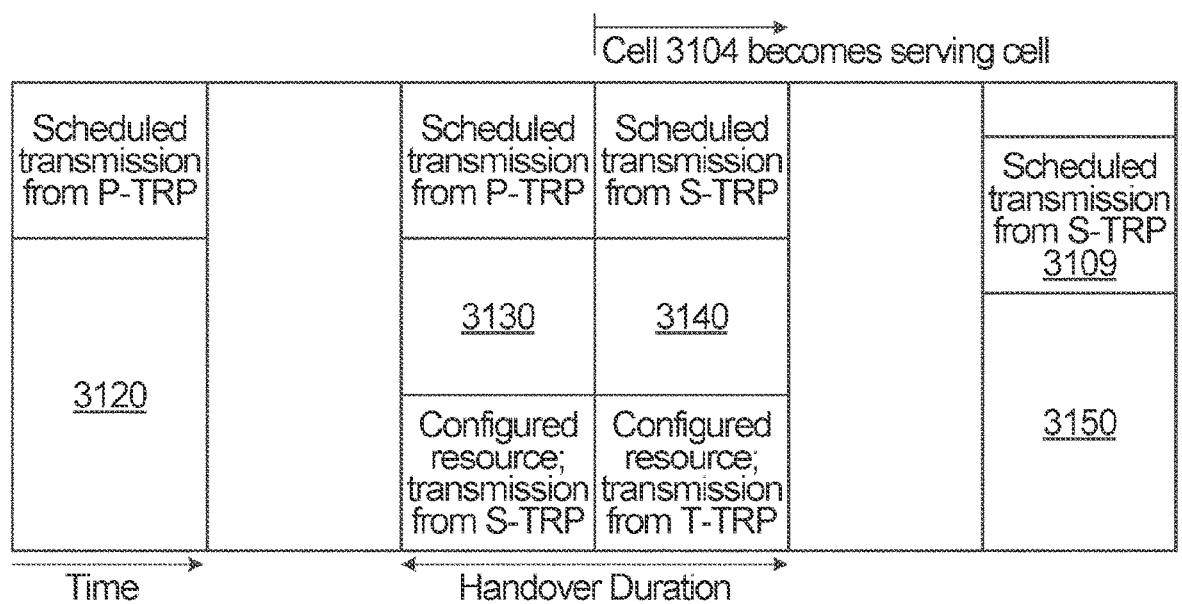
FIG. 31B is a representation of multiple transmission resources over a duration of time during which a handover from one cell to another occurs.

FIG. 31A illustrates an example of two adjacent cells 3102 and 3104, each having a TRP, 3107 and 3109, respectively. A UE 3112 is located at the overlap of the two cells 3102 and 3104 and is being handed over between TRP 3107 and TRP 3109. FIG. 31B illustrates several sequential resource blocks in the time domain. As TRP 3107 is initially the serving TRP, a first resource block 3120 includes PDCCH and scheduled transmission sent by TRP 3107. Third and fourth resource blocks occur during the handover. The third resource block 3130 includes PDCCH and scheduled transmission sent by the TRP 3107 as it is still the serving cell. The third resource block 3130 also includes a configured resource for information to be sent by TRP 3109. Optionally, the configured resources may allow TRP 3109 to be established as the serving cell. By the time the fourth resource block 3140 occurs, TRP 3109 has become the serving cell, and so the fourth resource block 3140 includes control and scheduled transmission sent by the TRP 3109. The fourth resource block 3140 also includes a configured resource for information to be sent by TRP 3107. By the time the sixth resource 3150 block occurs, TRP 3109 sends control and scheduled transmission.

Transmission over the configured resource set is received by the UE in a TRP-transparent manner, i.e. the UE may not know from which TRP the transmission is from. In some embodiments, Quasi-Co-Location (QCL) information may be provided to the UE, if the QCL information is different for the two TRPs.

In some implementations, S-TRP may puncture ongoing transmissions over the configured resource for URLLC UEs to avoid interference and improve reliability. The configured resource set for URLLC UEs that are not activated can be used for other transmission.

Activation and/or deactivation signal can be communicated by any TRP that is associated with the UE. In one example, TRP 3107 provides activation signal and TRP 3109 provides deactivation signal.

In some scenarios there may not be a configured or reserved resource. In such a case the S-TRP may dynamically schedule duplication of the information in a time-frequency resource. The UE may receive scheduled transmission over multiple links where one or more links are used for scheduling data duplication. In such a scenario, the UE needs to be previously configured to monitor multiple search spaces for the possibility of the duplicate information that is dynamically scheduled by the S-TRP. The P-TRP and S-TRP may transmit control information in a same or different CORESETs for scheduling duplicate transmissions.

It is to be understood that DC is mentioned as an example of when a configured resource set can be used for data duplication. More generally, the structure of a configured resource set, which is used based on activation/de-activation signaling, can be used in other scenarios, for example, in an interference limited scenario.

In another embodiment, the dynamically scheduled transmission and transmission over configured resource can be performed by a same TRP or TRP group.

In one example, there may or may not be any PUCCH or uplink channel information (UCI) resource, or both, associated with the DL transmission over the configured resource set. If both serving and target cells are transmitting a same TB or different versions of the same TB, then the UE can combine the scheduled transmission and transmission over the configured resource set. HARQ feedback can be sent in the PUCCH resource configured for the UE or indicated by the scheduling information received, or both. In another example, there may be a PUCCH and/or UCI resource semi-statically associated with the configured resource set. In that case, the UE sends two HARQ feedbacks, one for the scheduled transmission and another for the transmission that occurred over the configured resource set. If data is duplicated based on one MAC, i.e., a same or versions of a same TB that is scheduled from a serving cell and that is transmitted over the configured resource set, then a same HARQ feedback can be duplicated in the two associated PUCCH resources. If data is duplicated at a higher layer, for example, PDCP, then the UE may not identify the TBs transmitted over the two links as based on the same information bits at the PHY layer. In that case, HARQ feedback would be independent.

In some implementations, a single PDCCH is transmitted from the P-TRP and data transmissions (PDSCH) occur from the P-TRP and one or more S-TRP. Different repetition groups are transmitted from different TRPs. The P-TRP is responsible for scheduling up to X repetitions, where K repetitions are transmitted by the P-TRP, K<X, and where K and X are integer values. This leaves K-X repetitions to be transmitted by the one or more S-TRPs. The variable K is configurable and may for example be based on inter-TRP backhaul delay. Not all of the X repetitions may be necessary for a given transmission, for example if the initial transmission or any of the retransmissions are acknowledged as received and thus the S-TRP may not be required to transmit. The extent of sharing the transmission can depend on backhaul latency between the TRPs.

Figure 32A:
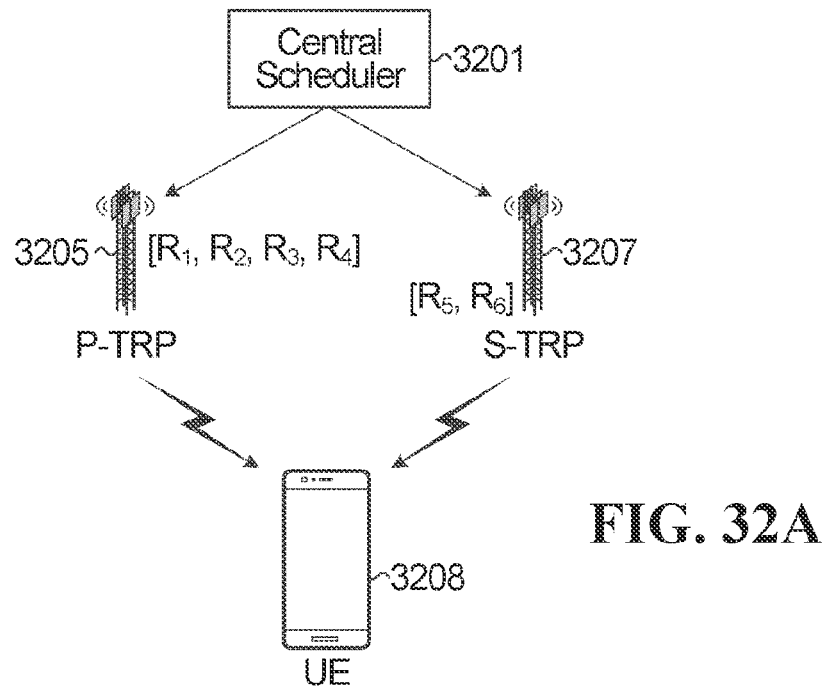
FIG. 32A is a schematic diagram illustrating how repetition of duplicate transmissions may occur in a centralized scheduling scenario for TRP cooperation.

FIG. 32A illustrates an example of centralized scheduling in which a central scheduler 3201 communicates scheduling information to both P-TRP 3205 and S-TRP 3207. The initial transmission and the one or more retransmission can be sent from different TRPs. In FIG. 32A, P-TRP 3205 transmits repetitions R1 to R4 and S-TRP 3207 transmits repetitions R5 and R6. The sequence of repetitions shown in FIG. 32A is only an example. In general, multiple TRP groups can participate in transmission of a TB where at least one TRP group (for example, P-TRP in FIG. 32A) can schedule one or a combination of initial transmission and repetitions and subsequent transmission or re-transmissions. Optionally, another TRP group (for example, S-TRP in FIG. 32A) transmits one or a combination of initial transmission and repetitions and subsequent transmission or re-transmissions of the same TB and the transmission can be either scheduled by a same TRP group or a different TRP group (for example, P-TRP in FIG. 32A) or by a centralized scheduler. A TRP group consists of at least one TRP. One TRP can exclusively belong to one TRP group or may belong to multiple groups. In one example, a P-TRP schedules at least an initial transmission and an S-TRP schedules at least one re-transmission of a same TB. Alternatively, the P-TRP schedules an initial transmission and one set of re-transmissions and the S-TRP schedules another set of re-transmissions of the same TB.

Figure 32B:
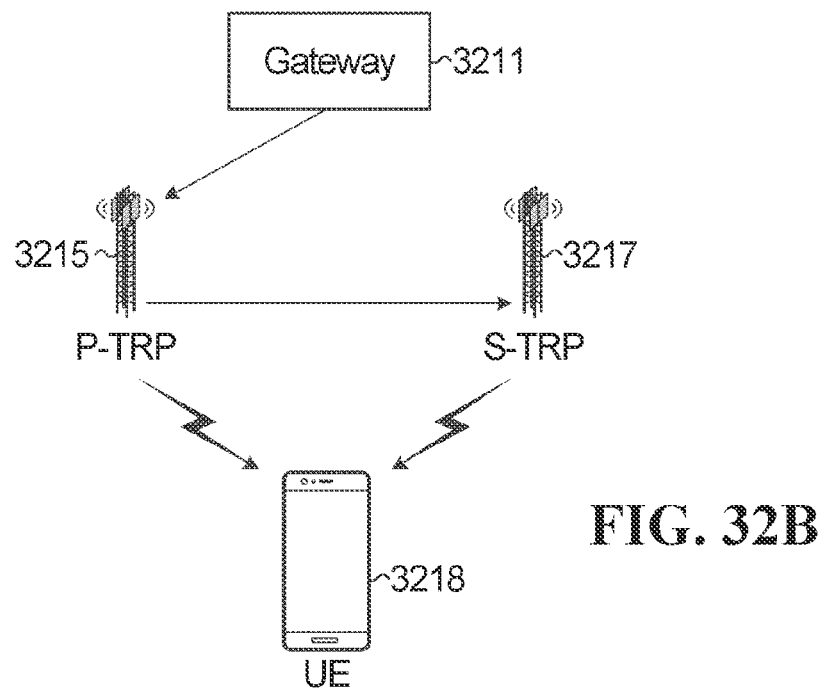
FIG. 32B is a schematic diagram illustrating how repetition of duplicate transmissions may occur in an independent scheduling scenario for TRP cooperation.

FIG. 32B illustrates an example of scheduling in which P-TRP 3215 is responsible for scheduling repetitions by P-TRP 3215 and S-TRP 3217. In this case there is a backhaul connection between P-TRP 3205 and S-TRP 3207. The S-TRP 3207 receives scheduling information from P-TRP 3205. In FIG. 32B, P-TRP 3205 transmits repetitions R1 to R4 and S-TRP 3207 is scheduled by P-TRP 3205 to transmit repetitions R5 and R6. Here, S-TRP is assumed to obtain at least scheduling information over the backhaul from P-TRP within the latency constraint of the service type. The S-TRP may have data already available or optionally may receive data over the backhaul from P-TRP.

Quasi-Co-Location (QCL) information pertaining to the TRPs may or may not be signaled to the UE. The signaling can be in a Downlink Control Indicator (DCI) for use by the UE. Alternatively, signaling can be semi-static or implicitly derived from other communication property for example RS.

In some scenarios, the S-TRP may update scheduling for remaining re-transmissions.

In some embodiments, when independent PDCCHs are transmitted from multiple TRPs, part of the data may be independently scheduled from the S-TRP. The PDCCH may be transmitted using multiple repetitions. The P-TRP shares scheduling information and/or data with the S-TRP. Upon receiving the scheduling information, the S-TRP can schedule re-transmissions of the packet independently or in coordination with the P-TRP.

In some implementations, the S-TRP can repeat the same PDCCH that was sent by P-TRP for initial transmission. The UE may or may not be able to detect PDCCH from the first transmission. Repeating the PDCCH may increase reliability of transmission.

The transmissions from the P-TRP and the S-TRP can be coordinated or uncoordinated.

Figure 33:
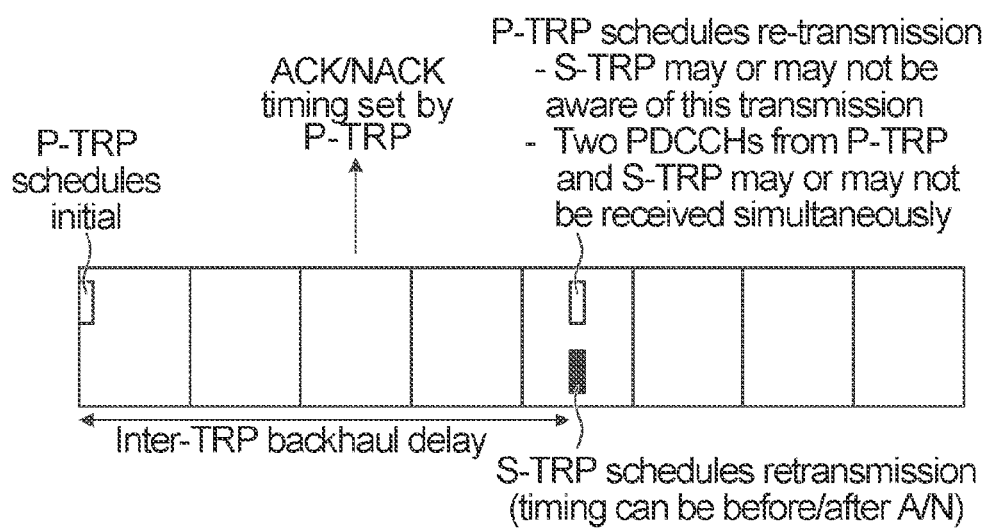
FIG. 33 is a representation of multiple transmission resources over a duration of time illustrating how repetition of transmissions may occur for TRP cooperation in an independent scheduling scenario.

FIG. 33 illustrates an example of several sequential resource blocks. In the first resource block the P-TRP schedules an initial transmission. An inter-TRP backhaul delay in this particular example is substantially the equivalent to the duration of four resource blocks. The P-TRP can schedule a retransmission upon receiving a NACK. The S-TRP also schedules a retransmission upon receiving the scheduling information or data, or both. The S-TRP may or may not be aware of subsequent P-TRP scheduled retransmissions. The timing for an ACK/NACK set by P-TRP during the first transmission can be before or after the scheduled transmission from the S-TRP.

In one example, the S-TRP may update ACK/NACK timing set by P-TRP if the S-TRP is scheduling (re)-transmission of a same TB. The UE can be configured to monitor one or multiple search spaces where control information from the P-TRP and the S-TRP are transmitted.

In some embodiments, data duplication can be performed using the Packet Data Conversion Protocol (PDCP) function. The duplicate packets are received by multiple access nodes over an interface between a P-TRP and an S-TRP (Xn interface) and forwarded to the UE. The UE detects the packet duplication and forwards a single packet to the upper layers. Ideal backhaul provides communication between TRPs that is within the latency requirement.

The UE is configured to monitor one or multiple CORESETs. The UE may not need to know which CORESET is being used by which TRP. It is possible that multiple TRPs can use the same CORESET for PDCCH repetition. The same PDCCH can be received from multiple TRPs over the same or different CORESETs. PDCCHs may refer to the same or different PHY resources for PDSCH transmission.

A number of PDCCH repetitions can be configured or indicated in the first PDCCH sent. DCI fields can be used for scheduling PDCCH repetitions. Scheduling independent PDCCHs from different TRPs may correspond to same HARQ processes. In this case, two TRPs share a same HARQ entity without restriction, i.e., both can schedule a same HARQ process ID.

Alternatively, one HARQ entity is shared among the TRPs and one TRP transmits a set of HARQ process which is different from the set of HARQ processes scheduled by other TRP.

Some embodiments of the present application provide mechanisms to avoid PUCCH resource allocation conflicts when independent PDCCHs are assigned. If a PUCCH resource is indicated in a DCI, ACKs and NACKs, resulting from HARQ processes scheduled by different TRPs may or may not map to a same PUCCH resource. In some embodiments, pre-configured rules can be applied to aid in avoiding conflicts. The PDCCHs may be transmitted in different CORESETs and an association of a PDCCH to a CORESET location can be exploited to multiplex HARQ feedbacks of two PDCCHs in a common PUCCH resource. The two feedbacks may be concatenated or code-multiplexed with each other. A sequence of concatenation or one or more codes used for multiplexing can be associated with one or more of a CORESET location, a given DMRS configuration, other property of PDCCH, or communication link, so that TRPs can distinguish the HARQ feedback received in the same PUCCH resource. If the PDCCHs indicate that the same data or HARQ process is being transmitted by multiple TRPs, then the UE can combine the transmissions received and send HARQ feedback in the PUCCH resource that is received by both TRPs. Two TRPs are used as example described above. However, it is to be understood that the solution can be extended to an arbitrary number of TRPs.

In some embodiments, if different PUCCH resources are indicated for a same HARQ process by different PDCCHs, those PUCCHs can be used for PUCCH repetition, i.e., a same feedback repeated over multiple PUCCH resources. In some embodiments, the UE is configured to use one indicated PUCCH resource For example, one PDCCH indicates a PUCCH resource whereas other PDCCH does not indicate any PUCCH resource. Alternatively, none of the PDCCHs indicate a PUCCH resource and the UE transmits a PUCCH over the pre-configured resource. The two PDCCHs schedule same or different versions of same TB or HARQ process.

In one embodiment, the UE combines the transmissions received and sends HARQ feedback in the indicated or configured PUCCH/UCI resources.

In one embodiment, the two PDCCHs scheduling transmission of a same HARQ process can be received at different times and the PDCCH that is received later can update HARQ timing information. The UE can be configured so that if the second or repeated PDCCH arrives before a specified interval, the UE can follow the updated timing. Alternatively, feedback is repeated in both indicated PUCCH resources as one TRP may not be aware of the HARQ timing and/or PUCCH resource indicated by the other TRP.

In some implementations, the PDCCH may indicate n units of resources for n repetitions of the PUCCH. In some embodiments, for URLLC UEs in particular, the UEs may be configured with a PUCCH repetition number.

Based on indicated PUCCH resource(s), the configuration of the PUCCH may follow a hopping pattern for n repetitions.

The repetition number can be dynamically indicated in a field in the PDCCH. The UE may follow a pre-configured hopping pattern for repetition. Each repetition occasion may comprise a symbol group, which can be a minimum of one symbol. The repetitions may or may not be contiguous.

In one embodiment, the UE may be provided a PUCCH resource together with repetition number. Both PUCCH resource and repetition number can be indicated in a DCI. Alternatively, the PUCCH resource and the repetition number are configured by a higher layer. In another example, the PUCCH resource is indicated in a DCI from the set of PUCCH resource configurations supported by a UE and a repetition number is configured by a higher layer. Starting from the indicated PUCCH resource, the UE can apply a pre-configured hopping rule for repeating PUCCH or HARQ feedback in subsequent symbols. Alternatively, the UE may support multiple configured hopping patterns and one of the hopping patterns is indicated to the UE in the DCI.

In some embodiments, the PDCCHs that can potentially map to a same CORESET can be associated with different DMRS configurations. Each DMRS configuration can be associated with a QCL.

In some embodiments, some CORESETs are associated with particular TRPs so that PDCCHs do not necessarily need have different DMRS configurations.

In some scenarios, PDCCH repetitions can be utilized to enhance reliability. The PDCCH can be repeated in the time domain. The PDCCH can be repeated in consecutive monitoring occasions or data repetition occasions. The PDCCH can also be repeated in the frequency domain. If a UE is configured with multiple CORESET candidates, PDCCH can be repeated over multiple CORESETs in time and/or frequency. The TRP stops PDCCH repetitions once an ACK is received or after a pre-configured number of repetitions.

Figure 34A:
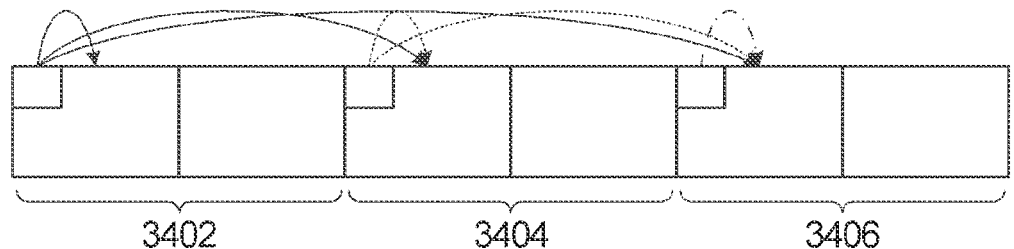
FIG. 34A is a representation of multiple transmission resources over a duration of time illustrating NR-PDCCH transmission for PDSCH repetitions.
Figure 34B:
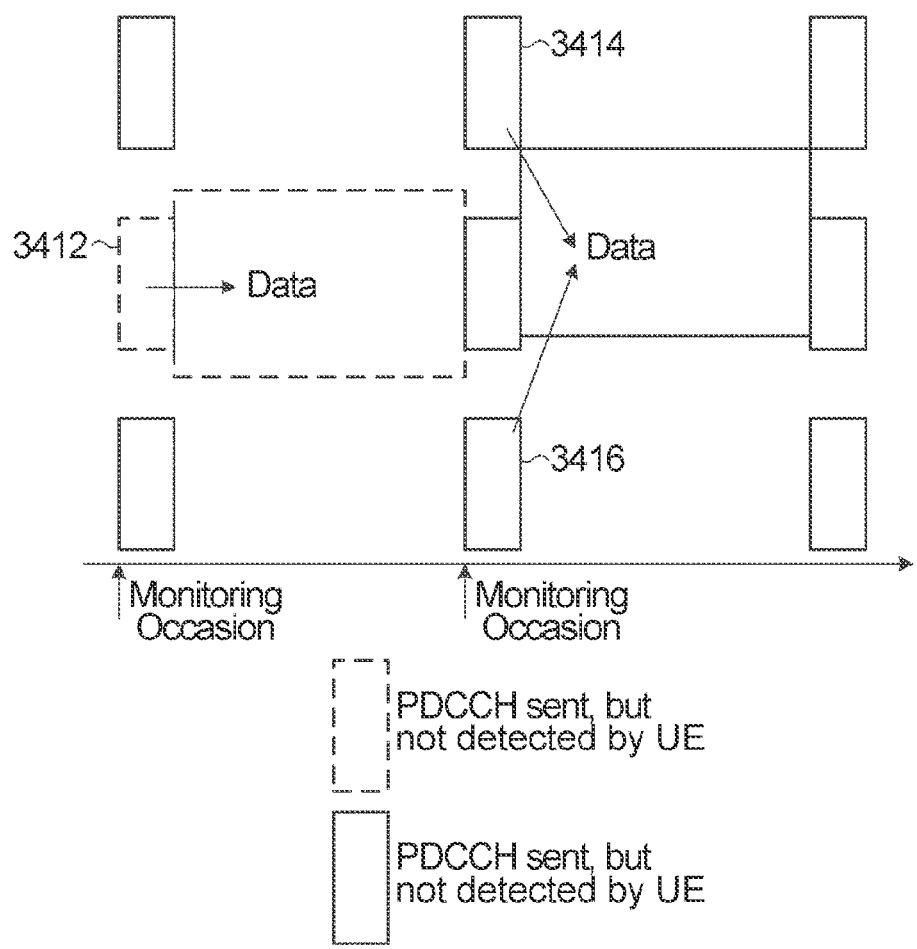
FIG. 34B is another representation of multiple transmission resources over a duration of time illustrating NR-PDCCH transmission for PDSCH repetitions

Using multiple CORESETs for PDCCH repetition can be costly. In some cases a PDCCH may be properly received and decoded by the UE, but the TRP may not receive any indication that the PDCCH has been successfully received. As a set number of repetitions may be performed by the TRP, multiple PDCCH repetitions occur that are not needed. Some of the PDCCH repetitions could be avoided had the TRP received a notification. FIG. 34A illustrates an example of three time-frequency resource blocks 3402, 3404, 3406, in which each resource block begins with a NR-PDCCH that identifies an assignment in a shared resource for a UE subsequent to the PDCCH. In the first and second transmission blocks 3402 and 3404 the NR-PDCCH is not successfully received by the UE. The NR-PDCCH is successfully received in the third transmission block 3406. FIG. 34B shows another example of several PDCCH 3412 and 3414 that are sent but not successfully detected by the UE at a first and a second monitoring occasion and one PDCCH 3416 that is eventually successfully detected by the UE at a second instance of the second monitoring occasion. Furthermore, if CORESETs of different UEs are configured in an overlapping manner, excessive PDCCH repetition may block scheduling of other services. Some embodiments of the application may aid in reducing PDCCH repetition while at the same time ensuring PDCCH is received by the UE.

Some implementations of the present application involve supporting the reduction of overhead for signaling that may not be needed. For example, a PDCCH may be transmitted multiple times to ensure the PDCCH is received by the UE. However, if the UE can transmit some form of acknowledgement that the PDCCH has been received, then the PDCCH may not need to be re-transmitted multiple times. As a result, the resources used for the PDCCH retransmission could be used for something else. Some embodiments of the application include a UL channel being configured to send PDCCH acknowledgement (PDCCH-ACK). The PDCCH-ACK can be used by the TRP as in indication to stop PDCCH repetitions. The PDCCH-ACK could be multiplexed with uplink signaling such as PUCCH and scheduling request (SR). The PDCCH-ACK may be signaled using grant based or grant free signaling.

In some embodiments, UEs can be configured with UL channel resources to send an acknowledgement if the PDCCH is detected (PDCCH-ACK). The PDCCH-ACK timing can be earlier than the timing configured for data ACK/NACKs.

A resource can be allocated in the UL channel x µs after each PDCCH monitoring or repetition occasion to allow the UE to send an acknowledgement if the UE successfully detects the PDCCH. The value of x can be a function of UE capability. In some embodiments, the UE may send a negative acknowledgement if the UE does not successfully detect the PDCCH. If the TRP does not receive the PDCCH-ACK or a NACK, then the TRP would continue to send repetitions of the PDCCH up to a predefined number.

The resources used for the PDCCH-ACK may span a single or multiple symbols in the UL channel.

Figure 35:
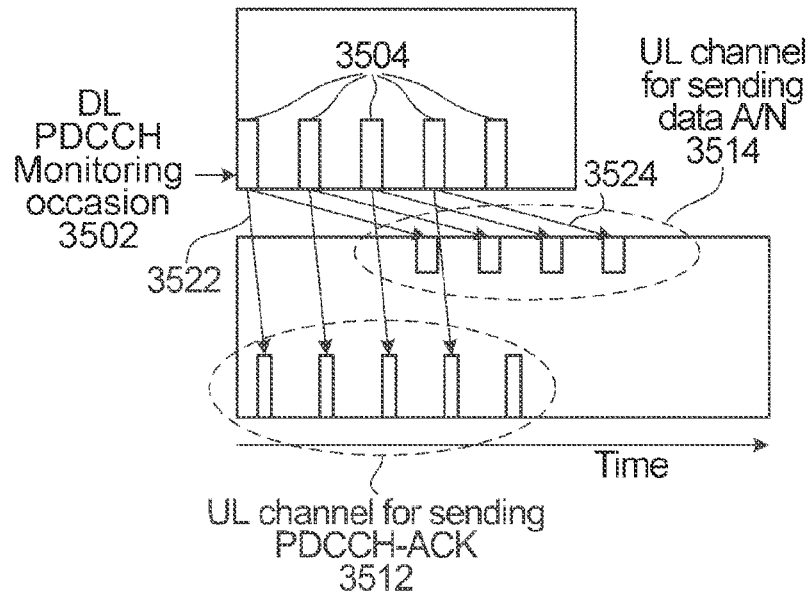
FIG. 35 is a representation of multiple transmission resources over a duration of time illustrating the relationship between PDCCH, an uplink (UL) PDCCH acknowledgement and an UL data ACK/NACK.

FIG. 35 illustrates a representation of DL and UL signaling. In the DL 3502, a channel of the transmission resource 3504 is allocated for PDCCHs and the associated data assignments for the PDCCHs. In the UL 3512, a channel of the transmission resource is allocated for PDCCH-ACKS 3514 and data ACK/NACKs 3516. The relationships between the PDCCH and PDCCH-ACKs and the PDCCHs and the ACK/NACKS are indicated at 3522 and 3524, respectively. As can be seen, the PDCCH-ACK for a particular PDCCH is prior to the data ACK-NACK for the same PDCCH.

The PDCCH-ACK may simply be a single bit to indicate a successfully detected PDCCH.

Channel design options may include a configured one or more resource in a PUCCH region. In some embodiments, PDCCH-ACKs can be multiplexed with one another. A separate resource is configured or indicated for sending PDCCH-ACKs. In some embodiments, PDCCH-ACKs can be multiplexed with data ACK/NACKs or sent in the resources configured or indicated for data ACK/NACK transmission. When the PDCCH-ACKs are multiplexed with data ACK/NACKs or sent in the same resource indicated for data ACK/NACK, based on configured data ACK/NACK timing indicated in a DCI, the TRP can identify what is a PDCCH-ACK and what is a data ACK/NACK.

In some embodiments, the channel design for sending PDCCH-ACK may be reserved resources similar to that used for a scheduling request (SR).

In some embodiments, the channel design may involve combining the PDCCH-ACK with SR if more than one bit is used for SR. For example, when two bits are used for SR, the value "11" indicates a PDCCH-ACK, while "00", "01" and "01" are specific to SR.

In some embodiments, the PDCCH-ACK can be sent using grant-free (GF) transmission. PDCCH-ACKs of multiple UEs may overlap, but could be identified by embedded reference signals (RS) or in code-domain.

It can be understood that the reliability of such a PDCCH-ACK channel is not as stringent as a data ACK/NACK channel. While a PDCCH-ACK may be beneficial to reducing overhead for example, it is not as critical as ACK/NACKs for data.

A UE may receive both enhanced mobile broadcast (eMBB) and URLLC traffic using same DCI format. The UE may have different higher layer configurations for eMBB and URLLC traffic. Identification of which traffic is scheduled is important to avoid errors in detection. Radio resource control (RRC) configuration can be different for the different types of traffic. One solution is to associate the UE with different C-RNTIs for eMBB traffic and URLLC traffic. Or in general, a UE may be associated with multiple C-RNTIs, where each C-RNTI may correspond to a service type. The UE may obtain the C-RNTI along with a RRC configuration for each traffic type supported or may receive the C-RNTIs independently from the RRC configuration, for example, during initial access or a different RRC configuration.

Some embodiments of the application provide higher detection reliability of the PDCCH. As initial transmission of the PDCCH may not be successfully detected by the UE, re-transmission of PDCCH should include transmit block size (TBS) information.

In the case of LTE for example, re-transmissions do not receive TBS information in the DCI. Such LTE re-transmissions provide modulation and resource block allocation information and assume that TBS information is received in an initial transmission DCI. In particular for the case of URLLC, a failure to detect the initial transmission DCI can be detrimental in terms of performance if the TBS information is only transmitted in the initial transmission DCI. Re-transmission/repetition can occur before ACK/NACK for data. Hence, the TRP may not be aware of whether the UE has successfully received the first PDCCH sent. The UE can be configured to identify TBS in each of the repeated PDCCH or at least for the PDCCH repetitions that occur before the ACK/NACK timing set by the first PDCCH sent.

In one embodiment, PDCCH or assignment can be repeated in time and/or frequency domain. In one example, repeated PDCCHs are sent in overlapping or non-overlapping frequency resources, i.e., the search spaces where the PDCCHs are transmitted can be overlapping or non-overlapping. The repeated PDCCHs in frequency may correspond to a common HARQ process or a TB transmission however MCS and/or resource assignment can be same or different. Repeated PDCCHs can be transmitted in same CORESET or different CORESETs. Repeated PDCCHs may have same or different DMRS configurations and/or same or different QCL association. In another example, PDCCH can be repeated in time. For each repetition occasion, same or different CORESET can be used for PDCCH repetition. The PDCCH repetition number can be configured or dynamically indicated. The PDCCH repetition occasion can be every x symbols, where x can be as small as one symbol. In one example, PDCCH is repeated in consecutive monitoring occasions. In another example, PDCCH repetition occasions may comprise non-consecutive PDCCH monitoring occasions. In another example, the PDCCH repetition occasion may not align with PDCCH monitoring occasions. If a UE detects multiple PDCCHs that correspond to transmission of same TB, UE can combine them for robustness or discard the subsequent or other PDCCH repetitions after it detects at least one PDCCH.

A first option to improve PDCCH detection reliability includes a PDCCH that schedules (re)-transmission or subsequent transmission also provides TBS information again before data ACK/NACK is scheduled. In some embodiments, the PDCCH of re-transmission can include the same modulation coding scheme (MCS) or different MCS with the same or a different set of RBs compared to initial transmission. However the TBS information is the same. In some embodiments, different combination of MCS and RBs can be formed from a TBS-lookup table. Hence, the PDCCHs that are repeated can be considered self-contained in terms of containing TBS information.

A second option to improve PDCCH detection reliability may include sending the initial transmission of the PDCCH in a more robust manner. For example, first PDCCH transmission can be transmitted with one or more of: a lower code rate; a higher aggregation level; a higher transmit diversity; and a longer cyclic redundancy check (CRC) than subsequent repetitions of PDCCH or PDCCHs that schedule re-transmission.

In some embodiments, PDCCH scheduling initial transmission may comprise a higher aggregation level than that which would be used for a (re)-transmission PDCCH. In some embodiments, the UE may receive one or multiple PDCCHs scheduling the initial transmission, therefore repetition occurs before the HARQ timeline that is indicated in the first PDCCH sent. In one embodiment, PDCCH repetition is only conducted for initial transmission and not for (re)-transmission. In another embodiment, PDCCH repetition is only conducted for a group of (re)-transmissions. In another embodiment, PDCCH repetition is conducted for initial transmission and a select group of (re)-transmission. (Re)-transmission refers to a re-transmission scheduled either before or after HARQ feedback is received.

Figure 36:
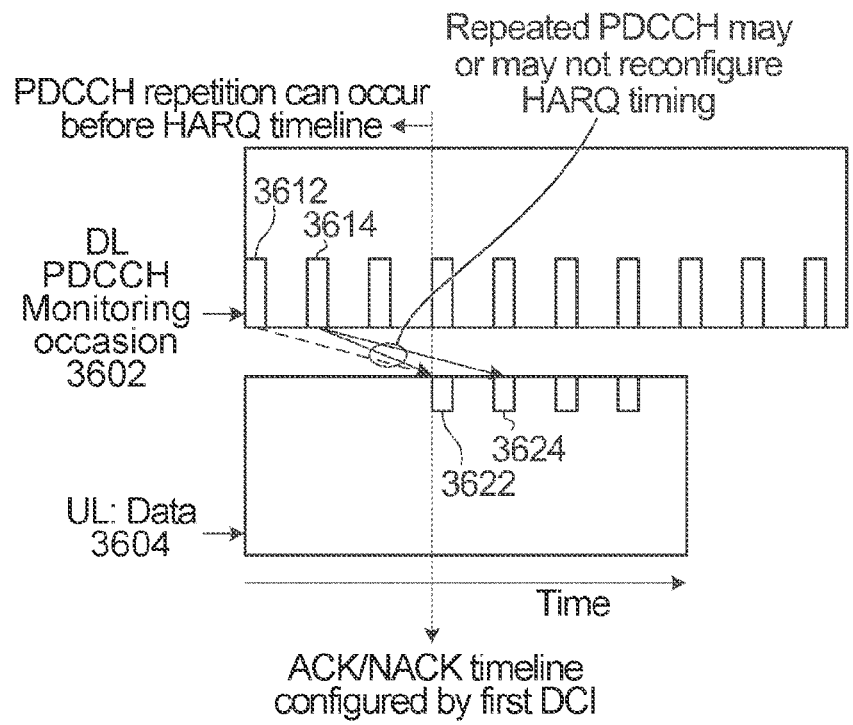
FIG. 36 is a representation of multiple transmission resources over a duration of time illustrating the relationship between PDCCH, and UL data ACK/NACK in which retransmissions of PDCCH includes transmission block size (TBS) information.

The self-contained PDCCH repetition typically occurs before ACK/NACK signaling for data. Each PDCCH provides transmission block size (TBS) information. FIG. 36 illustrates a representative example of DL 3602 and UL 3604 signaling. For each PDCCH monitoring occasion a PDCCH is transmitted that includes the TBS information. The PDCCH repetitions occur before the HARQ for a given packet. A first PDCCH 3612 in the DL 3602 is not detected by the UE as indicated by the dashed line 3616 between the first PDCCH 3612 and the first proposed location 3622 intended for an ACK/NACK in UL 3604. As the first PDCCH 3612 is not detected, the UE is unaware of the proposed location 3622 for the first ACK/NACK. A first repetition of the PDCCH 3614 may or may not reconfigure the HARQ timing. In the case where the HARQ timing is reconfigured, the first repetition PDCCH 1714 maintains the original proposed ACK/NACK location 3622. In the case where the HARQ timing is maintained, the first repetition PDCCH 3614 maintains the original spacing between the repeated PDCCH 3614 and a first ACK/NACK so that the first ACK/NACK is the second proposed ACK/NACK 3624 in the UL 3604.

For a PDCCH transmission, TBS information and the resource assignment can be provided. In some existing protocols, MCS information and the resource assignment can be used to provide the TBS information which the UE obtains from a look-up table. In one example, TBS information can be obtained from indicated MCS and/or RB allocation (i.e., sub-carrier groups) and/or data duration (i.e., number of symbols and/or slots scheduled) and/or number of transmission layers and/or codebook signature used for non-orthogonal access. MCS and/or RB allocation and/or data duration can be semi-statically indicated or dynamically indicated in the PDCCH. The number of resource elements (REs) occupied by a transmission is given by the RB allocation (more generally, sub-carrier group allocation) and data duration. A configurable MCS field can be used, which contains M bits in the PDCCH. The MCS field configuration can be UE specific or cell specific. Data duration indication can be UE specific as well. For example, for one UE the minimum duration is a symbol, whereas for another UE it can be a slot. A look-up table approach for identifying TBS can be obtained as follows: A MCS table, either UE specific or cell specific, is formed where a combination of bits in MCS field correspond to an identifier1, identifier1 maps to another identifier2 based on data duration indicated, which can be UE specific, in another Table (optional), identifier2 maps to a TBS for a given number of RBs allocated in another Table. Each of these Tables can be configured in a UE specific manner. For example, 00 in a MCS field containing 2 bits may map to different values of Modulation and coding for different UEs. Similarly, 10 in a data duration indication field may indicate 3 symbols duration for one UE whereas it means 3 slots for another UE. Hence, the exact value indicated by MCS and data duration field can be UE specific and correspondingly, the identifiers mentioned above, if UE specific, could map to different TBS for a given number of RBs or sub-carrier group allocated. Hence, contents of the Tables can be UE specific which every UE is configured with. In another example, TBS indication can be service specific, i.e., eMBB and URLLC may adopt different mapping mechanism.

In the case of URLLC there may only be a few options for providing the TBS information. A first signaling option includes explicitly providing the TBS information in a TBS specific field for example if only a select MCS is used. A second signaling option includes signaling the modulation type and the resource assignment. Alternatively, TBS information (the indication maps to a MCS and number of RBs) is explicitly provided in the DCI and a starting RB index is provided if consecutive RB allocation is used. From the TBS information, the UE identifies how many RBs are going to be used. In another example, only TBS is provided in an explicit field of n bits. Each combination of bits refers to a certain MCS and RB assignment. In one example, TBS is UE specific. The TBS field is configurable. One indication in the TBS field may correspond to different configurations for different UEs. The table below illustrates an example of TBS that may be used in an explicit field of a DCI transmitted to UEs. Two UEs are considered and both receive the same DCI. The TBS field is three bits in length as shown in the first column. The first UE, UE1, supports one TBS only whereas the second UE, UE 2, supports two TBS. Modulation and resource allocations for a first TBS are identified in rows 2 to 5 of the third column and modulation and resource allocations for a second TBS are identified in rows 6 to 9 of the third column. Different bitmaps in the TBS field correspond to different resource allocations corresponding to the TBS size supported by a UE. There can be a separate field to indicate starting RB index.

TABLE 9

Example of TBS bitmaps

| TBS field (3 bits) | UE 1 (supports one TBS) | UE 2 (supports two TBS) | |
|---|---|---|---|
| 000 | MCS1a, RB Alloc 1a | MCS2a, RB Alloc 2a | TBS 1 |
| 001 | MCS1b, RB Alloc 1b | MCS2b, RB Alloc 2b | |
| 010 | MCS1c, RB Alloc 1c | MCS2c, RB Alloc 2c | |
| 011 | MCS1d, RB Alloc 1d | MCS2d, RB Alloc 2d | |
| 100 | MCS1e, RB Alloc 1e | MCS2e, RB Alloc 2e | TBS 2 |
| 101 | MCS1f, RB Alloc 1f | MCS2f, RB Alloc 2f | |
| 110 | MCS1g, RB Alloc 1g | MCS2g, RB Alloc 2g | |
| 111 | MCS1h, RB Alloc 1h | MCS2h, RB Alloc 2h | |

In one example, if a UE support one TBS only, UE may be indicated MCS only. Then, based on data duration, UE can identify how many REs or RBs are assigned. Starting RB index may be indicated.

In one example, RB allocation field indicates contiguous or non-contiguous sub-carrier group which are used for data transmission over the indicated duration. If only one TBS is supported, then MCS field can be omitted as number of RBs assigned together with data duration indicated can implicitly contain MCS information.

In another example, if UE supports M TBS, a field can be used to indicate a TBS index consisting of $\log_2 M$ bits. Then number of RBs assigned together with data duration indicated would implicitly contain MCS information for the indicated TBS index.

In another example, values of indicated MCS, indicated RBs or sub-carrier group, indicated data duration can be mapped to one or more UE specific look-up tables to obtain TBS information.

For PDCCH re-transmissions that occur before data ACK/NACKs, the PDCCH can also provide TBS information or resource assignment, or both.

In conventional protocols, such as LTE, it is assumed as indicated above that the UE knows the TBS information from initial transmission. The modulation type can be provided in a reserved field with the resource assignment.

According to embodiments of the present application, in particular in the case of URLLC, the TBS information is provided explicitly in repetitions subsequent to the first PDCCH, in case the UE missed first PDCCH. In one example, as part of the TBS information, the new data indicator (NDI) bit may or may not be toggled and a same HARQ process may be identified. The UE can be configured to interpret the NDI field accordingly.

If multiple PDCCH are received, i.e. the initial PDCCH and any subsequent retransmissions, the UE can combine data from the multiple PDCCHs if that schedule same HARQ process data.

As mentioned above in respect to FIG. 36, the second PDCCH can update the ACK/NACK timing.

For re-transmissions of the PDCCH after data ACK/NACK, the PDCCH may provide the modulation type and resource assignment only as the TBS should have been successfully detected if data ACK/NACKS are being sent.

In some embodiments improved PDCCH reliability may be provided based on an increased level of diversity, for example the PDCCHs may be received in the same TTI with different antenna ports or different DMRS configurations in a same or different CORESETs. The PDCCH can be transmitted from the same TRP or multiple TRPs, subject to backhaul limitations, in a manner that is transparent to the UE.

Auxiliary Identities and Auxiliary Search Spaces

In some embodiments, a UE can be configured by the network with at least one UE-specific configurable auxiliary identity. The signaling of identities to the UE can be done using higher-layer signaling (e.g. RRC signaling), where primary identities and auxiliary identities are explicitly signaled to the UE. The signaling of identities to the UE can also be done in an implicit manner, for instance: a primary identity is defined as an identity that is assigned as part of having completed the random access procedure and an auxiliary identity is defined as an identity that is assigned after the UE has already been assigned a primary identity.

Figure 37:
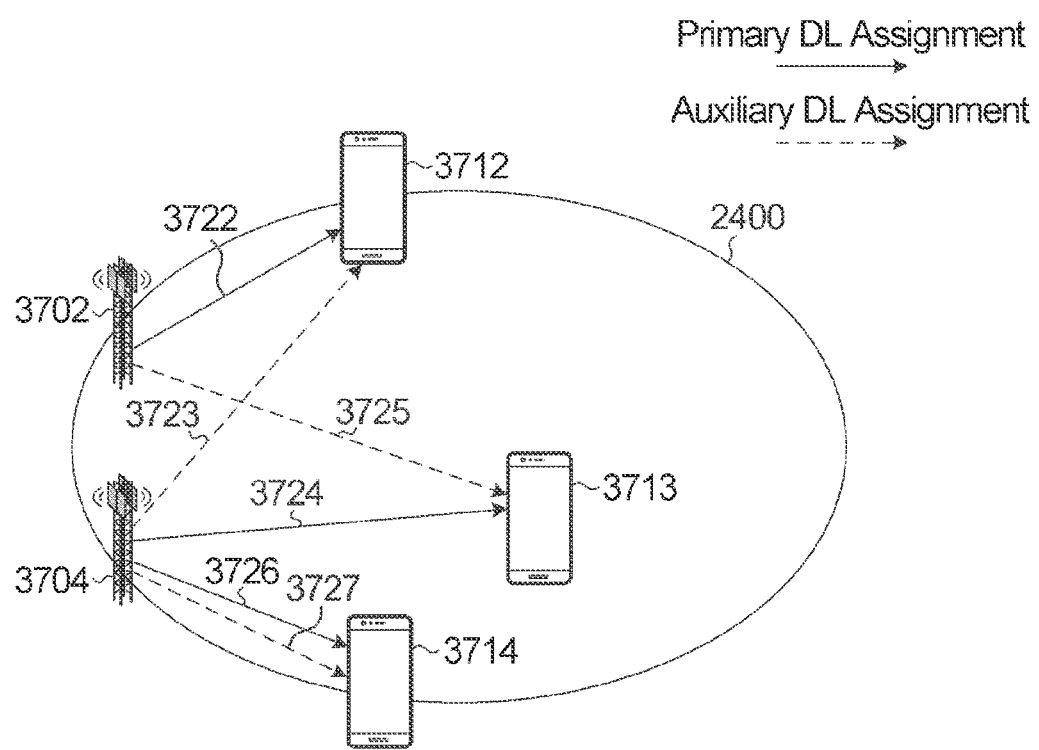
FIG. 37 is a representative illustration of primary downlink assignments and auxiliary downlink assignments between multiple TRPs and various UEs in a single cell.

In some embodiments, a UE can be configured by the network with at least one UE-specific configurable auxiliary identity for the purpose of monitoring at least one CORE- SET group for a particular UE-specific auxiliary search space. Each CORESET group for a particular UE-specific auxiliary search space can have a specific search space definition including a specific aggregation level and/or a total number of decoding candidates and/or time, frequency resources indexed by the UE-specific auxiliary identity. A representative example is shown in FIG. 37. FIG. 37 illustrates a first TRP1 3702 and a second TRP2 3704. FIG. 37 also illustrates a first UE1 3712, a second UE2 3713 and a third UE3 3714. The network configures UE1 3712 to monitor for a primary DL assignment 3722 from TRP1 3702 and to monitor for an auxiliary DL assignment 3723 from TRP2 3704. The network configures UE2 3713 to monitor for a primary DL assignment 3724 from TRP2 3704 and to monitor for an auxiliary DL assignment 3725 from TRP1 3702. The network configures UE3 3714 to monitor for a primary DL assignment 3726 from TRP2 3704 and for an auxiliary DL assignment 3727 from TRP1 3704.

In some embodiments, the network can configure some fields defined in control channel messages using higher-layer signaling (e.g. RRC signaling). As a first example, the UE can be configured to receive some fields via higher-layer signaling (e.g. RRC signaling) and to over-ride any values that the UE finds in control channel messages for fields already configured using such higher-layer signaling. As a second example, the UE can be configured to receive some fields via higher-layer signaling (e.g. RRC signaling) and to receive other fields via control channel messages.

In some embodiments, a UE can be configured by the network using higher-layer signaling (e.g. RRC signaling) to monitor for control channel messages on UE-specific auxiliary search spaces and to discard some specific fields of the control channel message received over UE-specific auxiliary search spaces, such as (but not limited to) the UL SRS trigger, the CSI request or the QCL indication.

In some embodiments, a UE can be configured by the network using higher-layer signaling (e.g. RRC signaling) to monitor for control channel messages on UE-specific auxiliary search spaces with modified formats. As a first example, a UE can be configured to receive control channel messages with one or more fields have been removed such as (but not limited to) the UL SRS trigger, the CSI request or the QCL indication. As a second example, the network can signal via higher-layer signaling (e.g. RRC signaling) which fields are to be configured dynamically in a control channel message and which fields are to be configured semi-statically using higher-layer signaling. As a third example, the UE can be configured to receive control channel messages with a new field whose definition and value can be signaled to the UE via higher-layer signaling (e.g. RRC signaling), where the new field can be located on one or more existing field(s) or on reserved bits/fields that are present in a control channel message for other undefined usage or on a new location where no fields were previously defined. As a fourth example, the UE can be configured to receive control channel messages with additional fields in newly defined locations, which can be signaled using higher-layer signaling (e.g. RRC signaling).

In some embodiments, the network can transmit at least one control channel message on UE-specific auxiliary search spaces where the control channel message is appended with a CRC scrambled with a UE-specific primary identity (e.g. C-RNTI) or with a UE-specific auxiliary identity.

In some embodiments, the network can transmit at least two control channel messages within the same CORESET on overlapping UE-specific search spaces where at least one search space is indicated using a primary identity (e.g. C-RNTI) and at least one search space is indicated using an auxiliary identity. The UE can either separate the control channel messages using the DMRS associated with a given assignment or the network explicitly maps the modulated symbols corresponding to the control channel messages on non-overlapping time-frequency resources.

According to an aspect of the present disclosure there is provided a method that includes: a first transmit receive point (TRP) transmitting a first transmission on a dynamically scheduled resource; and in a same time resource block, a second TRP transmitting a second transmission on a configured resource.

In some embodiments, the method further includes notifying a user equipment (UE) of the configured resource, wherein the UE receives configuration of the resource set from higher layer or RRC signaling.

In some embodiments, the second transmission on the configured resource is the same as the first transmission on the dynamically scheduled resource.

In some embodiments, the second transmission and the first transmission belong to the same HARQ process.

In some embodiments, notifying the UE of the configured resource comprises using semi-persistent scheduling (SPS).

In some embodiments, the method further includes the first TRP transmitting an activation signal indicating that the configured resource is available for use.

In some embodiments, the method further includes the first or second TRP transmitting a de-activation signal indicating that the configured resource is no longer available for use.

In some embodiments, during a handover from the first TPR to the second TRP, the second transmission identifies the second TRP as a new serving TRP and in a subsequent time resource block; the second TRP transmitting on a dynamically scheduled resource; and in the same subsequent time resource block, the first TRP transmitting on the configured resource.

In some embodiments, transmitting the activation signal or the deactivation signal includes transmitting at least one of: a user equipment (UE) downlink control information (DCI) message; a UE group DCI message; a radio resource control (RRC) message; and a media access control control element (MAC-CE) message.

In some embodiments, transmitting an activation signal includes information identifying when to expect transmission over the configured time-frequency resource set from the second TRP.

In some embodiments, the second TRP stops ongoing transmission over the configured time-frequency resource to use it for transmission for the UE for which the resource set is configured.

According to an aspect of the present disclosure there is provided a method that includes: a first transmit receive point (TRP) transmitting a first transmission over a first time-frequency resource; and a second TRP dynamically scheduling transmission for duplicated data over a second time-frequency resource.

In some embodiments, the method further includes duplicating data by at least one of: duplicating with different variations of protocol stacks; duplication at packet data convergence protocol (PDCP) layer; duplication at RLC layer; and duplication at media access layer (MAC) layer.

According to an aspect of the present disclosure there is provided a method that includes: a central scheduler scheduling an initial transmission and one or more re-transmissions from at least two transmit receive points (TRP), wherein each of the at least two TRP transmits at least one of the initial transmission and the one or more re-transmissions.

In some embodiments, scheduling an initial transmission and one or more re-transmissions includes, for a maximum of N re-transmissions, N being an integer≥1, scheduling at least the initial transmission and K re-transmissions, K being an integer≥0, from the first TRP and N-K transmissions from the second TRP.

In some embodiments, the method further includes transmitting quasi-co-location (QCL) information regarding one or more of the at least two TRP in a DCI message.

According to an aspect of the present disclosure there is provided a method that includes: a first transmit receive point (TRP) scheduling an initial transmission and one or more re-transmissions from the first TRP and at least one second TRP; and the first TRP transmitting scheduling information to the at least one second TRP.

In some embodiments, the method further includes the second TRP updating the scheduling of re-transmissions from the second TRP.

According to an aspect of the present disclosure there is provided a method that includes: a first transmit receive point (TRP) scheduling an initial transmission and one or more re-transmissions from the first TRP and at least one second TRP; the first TRP transmitting scheduling information to the at least one second TRP; and the at least one second TRP scheduling at least one re-transmission from the at least one second TRP.

In some embodiments, the at least one second TRP scheduling at least one re-transmission from the at least one second TRP comprises the at least one second TRP scheduling the at least one re-transmission based on the scheduling information received from the first TRP.

In some embodiments, the at least one second TRP scheduling at least one re-transmission from the at least one second TRP includes the at least one second TRP scheduling the at least one re-transmission independently of the scheduling information received from the first TRP.

In some embodiments, the method further includes duplicating the initial transmission by at least one of: duplicating with different variations of protocol stacks; duplication at packet data convergence protocol (PDCP) layer; and duplication at media access layer (MAC) layer.

According to an aspect of the present disclosure there is provided a method that includes: scheduling at least two uplink control channels for transmission of the same data, the data on each channel of the at least two channels having the same hybrid automatic request (HARQ) process identifier (ID).

According to an aspect of the present disclosure there is provided a method that includes: scheduling at least two uplink control channels for transmission of different data, the data on each channel of the at least two channels having the same hybrid automatic request (HARQ) process identifier (ID).

In some embodiments, the method further includes a downlink control channel indicating a number N, N being an integer 1, of resources for N repetitions for each of the at least two uplink control channels.

In some embodiments, the method further includes configuring a user equipment (UE) with a number N, N being an integer 1, of repetitions for the uplink control channel.

In some embodiments, based on the transmission resources assigned for the at least two uplink control channels, the repetition follows a hopping pattern.

Although a combination of features is shown in the illustrated embodiments, not all of them need to be combined to realize the benefits of various embodiments of this disclosure. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present disclosure describes methods and processes with steps in a certain order, one or more steps of the methods and processes may be omitted or altered as appropriate. One or more steps may take place in an order other than that in which they are described, as appropriate.

While the present application is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution described in the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute embodiments of the methods disclosed herein.

The teachings of the present application may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

What is claimed is:

1. A method comprising:
   receiving, by a user equipment (UE), a configuration to monitor more than one physical downlink control channel (PDCCH) in a single PDCCH monitoring occasion, wherein the more than one PDCCH schedules more than one physical downlink shared channel (PDSCH) overlapping in time, wherein the more than one PDCCH is associated with a radio network temporary identifier (RNTI);
   monitoring, by the UE, the more than one PDCCH based on the configuration; and
   receiving, by the UE, the more than one PDSCH in accordance with the more than one PDCCH.

2. The method of claim 1, the more than one PDCCH scheduling more than the one PDSCH overlapping in frequency.

3. The method of claim 1, further comprising:
   determining, by the UE, a physical uplink control channel (PUCCH) feedback mode, wherein the determining the PUCCH feedback mode comprises receiving a radio resource control (RRC) signaling indicating the PUCCH feedback mode; and transmitting, by the UE, a single or multiple PUCCHs based on the PUCCH feedback mode.

4. The method of claim 1, further comprising:

transmitting, by the UE, multiple PUCCHs, wherein each PUCCH of the multiple PUCCHs is associated with a different PDCCH of the more than one PDCCH.

5. The method of claim 4, wherein the multiple PUCCHs are transmitted within a slot.

6. The method of claim 5, wherein the multiple PUCCHs do not overlap in time, and wherein a starting orthogonal frequency-division multiplexing (OFDM) symbol of each PUCCH is located within the slot, and a duration of the each PUCCH is less than a duration of the slot.

7. The method of claim 1, wherein the more than one PDCCH is associated with one serving cell.

8. The method of claim 1, further comprising:

obtaining, by the UE, an association between the more than one PDCCH and more than one control resource set (CORESET); and monitoring, by the UE, a first PDCCH from a first CORESET group and a second PDCCH from a second CORESET group based on the association between the more than one PDCCH and the more than one CORESET, wherein a CORESET group includes at least one user equipment (UE)-specific CORESET from a set of CORESETs.

9. The method of claim 8, wherein the obtaining the association further comprises:

receiving, by the UE, information indicating more than one CORESET configuration, each CORESET configuration of the more than one CORESET configuration including one identity associated with one of the more than one PDCCH, wherein at least two CORESET configurations of the more than one CORESET configuration include different identities.

10. A user equipment (UE) comprising:

at least one processor; and a non-transitory computer readable storage medium storing programming for execution by the at least one processor, the programming including instructions to cause the UE to:

receive a configuration to monitor more than one physical downlink control channel (PDCCH) in a single PDCCH monitoring occasion, wherein the more than one PDCCH schedules more than one physical downlink shared channel (PDSCH) overlapping in time, wherein the more than one PDCCH is associated with a radio network temporary identifier (RNTI);

monitor the more than one PDCCH based on the configuration; and receive the more than one PDSCH in accordance with the more than one PDCCH.

11. The UE of claim 10, the more than one PDCCH scheduling more than the one PDSCH overlapping in frequency.

12. The UE of claim 10, the programming further including instructions to cause the UE to:

determine a physical uplink control channel (PUCCH) feedback mode by receiving a radio resource control (RRC) signaling indicating the PUCCH feedback mode; and transmit a single or multiple PUCCHs based on the PUCCH feedback mode.

13. The UE of claim 11, the programming further including instructions to cause the UE to:

transmit multiple PUCCHs, wherein each PUCCH of the multiple PUCCHs is associated with a different PDCCH of the more than one PDCCH.

14. The UE of claim 13, wherein the multiple PUCCHs are transmitted within a slot.

15. The UE of claim 14, wherein the multiple PUCCHs do not overlap in time, and wherein a starting orthogonal frequency-division multiplexing (OFDM) symbol of each PUCCH is located within the slot, and a duration of the each PUCCH is less than a duration of the slot.

16. The UE of claim 10, the programming further including instructions to cause the UE to:

obtain an association between the more than one PDCCH and more than one control resource set (CORESET); and monitor a first PDCCH from a first CORESET group and a second PDCCH from a second CORESET group based on the association between the more than one PDCCH and the more than one CORESET, wherein a CORESET group includes at least one user equipment (UE)-specific CORESET from a set of CORESETs.

17. The UE of claim 16, wherein the instructions to obtain the association further include instructions to:

receive information indicating more than one CORESET configuration, each CORESET configuration of the more than one CORESET configuration including one identity associated with one of the more than one PDCCH, wherein at least two CORESET configurations of the more than one CORESET configuration include different identities.

18. A base station comprising:

at least one processor; and a non-transitory computer readable storage medium storing programming for execution by the at least one processor, the programming including instructions to cause the base station to:

send a configuration for a user equipment (UE) to monitor more than one physical downlink control channel (PDCCH) in a single PDCCH monitoring occasion, wherein the more than one PDCCH schedules more than one physical downlink shared channel (PDSCH) overlapping in time, wherein the more than one PDCCH is associated with a radio network temporary identifier (RNTI); and send the more than one PDSCH in accordance with the more than one PDCCH.

19. The base station of claim 18, further comprising: the programming further including instructions to cause the base station to:

receive multiple PUCCHs, wherein each PUCCH of the multiple PUCCHs is associated with a different PDCCH of the more than one PDCCH.

20. The base station of claim 19, wherein the multiple PUCCHs are transmitted within a slot.

* * * * *

UNITED STATES PATENT AND TRADEMARK OFFICE
CERTIFICATE OF CORRECTION

| | | |
|---|---|---|
| PATENT NO. | : 11,678,323 B2 | Page 1 of 1 |
| APPLICATION NO. | : 17/646050 | |
| DATED | : June 13, 2023 | |
| INVENTOR(S) | : Gong et al. | |

It is certified that error appears in the above-identified patent and that said Letters Patent is hereby corrected as shown below:

In the Claims

In Column 72, in Claim 13, Line 9, delete "claim 11," and insert -- claim 10, --, therefor.

Signed and Sealed this
Twenty-ninth Day of August, 2023

*Katherine Kelly Vidal*

Katherine Kelly Vidal
*Director of the United States Patent and Trademark Office*